United States Patent
Golovidov et al.

(10) Patent No.: US 11,151,480 B1
(45) Date of Patent: Oct. 19, 2021

(54) HYPERPARAMETER TUNING SYSTEM RESULTS VIEWER

(71) Applicant: SAS Institute Inc., Cary, NC (US)

(72) Inventors: Oleg Borisovich Golovidov, Raleigh, NC (US); Brett Alan Wujek, Cary, NC (US); Patrick Nathan Koch, Morrisville, NC (US); Rajendra Prasad Singh, Durham, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/099,846

(22) Filed: Nov. 17, 2020

Related U.S. Application Data

(60) Provisional application No. 63/042,291, filed on Jun. 22, 2020.

(51) Int. Cl.
*G06N 20/10* (2019.01)
*G06F 3/0483* (2013.01)
*G06F 16/958* (2019.01)
*G06F 16/904* (2019.01)

(52) U.S. Cl.
CPC ........... *G06N 20/10* (2019.01); *G06F 3/0483* (2013.01); *G06F 16/904* (2019.01); *G06F 16/958* (2019.01)

(58) Field of Classification Search
CPC ..... G06N 20/10; G06F 16/958; G06F 16/904; G06F 3/0483
See application file for complete search history.

(56) References Cited

U.S. PATENT DOCUMENTS

| | | | |
|---|---|---|---|
| 6,026,397 A | * | 2/2000 | Sheppard .............. G06F 16/355 |
| 10,360,517 B2 | | 7/2019 | Koch et al. |
| 10,445,150 B1 | | 10/2019 | Johnson et al. |
| 10,558,934 B1 | | 2/2020 | Cheng et al. |
| 10,600,005 B2 | | 3/2020 | Gunes et al. |
| 10,607,159 B2 | | 3/2020 | Hayes et al. |

(Continued)

FOREIGN PATENT DOCUMENTS

WO  WO 2020/037105 A1  2/2020

OTHER PUBLICATIONS

Brett Wujek, "Creating a Web Dashboard for Monitoring and Visualizing Autotune Progress," SAS Global Forum 2020, Mar. 29-Apr. 1, 2020.

(Continued)

*Primary Examiner* — Hope C Sheffield
(74) *Attorney, Agent, or Firm* — Bell & Manning, LLC

(57) ABSTRACT

A visualization is presented while tuning a machine learning model. A model tuning process writes tuning data to a history table. The model tuning process is repeatedly training and scoring a model type with different sets of values of hyperparameters defined based on the model type. An objective function value is computed for each set of values of the hyperparameters. Data stored in the history table is accessed and used to identify the hyperparameters. (A) A page template is selected from page templates that describe graphical objects presented in the display. (B) The page template is updated with the accessed data. (C) The display is updated using the updated page template. (D) At the end of a refresh time period, new data stored in the history table by the model tuning process is accessed. (E) (B) through (D) are repeated with the accessed data replaced with the accessed new data.

30 Claims, 29 Drawing Sheets

(56) References Cited

U.S. PATENT DOCUMENTS

| | | | | |
|---|---|---|---|---|
| 10,719,301 | B1* | 7/2020 | Dasgupta | G06F 8/33 |
| 2002/0161634 | A1* | 10/2002 | Kaars | H04N 21/4316 705/14.55 |
| 2004/0201588 | A1* | 10/2004 | Meanor | G06T 11/206 345/440 |
| 2014/0033093 | A1* | 1/2014 | Brauninger | G06F 40/18 715/765 |
| 2016/0085428 | A1* | 3/2016 | Ashby | G06F 16/958 715/738 |
| 2016/0098176 | A1* | 4/2016 | Cervelli | G06F 3/04845 715/804 |
| 2018/0240041 | A1* | 8/2018 | Koch | G06F 16/24578 |
| 2018/0285759 | A1 | 10/2018 | Wood et al. | |
| 2019/0244139 | A1 | 8/2019 | Varadarajan et al. | |
| 2019/0318248 | A1 | 10/2019 | Moreira-Matias et al. | |
| 2019/0391859 | A1 | 12/2019 | Johnson et al. | |
| 2020/0012934 | A1 | 1/2020 | Goodsitt et al. | |
| 2020/0012935 | A1 | 1/2020 | Goodsitt et al. | |
| 2020/0057944 | A1 | 2/2020 | Loh et al. | |
| 2020/0097847 | A1* | 3/2020 | Convertino | G06F 11/3447 |
| 2020/0099733 | A1* | 3/2020 | Chu | H04L 65/605 |
| 2020/0167691 | A1* | 5/2020 | Golovin | G06N 7/005 |
| 2020/0201897 | A1* | 6/2020 | Palanciuc | G06F 40/30 |
| 2020/0211716 | A1* | 7/2020 | Lefkofsky | G06F 21/604 |
| 2020/0327412 | A1* | 10/2020 | McCourt | G06N 20/20 |
| 2020/0380378 | A1* | 12/2020 | Moharrer | G06N 20/20 |

OTHER PUBLICATIONS

Golovin et al., "Google Vizier: A Service for Black-Box Optimization," KDD '17, Aug. 13-17.
SHERPA: A Python Hyperparameter Optimization Library, https://parameter-sherpa.readthedocs.io/en/latest/index.html, 2018.
TensorBoard: TensorFlow's visualization toolkit, https://www.tensorflow.org/tensorboard, 2019.
SAS Visual Analytics 8.5: Working with Report Content, SAS Institute Inc., 2019.
SAS Visual Analytics 8.5; Viewing Reports, SAS Institute, Jun. 2020.
SAS Visual Analytics 8.5: Designing Reports, SAS Institute, Inc., Jun. 2020.
Visualize Results in Amazon SageMaker Studio, https://docs.aws.amazon.com/sagemaker/latest/dg/model-monitor-interpreting-visualize-results.html, 2020, Amazon Web Services, Inc.
WebUI, https://nni.readthedocs.io/en/latest/Tutorial/WebUI.html, Copyright 2020, Microsoft Revision.

* cited by examiner

HYPERPARAMETER TUNING SYSTEM RESULTS VIEWER

CROSS-REFERENCE TO RELATED APPLICATIONS

The present application claims the benefit of and priority based on 35 U.S.C. § 119(e) to U.S. Provisional Patent Application No. 63/042,291 filed Jun. 2, 2020, the entire contents of which are hereby incorporated by reference.

BACKGROUND

Facilitating effective decision making requires the transformation of relevant data to high-quality classification and regression models. Machine learning defines models that can be used to predict occurrence of an event, for example, from sensor data or signal data, or recognize/classify an object, for example, in an image, in text, in a web page, in voice data, in sensor data, etc. Determining hyperparameters associated with the classification or regression model to determine the best identified model configuration is a complex optimization problem. Though the classification and regression model solutions are influenced by the hyperparameters, there are typically no clear default values for the hyperparameters that generate a satisfactory classification or regression model for a wide range of applications. Not only do the input values used for the hyperparameters dictate the performance of the training process, but more importantly they influence the quality of the resulting classification and regression models. Even with expertise in setting the hyperparameters, the best identified values of these hyperparameters change with different data. As a result, it is difficult to define the hyperparameter values based on previous experience. A tuning process can be used to in train numerous candidate models to evaluate various values and combinations of values for the hyperparameters. However, the tuning process typically requires a large amount of computing resources, computing time, and user time and does not typically provide the user with a sense of the progress being made, of whether the hyperparameters are reaching boundary values, of how sensitive the model is to each hyperparameter or how the hyperparameter values may interact with each other during the tuning process. As a result, computing resources, computing time, and user time may be wasted.

SUMMARY

In an example embodiment, a non-transitory computer-readable medium is provided having stored thereon computer-readable instructions that when executed by a computing device, cause the computing device to present a visualization of hyperparameter values while tuning a machine learning model. A visualization user interface window is presented in a display. Data stored in a history table is accessed. A model tuning process writes tuning data to the history table. The model tuning process is repeatedly training and scoring a machine learning model type with different sets of values of hyperparameters. The hyperparameters are defined based on the machine learning model type. An objective function value is computed for each set of values of the hyperparameters. The hyperparameters are identified from the accessed data. (A) A page template is selected from a plurality of page templates, wherein the page template describes graphical objects presented in the visualization user interface window. (B) The selected page template is updated with the accessed data based on the identified hyperparameters. (C) The presented visualization user interface window is updated using the updated, selected page template. (D) At the end of a refresh time period, new data stored in the history table by the model tuning process is accessed. The new data is the data written after a previous data access. (E) (B) through (D) are repeated with the accessed data replaced with the accessed new data until an interaction by a user with the visualization user interface window is detected.

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to present a visualization of hyperparameter values while tuning a machine learning model.

In yet another example embodiment, a method of presenting a visualization of hyperparameter values while tuning a machine learning model is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

DETAILED DESCRIPTION

Figure 1:
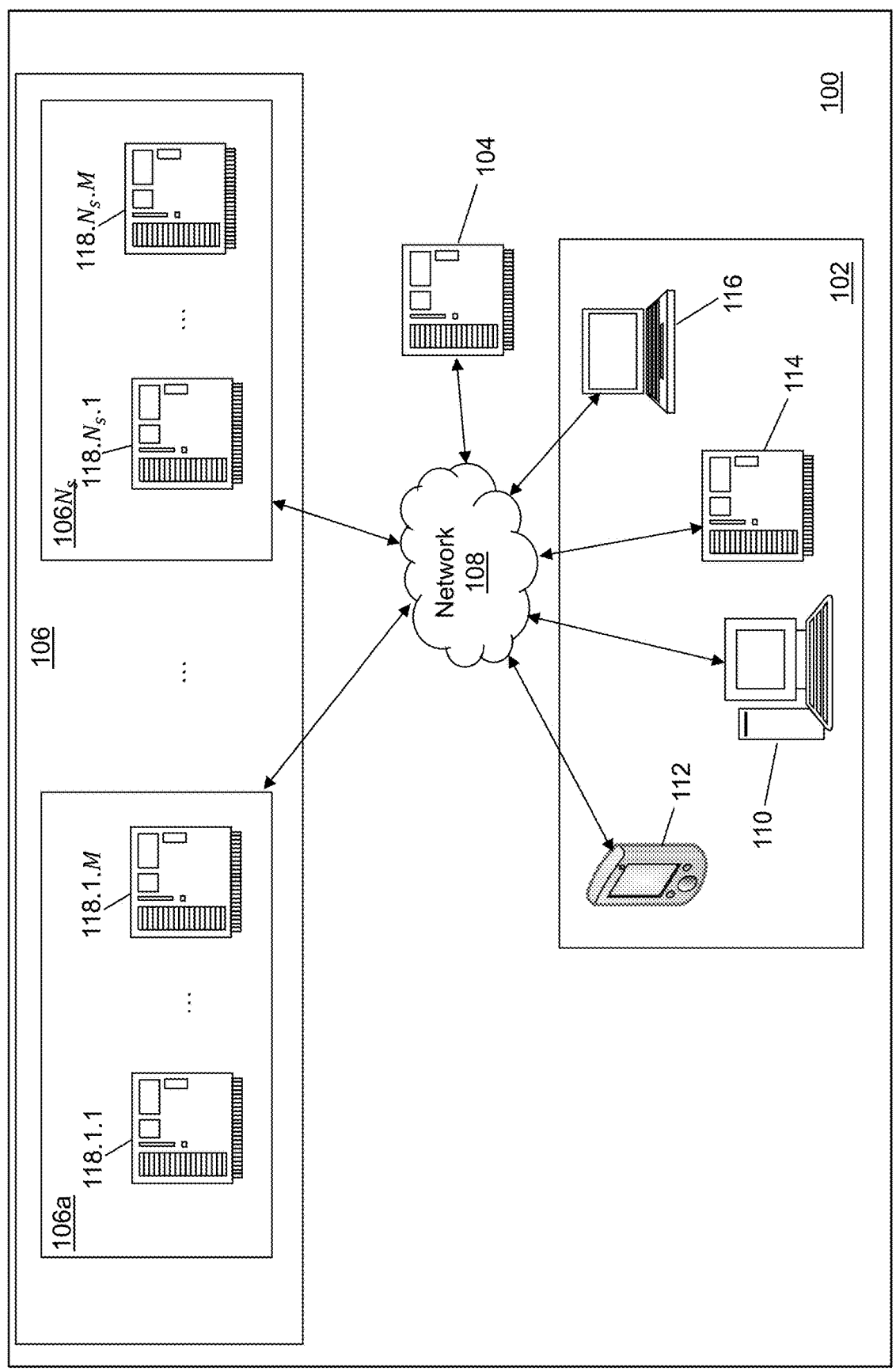
FIG. 1 depicts a block diagram of a hyperparameter selection system in accordance with an illustrative embodiment.

Referring to FIG. 1, a block diagram of a hyperparameter selection system 100 is shown in accordance with an illustrative embodiment. In an illustrative embodiment, hyperparameter selection system 100 may include a user system 102, a selection manager device 104, a worker system 106, and a network 108. Each of user system 102, selection manager device 104, and worker system 106 may be composed of one or more discrete computing devices in communication through network 108. Alternatively, user system 102, selection manager device 104, and worker system 106 may be integrated into a single computing device capable of computing using a plurality of different threads.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 108 to/from another of the one or more computing devices of user system 102 and/or to/from selection manager device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
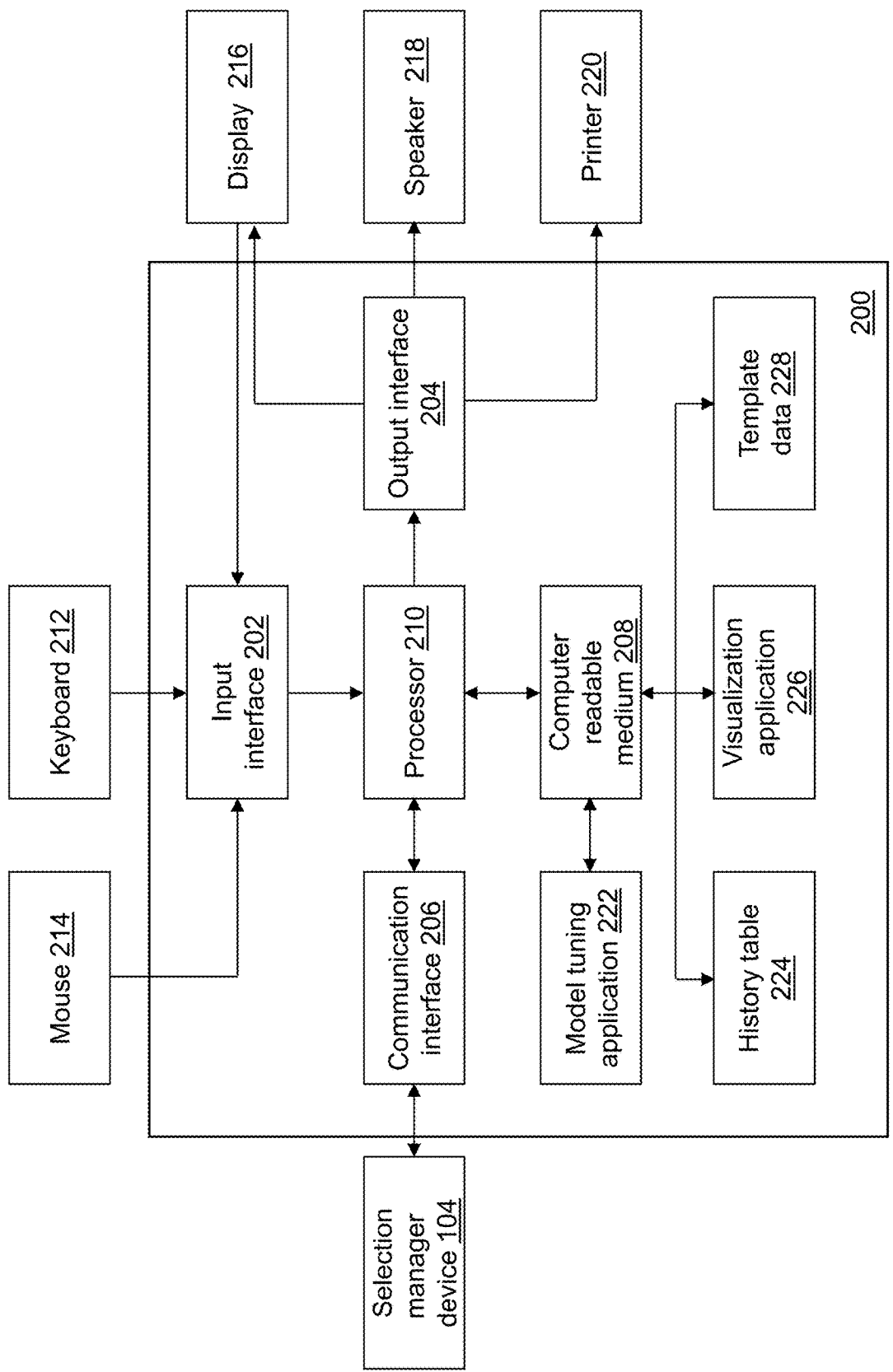
FIG. 2 depicts a block diagram of a user device of the hyperparameter selection system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a computer-readable medium 208, a processor 210, a model tuning application 222, a history table 224, a visualization application 226, and template data 228. Each computing device of user system 102 may be executing model tuning application 222 of the same or different type.

Referring again to FIG. 1, selection manager device 104 can include any form factor of computing device. For illustration, FIG. 1 represents selection manager device 104 as a server computer. Selection manager device 104 may send and receive signals through network 108 to/from user system 102 and/or to/from worker system 106. Selection manager device 104 may communicate using various transmission media that may be wired and/or wireless as understood by those skilled in the art. Selection manager device 104 may be implemented on a plurality of computing devices of the same or different type. Hyperparameter selection system 100 further may include a plurality of selection manager devices.

Figure 3:
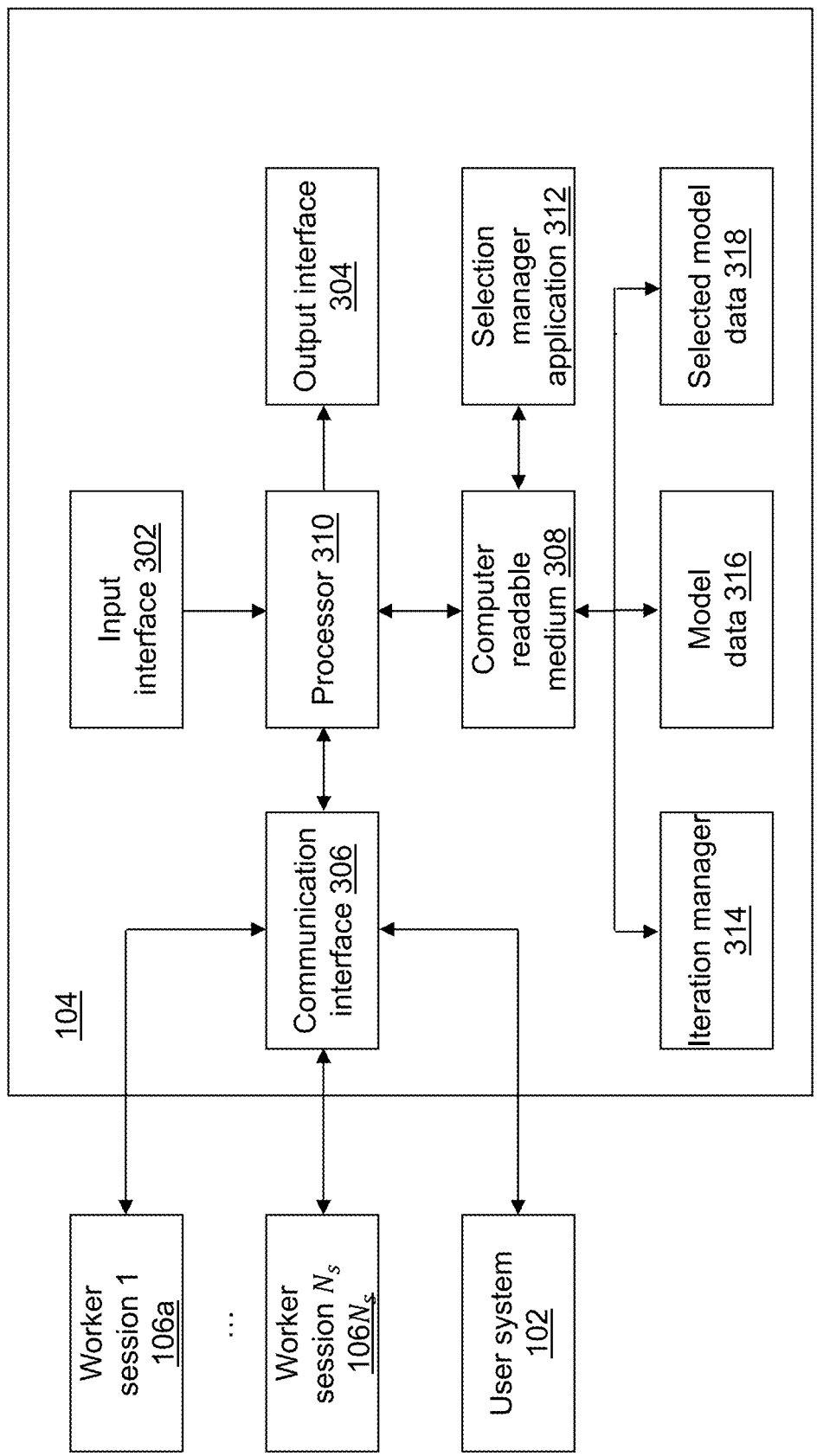
FIG. 3 depicts a block diagram of a selection manager device of the hyperparameter selection system of FIG. 1 in accordance with an illustrative embodiment.

For illustration, referring to FIG. 3, a block diagram of selection manager device 104 is shown in accordance with an illustrative embodiment. Selection manager device 104 may include a second input interface 302, a second output interface 304, a second communication interface 306, a second computer-readable medium 308, a second processor 310, a selection manager application 312, an iteration manager 314, model data 316, and selected model data 318. Selection manager device 104 may execute selection manager application 312 that instantiates iteration manager 314. Iteration manager 314 maintains a configuration list of hyperparameters for evaluation on each iteration. Evaluation cache 316, model data 316, and selected model data 318 are created from results generated by worker system 106.

Referring again to FIG. 1, the one or more computing devices of worker system 106 may include computers of any form factor that may be organized into one or more sessions, where a number of the one or more sessions is indicated by $N_s$. Worker system 106 may include a number of computing devices indicated by $N_W$. Worker system 106 may include computers of other form factors such as a desktop or a laptop, etc. Worker system 106 can include any number and any combination of form factors of computing devices organized into any number of sessions. For example, in the illustrative embodiment, worker system 106 includes a first worker session $106a, \ldots$, and an $N_s$th worker session $106k$.

Each session may include one or more computing devices, where a number of session computing devices in each session is indicated by M. In the illustrative embodiment, first worker session 106a may include a first computing device 118.1.1, . . . , and an Mth computing device 118.1.M, and $N_s$th worker session 106n may include a first computing device 118.$N_s$.1, . . . , and an Mth computing device 118.$N_s$.M. The number of computing devices indicated by $N_W$ may or may not also include selection manager device 104. A number of threads may be associated with each computing device of worker system 106.

The computing devices of worker system 106 may send and receive signals through network 108 to/from selection manager device 104 and/or to/from user system 102 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4A:
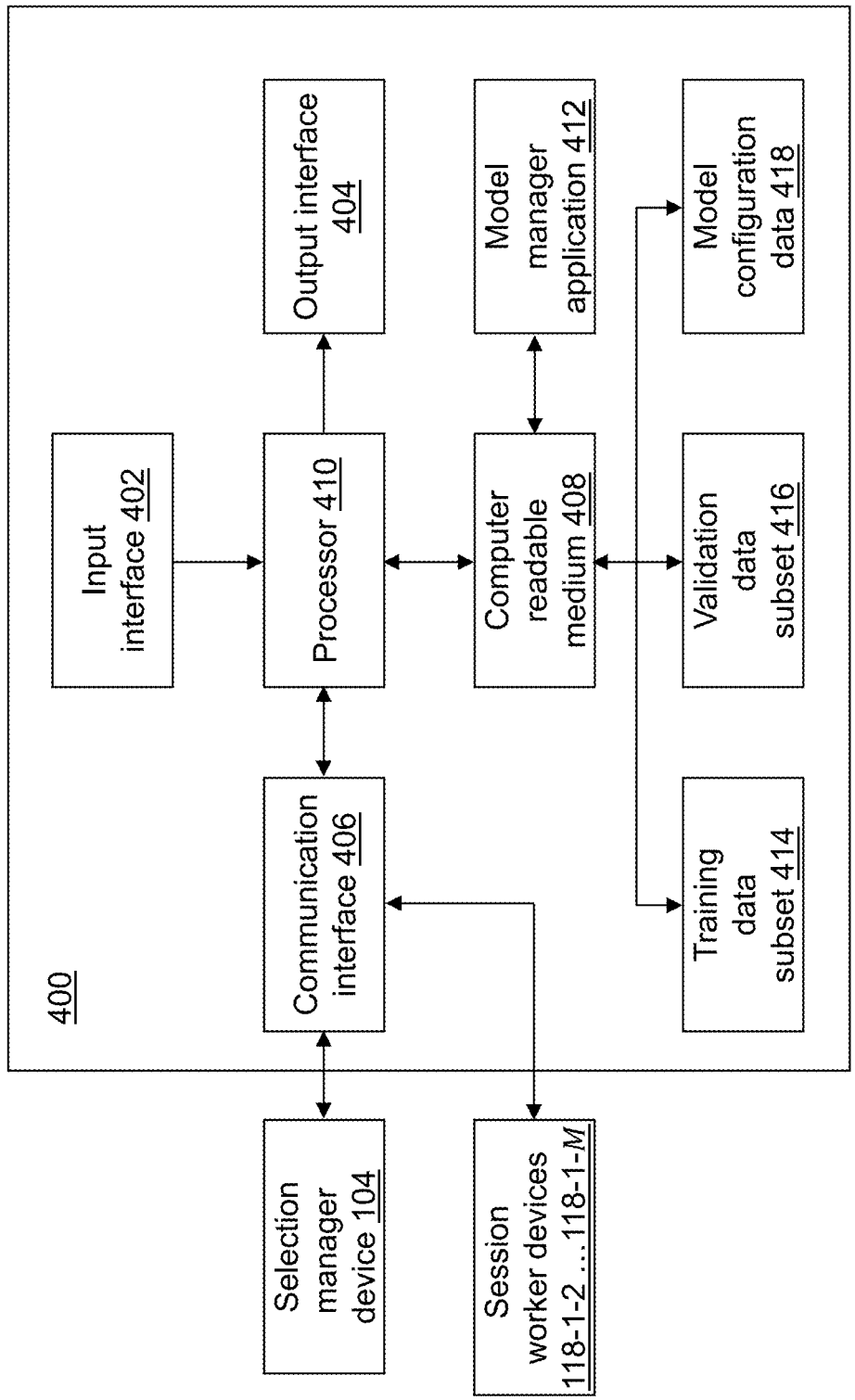
FIG. 4A depicts a block diagram of a session manager device of the hyperparameter selection system of FIG. 1 in accordance with an illustrative embodiment.

For illustration, referring to FIG. 4A, a block diagram of a session manager device 400 is shown in accordance with an example embodiment. Session manager device 400 is an example computing device of each session of worker system 106. For example, a first computing device of each session, such as first computing device 118.1.1 of first worker session 106a and first computing device 118.$N_s$.1 of $N_s$th worker session 106k, may be an instance of session manager device 400. Session manager device 400 may include a third input interface 402, a third output interface 404, a third communication interface 406, a third computer-readable medium 408, a third processor 410, a model manager application 412, a training dataset subset 414, a validation dataset subset 416, and model configuration data 418.

Figure 4B:
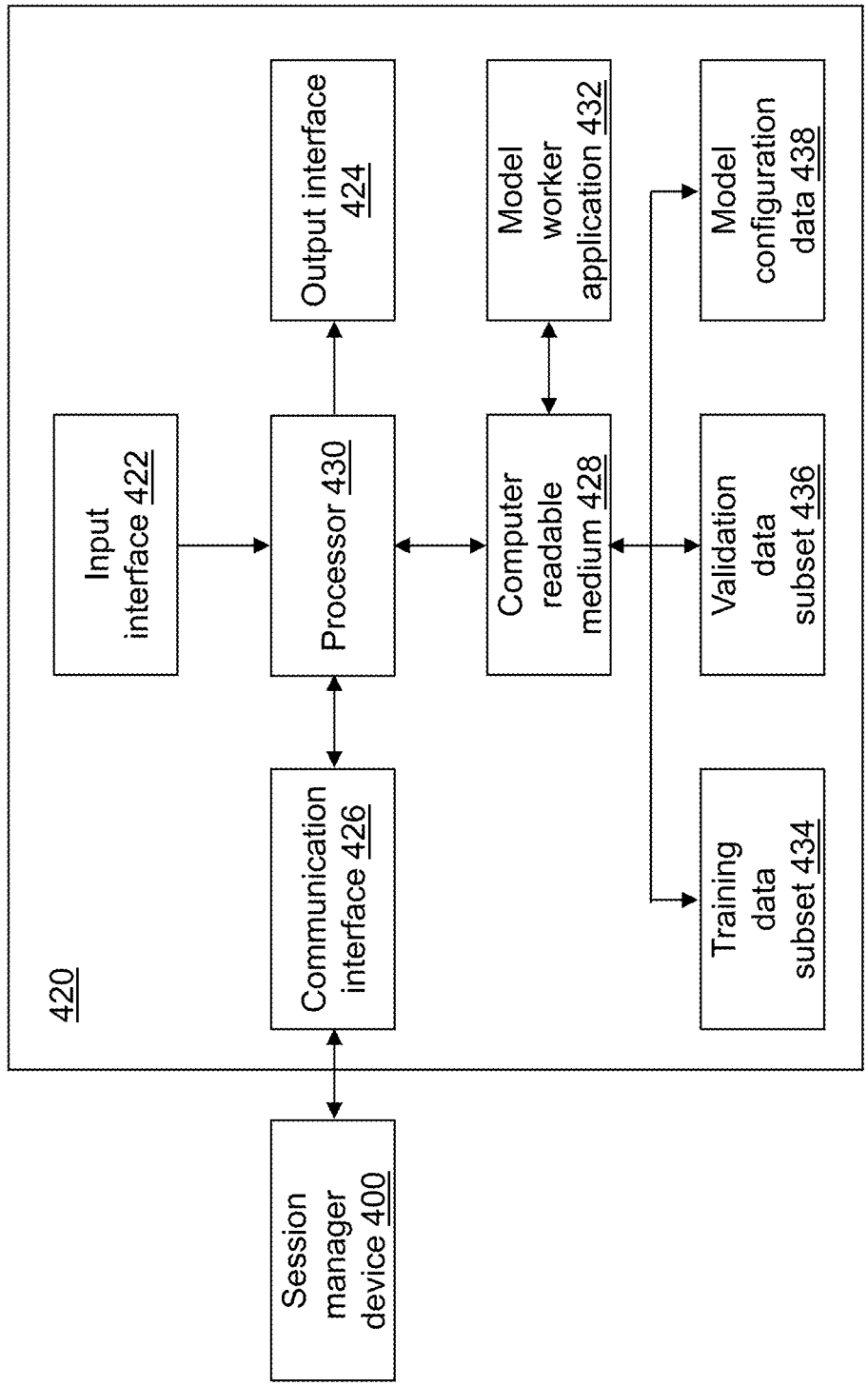
FIG. 4B depicts a block diagram of a session worker device of the hyperparameter selection system of FIG. 1 in accordance with an illustrative embodiment.

For illustration, referring to FIG. 4B, a block diagram of a session worker device 420 is shown in accordance with an example embodiment. Session worker device 420 is an example worker computing device of each session of worker system 106. For example, remaining computing devices of each session, such as . . . , and Mth computing device 118.1.M of first worker session 106a and . . . , and Mth computing device 118.$N_s$.M of $N_s$th worker session 106k, may each be an instance of session worker device 420. Session worker device 420 may include a fourth input interface 422, a fourth output interface 424, a fourth communication interface 426, a fourth computer-readable medium 428, a fourth processor 430, a model worker application 432, a training dataset subset 434, a validation dataset subset 436, and model configuration data 438.

Because the input dataset may need to be distributed across a plurality of computing devices, each session may include a plurality of computing devices with one of the computing devices acting as the session manager and referred to as session manager device 400. The input dataset first may be distributed into data subsets at each computing device included in the respective session, with each session distributing the input dataset in a similar manner among its computing devices. For example, if first worker session 106a includes three computing devices, approximately a third of the input dataset is distributed to each computing device of first worker session 106a that may or may not include a first session manager device 400a of first worker session 106a. $N_s$th worker session 106$N_s$ similarly distributes the input dataset among the computing devices of $N_s$th worker session 106$N_s$. The data subset of input dataset stored at each computing device is also divided into a training dataset subset and a validation dataset subset created from the local data subset in similar manners. Training dataset subset 414 and validation dataset subset 416 may be created at session manager device 400. Training dataset subset 434 and validation dataset subset 436 may be created at session worker device 420 included in each session Evaluation cache 316, model data 316, and selected model data 318 are created from results generated by worker system 106 executing model manager application 412 with training dataset subset 414 and validation dataset subset 416. The model training uses training dataset subset 414 and/or training dataset subset 434 to generate a predictive model, and model scoring uses validation dataset subset 416 and/or validation dataset subset 436 to determine how well the generated model performed. Model manager application 412 may coordinate generation of the predictive model using model worker application 432 executing at the one or more session worker devices 420 assigned to the session with their allocated subset of the input dataset. Session manager device 400 may or may not include a portion of the input dataset divided into training dataset subset 414 and validation dataset subset 416. Instead, session manager device 400 may coordinate the distribution without storing a portion of the input dataset on third computer-readable medium 408.

When cross-validation is performed to determine how well the generated model performed, a number of folds F is defined and the training is performed F−1 times with the performance measure averaged across the F−1 scoring executions with a validation holdout. When cross-validation is performed, the input dataset is partitioned into F subsets (folds). For each fold, a new model is trained on each of the F−1 folds and validated using the selected (holdout) fold. The objective function value is averaged over each set of training and scoring executions to obtain a single error estimate value.

Referring again to FIG. 2, each user device 200 of user system 102 may include the same or different components and combinations of components. Fewer, different, and additional components may be incorporated into user device 200.

Input interface 202 provides an interface for receiving information for entry into user device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into user device 200 or to make selections presented in a user interface displayed on display 216. The same interface may support both input interface 202 and output interface 204. For example, display 216 that includes a touch screen both allows user input and presents output to the user. User device 200 may have one or more input interfaces that use the same or a different input interface technology. The input interface technology further may be accessible by user device 200 through communication interface 206.

Output interface 204 provides an interface for outputting information from user device 200, for example, to a user of user device 200 or to another device. For example, output interface 204 may interface with various output technologies including, but not limited to, display 216, a speaker 218, a printer 220, etc. User device 200 may have one or more output interfaces that use the same or a different interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth antenna, a telephone jack, a USB port, etc. Data and messages may be transferred between user device 200 and selection manager device 104 using communication interface 206.

Computer-readable medium 208 is a non-transitory electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD or DVD, an external hard drive, etc. One or more external hard drives further may be connected to user device 200 using communication interface 106.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Model tuning application 222 performs operations associated with selecting a hyperparameter configuration for a model type where the hyperparameter configuration defines a value for each hyperparameter for the model type. The operations may be implemented using hardware, firmware, software, or any combination of these methods. Referring to the example embodiment of FIG. 2, model tuning application 222 is implemented in software (comprised of computer-readable and/or computer-executable instructions) stored in computer-readable medium 208 and accessible by processor 210 for execution of the instructions that embody the operations of model tuning application 222. Model tuning application 222 may be written using one or more programming languages, assembly languages, scripting languages, etc.

Model tuning application 222 may be implemented as a Web application. For example, model tuning application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an XML file, or any other type of file supported by HTTP.

Model tuning application 222 may be integrated with other analytic tools. As an example, model tuning application 222 may be part of an integrated data analytics software application and/or software architecture such as that offered by SAS Institute Inc. of Cary, N.C., USA. For example, model tuning application 222 may be part of SAS® Enterprise Miner™ and/or SAS® Viya™ developed and provided by SAS Institute Inc. of Cary, N.C., USA that may be used to create highly accurate predictive and descriptive models based on analysis of vast amounts of data from across an enterprise. Merely for further illustration, model tuning application 222 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server, all of which are developed and provided by SAS Institute Inc. of Cary, N.C., USA. Data mining is applicable in a wide variety of industries.

Visualization application 226 performs operations associated with presenting results from each hyperparameter configuration computed using selection manager application 312. For example, selection manager application 312 may store the results for each evaluation in history table 224. Visualization application 226 may continually read new values stored in history table 224 and present graphs of information based on characterizing information stored in template data 228. The operations may be implemented using hardware, firmware, software, or any combination of these methods. Referring to the example embodiment of FIG. 2, visualization application 226 is implemented in software (comprised of computer-readable and/or computer-executable instructions) stored in computer-readable medium 208 and accessible by processor 210 for execution of the instructions that embody the operations of model tuning application 222. Visualization application 226 may be written using one or more programming languages, assembly languages, scripting languages, etc. Visualization application 226 may be implemented as a Web application.

Visualization application 226 may be integrated with other analytic tools including model tuning application 222 and selection manager application 312. As an example, visualization application 226 may be part of an integrated data analytics software application and/or software architecture such as that offered by SAS Institute Inc. of Cary, N.C., USA. For example, visualization application 226 may be integrated with SAS® Viya™ and SAS® Visual Analytics.

Referring again to FIG. 3, fewer, different, or additional components may be incorporated into selection manager device 104. Second input interface 302 provides the same or similar functionality as that described with reference to input interface 202 of user device 200 though referring to selection manager device 104. Second output interface 304 provides the same or similar functionality as that described with reference to output interface 204 of user device 200 though referring to selection manager device 104. Second communication interface 306 provides the same or similar functionality as that described with reference to communication interface 206 of user device 200 though referring to selection manager device 104. Data and messages may be transferred between selection manager device 104 and/or user device 200 and session manager device 400 using second communication interface 306. Second computer-readable medium 308 provides the same or similar functionality as that described with reference to computer-readable medium 208 of user device 200 though referring to selection manager device 104. Second processor 310 provides the same or similar functionality as that described with reference to processor 210 of user device 200 though referring to selection manager device 104.

Selection manager application 312 performs operations associated with selecting sets of hyperparameter configurations to evaluate for the model type based on inputs provided from user device 200. Selection manager application 312 requests that the computing devices of worker system 106 generate a model for each hyperparameter configuration in the selected sets of hyperparameter configurations. The operations may be implemented using hardware, firmware, software, or any combination of these methods. Referring to the example embodiment of FIG. 3, selection manager application 312 is implemented in software (comprised of computer-readable and/or computer-executable instructions) stored in second computer-readable medium 308 and accessible by second processor 310 for execution of the instructions that embody the operations of selection manager application 312. Selection manager application 312 may be written using one or more programming languages, assembly languages, scripting languages, etc. Selection manager application 312 may be implemented as a Web application.

Selection manager application 312 may be integrated with other analytic tools. As an example, selection manager application 312 may be part of an integrated data analytics software application and/or software architecture such as that offered by SAS Institute Inc. of Cary, N.C., USA. For example, selection manager application 312 may be part of SAS® Enterprise Miner™ and/or SAS® Viya™.

Referring again to FIG. 4A, fewer, different, and additional components may be incorporated into session manager device 400. Each session manager device 400 of each session of worker system 106 may include the same or different components or combination of components.

Third input interface 402 provides the same or similar functionality as that described with reference to input interface 202 of user device 200 though referring to session manager device 400. Third output interface 404 provides the same or similar functionality as that described with reference to output interface 204 of user device 200 though referring to session manager device 400. Third communication interface 406 provides the same or similar functionality as that described with reference to communication interface 206 of user device 200 though referring to session manager device 400. Data and messages may be transferred between session manager device 400 and another computing device of worker system 106 and/or selection manager device 104 using third communication interface 406. Third computer-readable medium 408 provides the same or similar functionality as that described with reference to computer-readable medium 208 of user device 200 though referring to session manager device 400. Third processor 410 provides the same or similar functionality as that described with reference to processor 210 of user device 200 though referring to session manager device 400.

Model manager application 412 may be integrated with other analytic tools. As an example, model manager application 412 may be part of an integrated data analytics software application and/or software architecture such as that offered by SAS Institute Inc. of Cary, N.C., USA. For example, model manager application 412 may be part of SAS® Enterprise Miner™ and/or SAS® Viya™.

Referring again to FIG. 4B, fewer, different, and additional components may be incorporated into session worker device 420. Each session worker device 420 of each session of worker system 106 may include the same or different components or combination of components.

Fourth input interface 422 provides the same or similar functionality as that described with reference to input interface 202 of user device 200 though referring to session worker device 420. Fourth output interface 424 provides the same or similar functionality as that described with reference to output interface 204 of user device 200 though referring to session worker device 420. Fourth communication interface 426 provides the same or similar functionality as that described with reference to communication interface 206 of user device 200 though referring to session worker device 420. Data and messages may be transferred between session worker device 420 and another computing device of the associated session of worker system 106 and/or session manager device 400 using fourth communication interface 426. Fourth computer-readable medium 428 provides the same or similar functionality as that described with reference to computer-readable medium 208 of user device 200 though referring to session worker device 420. Fourth processor 430 provides the same or similar functionality as that described with reference to processor 210 of user device 200 though referring to session worker device 420.

Model worker application 432 may be integrated with other analytic tools and may be integrated with model manager application 412 to generate a predictive model using the input dataset distributed across the worker computing devices of each session. As an example, model worker application 432 may be part of an integrated data analytics software application and/or software architecture such as that offered by SAS Institute Inc. of Cary, N.C., USA. For example, model worker application 432 may be part of SAS® Enterprise Miner™ and/or SAS® Viya™.

Model tuning application 222, selection manager application 312, model manager application 412, model worker application 432, and/or visualization application 226 may be the same or different applications that are integrated in various manners to select a hyperparameter configuration for a predictive model type using the input dataset divided into the training dataset and the validation dataset in a single computing device, distributed across a plurality of threads, and/or distributed across a plurality of computing devices.

The input dataset may include, for example, a plurality of rows and a plurality of columns. The plurality of rows may be referred to as observation vectors or records (observations), and the columns may be referred to as variables. The input dataset may be transposed. The input dataset may include supervised and/or unsupervised data. The plurality of variables may define multiple dimensions for each observation vector. An observation vector $x_i$ may include a value for each of the plurality of variables associated with the observation i. Each variable of the plurality of variables may describe a characteristic of a physical object. For example, if the input dataset includes data related to operation of a vehicle, the variables may include an oil pressure, a speed, a gear indicator, a gas tank level, a tire pressure for each tire, an engine temperature, a radiator level, etc. The input dataset may include data captured as a function of time for one or more physical objects. As another example, the input dataset may include data related to images, where each row includes the pixels that define a single image. The images may be of any item for which image recognition or classification may be performed including, but not limited to, faces, objects, alphanumeric letters, terrain, plants, animals, etc.

The data stored in the input dataset may be generated by and/or captured from a variety of sources including one or more sensors of the same or different type, one or more computing devices, etc. The data stored in the input dataset may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

The input dataset may be stored on computer-readable medium 208, on second computer-readable medium 308, on third computer-readable medium 408, and/or on fourth computer-readable medium 428, and/or on one or more computer-readable media accessible by model manager application 412 using third communication interface 406 and/or third input interface 402 or accessible by model worker application 432 using fourth communication interface 426 and/or fourth input interface 422. Data stored in the input dataset may be sensor measurements or signal values captured by a sensor such as a camera, may be generated or captured in response to occurrence of an event or a transaction, generated by a device such as in response to an interaction by a user with the device, etc. The data stored in the input dataset may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in the input dataset may be captured at different time points periodically, intermittently, when an event occurs, etc. One or more columns of the input dataset may include a time and/or date value.

The input dataset may include data captured under normal operating conditions of the physical object. The input dataset may include data captured at a high data rate such as 200 or more observations per second for one or more physical objects. For example, data stored in the input dataset may be generated as part of the Internet of Things (IoT), where things (e.g., machines, devices, phones, sensors) can be connected to networks and the data from these things collected and processed within the things and/or external to the things before being stored in the input dataset. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in the input dataset.

The input dataset may be stored using various structures as known to those skilled in the art including one or more files of a file system, a relational database, one or more tables of a system of tables, a structured query language database, etc. Each session manager device 400 may coordinate access to the input dataset that is distributed across the session worker devices of the associated session that may include zero or more session worker devices. For example, the input dataset may be stored in a cube distributed across the computing devices of each session that is a grid of computers as understood by a person of skill in the art. As another example, the input dataset may be stored across the computing devices of each session that form a multi-node Hadoop® cluster. For instance, Apache™ Hadoop® is an open-source software framework for distributed computing supported by the Apache Software Foundation. As another example, the input dataset may be stored across the computing devices of each session that form a cloud of computers and may be accessed using cloud computing technologies, as understood by a person of skill in the art. The SAS® LASR™ Analytic Server may be used as an analytic platform to enable multiple users to concurrently access data stored in the input dataset. The SAS® Viya™ open, cloud-ready, in-memory architecture also may be used as an analytic platform to enable multiple users to concurrently access data stored in the input dataset. SAS Cloud Analytic Services (CAS) may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 5A:
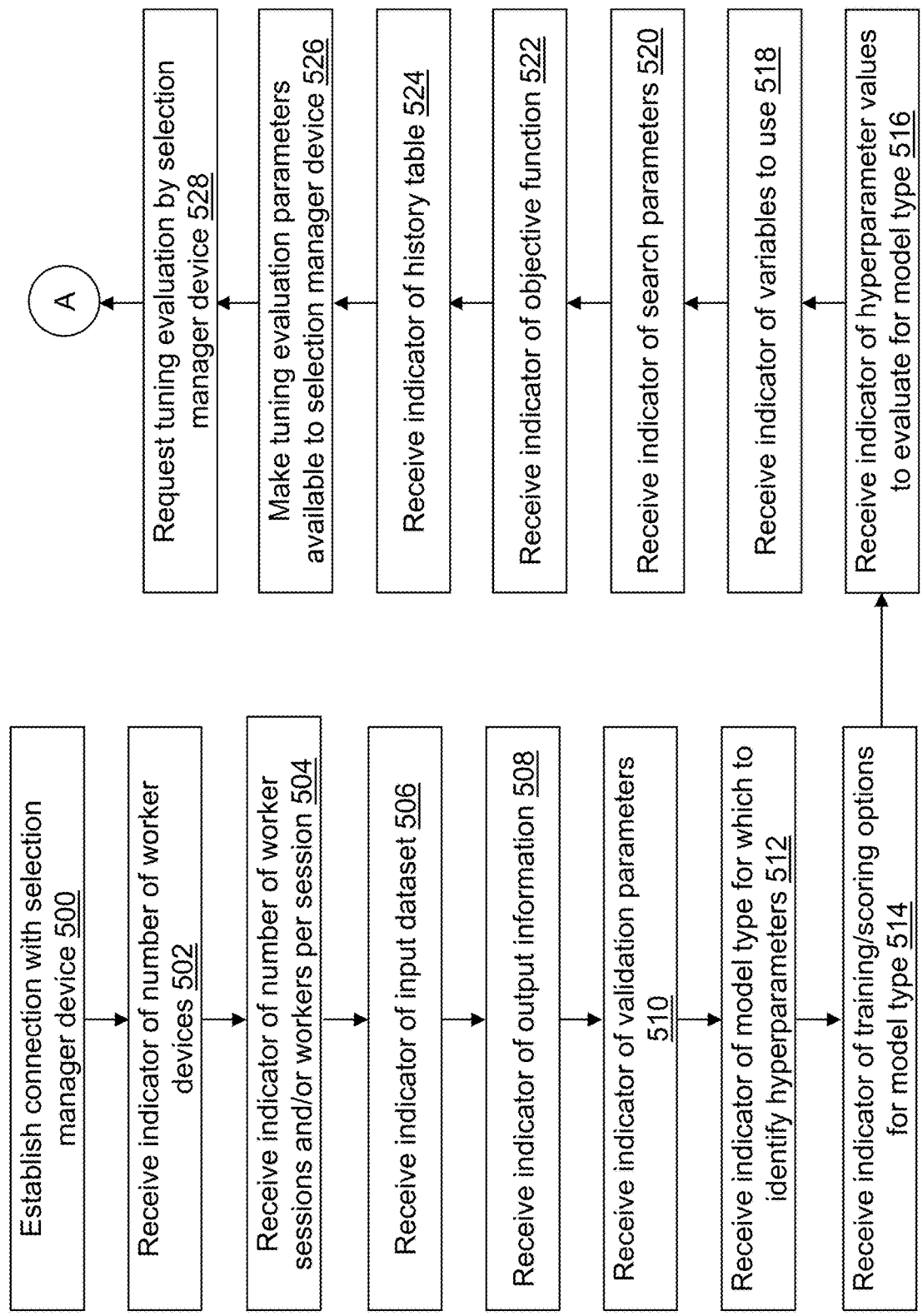
FIGS. 5A and 5B depict a flow diagram illustrating examples of operations performed by the user device of FIG. 2 to control initiation of a tuning process in accordance with an illustrative embodiment.
Figure 5B:
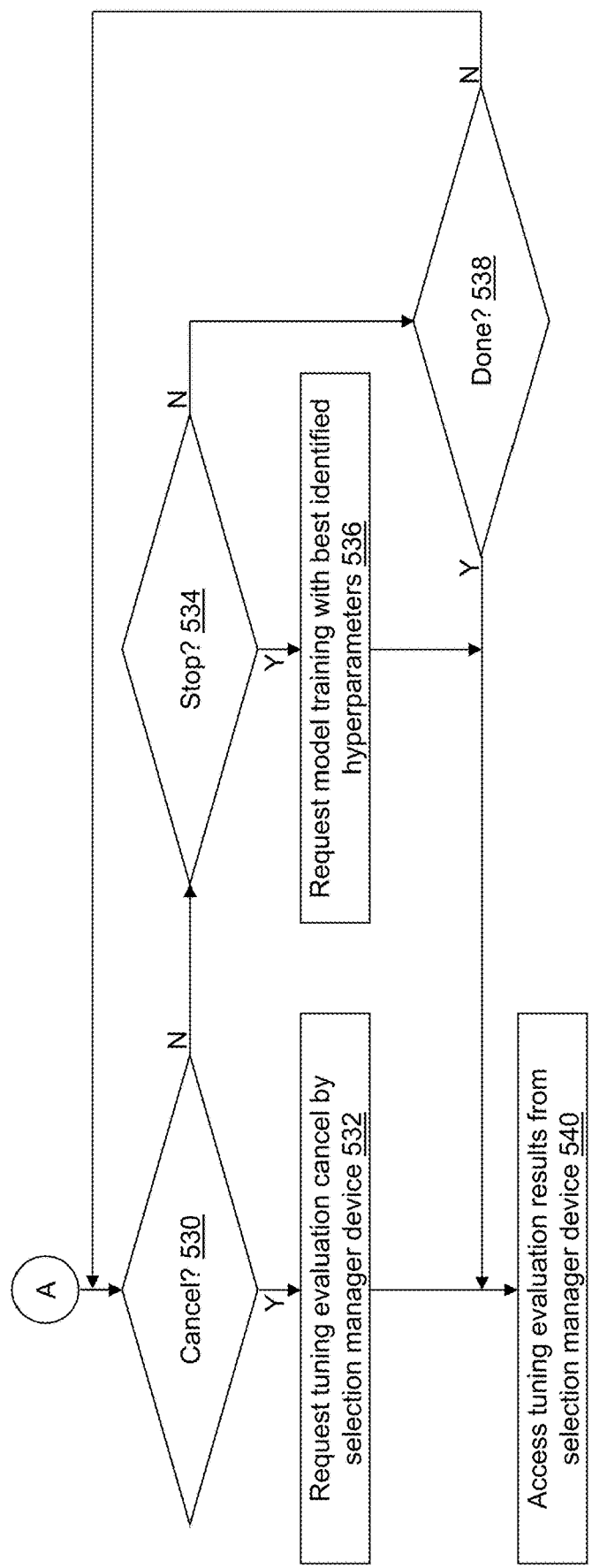

Referring to FIGS. 5A and 5B, example operations associated with model tuning application 222 are described. Additional, fewer, or different operations may be performed depending on the embodiment. The order of presentation of the operations of FIGS. 5A and 5B is not intended to be limiting. A user can interact with one or more user interface windows presented to the user in a display under control of model tuning application 222 independently or through a browser application in an order selectable by the user. Although some of the operational flows are presented in sequence, the various operations may be performed in various repetitions, concurrently, and/or in other orders than those that are illustrated. For example, a user may execute model tuning application 222, which causes presentation of a first user interface window, which may include a plurality of menus and selectors such as drop down menus, buttons, text boxes, hyperlinks, etc. associated with model tuning application 222 as understood by a person of skill in the art. As further understood by a person of skill in the art, various operations may be performed in parallel, for example, using a plurality of threads or a plurality of computing devices such as a grid or a cloud of computing devices.

In an operation 500, a connection is established with selection manager device 104. User device 200 accepts commands from a user and relays necessary instructions to selection manager device 104.

In an operation 502, a first indicator may be received that indicates a value of $N_W$ the number of computing devices or nodes of worker system 106 that may include selection manager device 104 (for example, the same or another indicator may indicate whether to include selection manager device 104 or it may or may not be included by default). The first indicator may further indicate whether selection manager device 104 is configured in a single-machine mode or a distributed mode. In an alternative embodiment, the first indicator may not be received. For example, a default value may be stored, for example, in computer-readable medium 208 and used automatically. In another alternative embodiment, $N_W$ may not be selectable. Instead, a fixed, predefined value may be used. The value further may be automatically determined based on a number of computing devices connected to selection manager device 104.

Single-machine mode is a computing model in which multiple processors or multiple cores are controlled by a single operating system and can access shared resources, such as disks and memory. Single-machine mode refers to an application running multiple concurrent threads on a multi-core machine to take advantage of parallel execution on selection manager device 104. More simply, single-machine mode means multithreading on selection manager device 104. Single-machine mode uses the number of CPUs (cores) on selection manager device 104 to determine the number of concurrent threads. For example, one thread per core may be used though a number of threads on any computing device may be changed under control of the user. A grid host may be specified for a distributed mode and identify a domain name system (DNS) or IP address of selection manager device 104, when selection manager device 104 is a separate device from user device 200.

In an operation 502, a second indicator may be received that indicates the value of $N_s$ the number of the one or more sessions and/or the value of M the number of computing devices included in each session. Within each session, when a train or score action is executed, each computing device of that session also may use multiple threads. In an alternative embodiment, the second indicator may not be received. For example, default values may be stored, for example, in computer-readable medium 208 and used automatically. In another alternative embodiment, M or $N_s$ may not be selectable. Instead, a fixed, predefined value may be used. The value(s) further may be automatically determined based on $N_W$ and other criteria as described further below such that the user does not specify either or one of $N_s$ the number of the one or more sessions and M the number of computing devices included in each session.

In an operation 506, a third indicator may be received that indicates the input dataset. For example, the first indicator indicates a location and a name of the input dataset. As an example, the first indicator may be received by model tuning application 222 after selection from a user interface window or after entry by a user into a user interface window.

In an operation 508, a fourth indicator may be received that provides output information that describes an output to be captured from execution of model tuning application 222 in combination with selection manager application 312. For example, the fourth indicator indicates a location and a name of model data 316 and/or of selected model data 318 that may include one or more tables of data. As an example, the fourth indicator may be received by model tuning application 222 after selection from a user interface window or after entry by a user into a user interface window. In an alternative embodiment, the location and the name of model data 316 and/or of selected model data 318 may not be selectable. Instead, tables are created by default in a default location automatically.

Example tables include a "Tuner Information" output table that summarizes values of options specified by the user to control execution of model tuning application 222; a "Tuner Results" output table that includes a default configuration and up to ten of the best identified hyperparameter configurations (based on an extreme (minimum or maximum) objective function value) identified, where each configuration listed includes the hyperparameter values and objective function value for comparison; a "Tuner Evaluation History" output table that includes all of the hyperparameter configurations evaluated, where each configuration listed includes the hyperparameter values and objective function value for comparison; a "Best Configuration" output table that includes values of the hyperparameters and the objective function value for the best identified configuration; a "Tuner Summary" output table that includes statistics about execution of the tuning process; a "Tuner Task Timing" output table that includes timing information about the different tasks performed during the tuning process; and a trained model output that includes information to execute the model generated using the input dataset with the best identified hyperparameter configuration.

For example, the trained model output includes information to execute the model generated using the input dataset with the best identified hyperparameter configuration that may be saved in selected model data 318 and used to score a second dataset 1724 (shown referring to FIG. 17) as discussed further below. For illustration, selected model data 318 may be stored using the SAS ASTORE format developed and provided by SAS Institute Inc. of Cary, N.C., USA for faster in-memory scoring. The other output tables may be stored in model data 316 or another location as specified by the user. For example, one or more of the output tables may be selected by the user for presentation on display 216. As another option, the fourth indicator is not received, and the output is generated automatically.

In an operation 510, a fifth indicator may be received that provides validation parameters that describe a validation process to be used by each session of worker system 106. For example, the fifth indicator may include a fraction value for a fraction of the input dataset to be used for validation or the number of folds F for cross-validation. In an alternative embodiment, the fifth indicator may not be received. For example, a default value may be stored, for example, in computer-readable medium 208 and used automatically. In another alternative embodiment, a fixed, predefined value may be used for the fraction value unless the number of folds F is defined by the user. In cross validation, each model evaluation requires F−1 number of training executions and scoring executions with different training subsets as discussed previously. Thus, the evaluation time is increased by approximately a factor of F−1. For small to medium sized input datasets or for unbalanced input datasets, cross validation provides on average a better representation of error across the entire input dataset.

In an operation 512, a sixth indicator of a model type for which to identify a best identified hyperparameter configuration may be received. For example, the sixth indicator indicates a name of a model type. The sixth indicator may be received by training application 122 after selection from a user interface window or after entry by a user into a user interface window. As an example, a model type may be selected from "Decision Tree", "Factorization Machine", "Forest", "Gradient Boosting Tree", "Neural Network", "Support Vector Machine", etc. The model type may be labeled or selected in a variety of different manners by the user as understood by a person of skill in the art. In an alternative embodiment, the model type may not be selectable, and a single model type is implemented in training application 122.

The Decision Tree model type automatically adjusts decision tree hyperparameters to tune a decision tree model for minimum error as measured by a specified objective function. For illustration, a tuneDecisionTree action selects different hyperparameter configurations to run a dtreeTrain action, optionally a dtreePrune action, and a dtreeScore action (an assess action may be run after each dtreeScore action) multiple times to train and validate a decision tree model as it searches for a model that has reduced validation error. For illustration, the tuneDecisionTree action, the dtreeTrain action, the dtreePrune action, and the dtreeScore action are included in SAS® Viya™ and SAS® CAS.

The Forest model type automatically adjusts forest hyperparameters to tune a Forest model for minimum error as measured by a specified objective function. The Forest model type creates a decision tree recursively by choosing an input variable and using it to create a rule to split the data into two or more subsets. The process is repeated in each subset, and again in each new subset, and so on until a constraint is met. In the terminology of the tree metaphor, the subsets are nodes, the original data table is a root node, and final unpartitioned subsets are leaves or terminal nodes. A node is an internal node if it is not a leaf. The data in a leaf determine estimates of the value of the target variable. These estimates are subsequently applied to predict the target of a new observation that is assigned to the leaf.

For illustration, a FOREST procedure included in SAS® Visual Data Mining and Machine Learning 8.1 may be used to implement the forest model type in SAS® Viya™. The FOREST procedure creates a predictive model called a forest, which consists of several decision trees, in SAS Viya. The FOREST procedure creates multiple decision trees that differ from each other in two ways: 1) the training data for each tree constitutes a different sample, and each sample is created by sampling, with replacement, observations from the original training data of the forest, and 2) the input variables that are considered for splitting a node are randomly selected from all available inputs. Among these randomly selected variables, the FOREST procedure chooses a single variable, which is associated the most with the target, when it forms a splitting rule. The FOREST procedure creates an ensemble of decision trees to predict a single target of either interval or nominal measurement level. An input variable can have an interval or nominal measurement level.

For illustration, an "autotune" statement used with the FOREST procedure included in SAS® Visual Data Mining and Machine Learning 8.1 may be used to evaluate different hyperparameter configurations and to select the best identified configuration of hyperparameter values for the forest model type. A tuneForest action selects different hyperparameter configurations to run a forestTrain action and a forestScore action multiple times to train and validate the forest model as it searches for a model that has reduced validation error. For illustration, the tuneForest action, the forestTrain action, and the forestScore action are included in SAS® Viya™ and SAS® CAS.

The Factorization Machine model type automatically adjusts factorization machine parameters to tune a factorization machine model for minimum error as measured by a specified objective function. For illustration, a FACTMAC procedure included in SAS® Visual Data Mining and Machine Learning 8.1 may be used to implement the factorization machine model type in SAS® Viya™. The Factorization Machine model type generalizes a matrix factorization. The FACTMAC procedure estimates factors for each of the nominal input variables specified, in addition to estimating a global bias and a bias for each level of the nominal input variables. An interval target variable is also specified. The FACTMAC procedure computes the biases and factors by using a stochastic gradient descent (SGD) algorithm that minimizes a root mean square error (RMSE) criterion.

For illustration, an "autotune" statement used with the FACTMAC procedure included in SAS® Visual Data Mining and Machine Learning 8.1 may be used to evaluate different hyperparameter configurations and to select the best identified configuration of hyperparameter values for the factorization machine model type. A tuneFactmac action selects different hyperparameter configurations to run the factmac action of the factmac action set, the score action of the astore action set, and the assess action of the percentile action set to train and validate factorization machine models as it searches for a model that has reduced validation error. For illustration, the factmac action, the score action, and the assess action are included in SAS® Viya™ and SAS® CAS.

The Gradient Boosting Tree model type automatically adjusts gradient boosting tree parameters to tune a gradient boosting tree model for minimum error as measured by a specified objective function. The Gradient Boosting Tree model type consists of multiple decision trees. For illustration, a GRADBOOST procedure included in SAS® Visual Data Mining and Machine Learning 8.1 may be used to implement the Gradient Boosting Tree model type in SAS® Viya™. The GRADBOOST procedure creates a predictive model called a gradient boosting tree model in SAS Viya. The GRADBOOST procedure creates a predictive model by fitting a set of additive trees.

For illustration, an "autotune" statement used with the GRADBOOST procedure included in SAS® Visual Data Mining and Machine Learning 8.1 may be used to evaluate different hyperparameter configurations and to select the best identified configuration of hyperparameter values for the gradient boosting tree model type. A tuneGradientBoostTree action selects different hyperparameter configurations to run the gbtreeTrain and gbtreeScore actions multiple times to train and validate gradient boosting tree models as it searches for a model that has reduced validation error. For illustration, the gbtreeTrain and gbtreeScore actions are included in the decisionTree action set of SAS® Viya™ and SAS® CAS.

The Neural Network model type automatically adjusts neural network parameters to tune a neural network model for minimum error as measured by a specified objective function. For illustration, a NNET procedure included in SAS® Visual Data Mining and Machine Learning 8.1 may be used to implement the Neural Network model type in SAS® Viya™. The NNET procedure trains a multilayer perceptron neural network. Training a multilayer perceptron neural network relies on an unconstrained minimization of a nonlinear objective function.

For illustration, an "autotune" statement used with the NNET procedure included in SAS® Visual Data Mining and Machine Learning 8.1 may be used to evaluate different hyperparameter configurations and to select the best identified configuration of hyperparameter values for the neural network model type. A tuneNeuralNet action selects different hyperparameter configurations to run the annTrain and annScore actions multiple times to train and validate neural network models as it searches for a model that has reduced validation error. For illustration, the annTrain and annScore actions are included in the neuralNet action set of SAS® Viya™ and SAS® CAS.

The Support Vector Machine model type automatically adjusts support vector machine parameters to tune a support vector machine model for minimum error as measured by a specified objective function. For illustration, a SVMACHINE procedure included in SAS® Visual Data Mining and Machine Learning 8.1 may be used to implement the Support Vector Machine model type in SAS® Viya™. The Support Vector Machine model type computes support vector machine learning classifiers for a binary pattern recognition problem. The SVMACHINE procedure uses both linear and low-degree polynomial kernels to conduct the computation.

For illustration, an "autotune" statement used with the SVMACHINE procedure included in SAS® Visual Data Mining and Machine Learning 8.1 may be used to evaluate different hyperparameter configurations and to select the best identified configuration of hyperparameter values for the support vector machine model type. A tuneSvm action selects different hyperparameter configurations to run the svmTrain action of the svm action set, the score action of the astore action set, and the assess action of the percentile action set to train and validate support vector machine models as it searches for a model that has reduced validation error. For illustration, the svmTrain action is included in the svm action set of SAS® Viya™ and SAS® CAS.

In an operation 514, a seventh indicator may be received that defines values for one or more variables associated with training the selected model type and/or values for one or more variables associated with scoring the selected model type.

In an operation 516, an eighth indicator may be received that defines values for one or more of the hyperparameters to evaluate based on the selected model type. Using the eighth indicator, the user may identify one or more of the hyperparameters to exclude from the evaluation such that a single value is used for that hyperparameter when selecting values for each hyperparameter configuration. When a hyperparameter is excluded, a default value defined for the hyperparameter may be used for each hyperparameter configuration. Using the eighth indicator, the user may select one or more of the hyperparameters to evaluate using a lower bound value, an upper bound value, and an iteration value and/or a specific value instead of the default value. Using the eighth indicator, the user may identify one or more of the hyperparameters to evaluate using a list of possible values instead of a range of default values. Using the eighth indicator, the user may identify one or more of the hyperparameters to evaluate using default bounds and initial values. Illustrative hyperparameters are described below for each illustrative model type though a greater or a fewer number and types of hyperparameters may be defined for each model type in alternative embodiments.

For example, the decision tree model type hyperparameters may include a maximum number of decision tree levels (maxlevel), a number of bins to use for numeric variables during calculation of the decision tree (nbins), and a split criterion for each tree node (criterion). A value for each of these hyperparameters is defined in each hyperparameter configuration for the decision tree model type. The methodology by which the values are determined is based on the tuning search method discussed further below and the values, if any, indicated in operation 516.

For example, the factorization machine model type hyperparameters may include a number of factors (nfactors), a learning step (learnstep), and a maximum number of iterations (maxiter). A value for each of these hyperparameters is defined in each hyperparameter configuration for the factorization machine model type. The methodology by which the values are determined is based on the tuning search method discussed further below and the values, if any, indicated in operation 516.

For example, the forest model type hyperparameters may include a fraction (bootstrap) of a random bootstrap sample of the training data to be used for growing each tree in the forest, where the fraction is a value between 0 and 1 with a default value of 0.6. The forest model type hyperparameters further may include a maximum depth (maxlevel) of a decision tree to be grown where a number of levels in a tree is equal to a depth value plus one. A default value for the maximum depth may be 20. The forest model type hyperparameters further may include a number of trees (ntrees) to grow, which by default may be equal to 100. The forest model type hyperparameters further may include a number of input variables (vars_to_try) to consider splitting on in a node, where the value is between one and a number of input variables with a default value equal to a square root of the number of input variables. A value for each of these hyperparameters is defined in each hyperparameter configuration for the forest model type. The methodology by which the values are determined is based on the tuning search method discussed further below and the values, if any, indicated in operation 516.

For example, the gradient boosting tree model type hyperparameters may include an L1 norm regularization parameter (lasso) that is greater than or equal to zero with a default value of zero. The gradient boosting tree model type hyperparameters further may include a learning rate (learningrate) that is between zero and one, inclusive, with a default value of 0.1. The gradient boosting tree model type hyperparameters further may include a number of trees (ntrees) to grow with a default value of 100. The gradient boosting tree model type hyperparameters further may include an L2 norm regularization parameter (ridge) that is greater than or equal to zero with a default value of zero. The gradient boosting tree model type hyperparameters further may include a fraction (samplingrate) of the training data to be used for growing each tree with a default value of 0.5. The gradient boosting tree model type hyperparameters further may include a number of input variables (vars_to_try) to consider splitting on in a node where the value is between one and a number of input variables with a default value equal to the number of input variables. A value for each of these hyperparameters is defined in each hyperparameter configuration for the gradient boosting tree model type. The methodology by which the values are determined is based on the tuning search method discussed further below and the values, if any, indicated in operation 516.

For example, the neural network model type hyperparameters may include a range of an annealing rate (annealingrate) to use when a SGD algorithm is used for training. The neural network model type hyperparameters further may include a learning rate (learningrate) when the SGD algorithm is used for training. The neural network model type hyperparameters further may include a number of hidden layers (nhidden) in the network between zero and five with a default value of two. The neural network model type hyperparameters further may include tuning information for neurons in the ith hidden layer, where i is any integer between one and five, inclusive. The neural network model type hyperparameters further may include an L1 norm regularization parameter (regL1) that is greater than or equal to zero with a default value of zero. The neural network model type hyperparameters further may include an L2 norm regularization parameter (regL2) that is greater than or equal to zero with a default value of zero. A value for each of these hyperparameters is defined in each hyperparameter configuration for the neural network model type. The methodology by which the values are determined is based on the tuning search method discussed further below and the values, if any, indicated in operation 516.

For example, the support vector machine model type hyperparameters may include a penalty value (C) that is greater than zero. The support vector machine model type hyperparameters further may include a degree value (degree) that can be between one and three, inclusive. The degree value equal to one is used in a linear kernel. The degree value equal to two or three is used in a polynomial kernel. A value for each of these hyperparameters is defined in each hyperparameter configuration for the support vector machine model type. The methodology by which the values are determined is based on the tuning search method discussed further below and the values, if any, indicated in operation 516.

Table 1 below summarizes the hyperparameters for each model type and the default values or range of values that may be used unless different values are indicated in operation 516:

TABLE 1

| Hyperparameter | Initial Value | Lower Bound | Upper Bound |
| --- | --- | --- | --- |
| Decision Tree (PROC TREESPLIT) | | | |
| maxlevel | 10 | 1 | 19 |
| nbins | 20 | 20 | 200 |
| criterion | GAIN (nominal target) VARIANCE (interval target) | GAIN, IGR, GINI, CHISQUARE, CHAID (nominal target) VARIANCE, FTEST, CHAID (interval target) | |
| Forest (PROC FOREST) | | | |
| ntrees | 100 | 20 | 150 |
| vars_to_try | sqrt(# inputs) | 1 | # inputs |
| bootstrap | 0.6 | 0.1 | 0.9 |
| maxlevel | 20 | 1 | 29 |
| nbins | 50 | 20 | 100 |
| Gradient Boosting Tree (PROC GRADBOOST) | | | |
| ntrees | 100 | 20 | 150 |
| vars_to_try | # inputs | 1 | # inputs |
| learningrate | 0.1 | 0.01 | 1.0 |
| samplingrate | 0.5 | 0.1 | 1.0 |
| lasso | 0.0 | 0.0 | 10.0 |
| ridge | 0.0 | 0.0 | 10.0 |
| maxlevel | 5 | 2 | 7 |
| nbins | 50 | 20 | 100 |

TABLE 1-continued

| Hyperparameter | Initial Value | Lower Bound | Upper Bound |
| --- | --- | --- | --- |
| Neural Network (PROC NNET) | | | |
| nhidden | 0 | 0 | 5 |
| nunits1, . . . ,5 | 1 | 1 | 100 |
| regL1 | 0 | 0 | 10.0 |
| regL2 | 0 | 0 | 10.0 |
| learningrate | 1 E-3 | 1E-6 | 1 E-1 |
| annealingrate | 1 E-6 | 1E-13 | 1 E-2 |
| Support Vector Machine (PROC SVMACHINE) | | | |
| C | 1.0 | 1E-10 | 100.0 |
| degree | 1 | 1 | 3 |
| Factorization Machine (PROC FACTMAC) | | | |
| nfactors | 5 | | 5, 10, 15, 20, 25, 30 |
| maxiter | 30 | | 10, 20, 30, . . . , 200 |
| learnstep | 1 E-3 | | 1 E-6, 1 E-5, 1 E-4, 1 E-3, 1 E-2, 1 E-1, 1.0 |

For illustration, a syntax for specifying custom definitions of hyperparameters to tune is TUNINGPARAMETERS= (<suboption><suboption> . . . ) where each <suboption> is specified as: <hyperparameter name> (LB=LB_number UB=UB_number VALUES=value-list INIT=INIT_number EXCLUDE), where LB_number indicates a lower bound value that overrides the default lower bound value, UB_number indicates an upper bound value that overrides the default upper bound value, value-list indicates a list of values to try, INIT_number indicates an initial value to use in training a baseline model, and EXCLUDE indicates whether to exclude the hyperparameter from the tuning evaluation by using a fixed value specified for the hyperparameter or the default value if none is specified.

In an operation 518, a ninth indicator may be received that indicates a plurality of variables of the input dataset to define $x_i$. The ninth indicator may indicate that all or only a subset of the variables stored in the input dataset be used to define model data 316. For example, the ninth indicator indicates a list of variables to use by name, column number, etc. In an alternative embodiment, the ninth indicator may not be received. For example, all of the variables may be used automatically. A variable type may also be defined for each variable. Illustrative variable types include interval and nominal. For example, interval may indicate a numeric variable; whereas, nominal indicates a categorical variable. Additionally, depending on the model type selected in operation 512, a target variable of the plurality of variables may be indicated by the ninth indicator. For illustration, the neural network model type does not use a target variable; whereas, for the forest model type, a target variable indicates which variable the model predicts. As another option, the target variable may by default be a variable associated with a last column of the input dataset. Depending on the model type selected in operation 512, a minimum number of certain types of variable types may be required. For example, for the factorization machine model type at least two nominal input variables may be required and a target variable of interval type may be required. The factorization machine model type is trained to predict a value of the target variable.

In an operation 520, a tenth indicator may be received that defines values for one or more search parameters. The tenth indicator may be received by training application 122 after selection from a user interface window or after entry by a user into a user interface window. For example, a maximum number of configuration evaluations (MAXEVALS), a maximum number of iterations (MAXITER), a maximum time (MAXTIME), and/or a maximum number of configurations to evaluate in a single iteration may be defined by the tenth indicator. Table 2 below summarizes illustrative default and allowed values for the one or more search parameters:

TABLE 2

| Option | Default Value | Allowed Values |
|---|---|---|
| MAXEVALS | 50 | [3 – ∞] |
| MAXITER | 5 | [1 – ∞] |
| MAXTIME | 36,000 | [1 – ∞] |

A tuning search method used to identify a best identified hyperparameter configuration further may be received using the tenth indicator. For example, the tenth indicator indicates a name of one or more tuning search methods. The one or more tuning search methods may be indicated to run simultaneously and/or successively. When executed successively, objective function values from one or more previous iterations are used to determine a next iteration of a set of hyperparameter configurations to be evaluated.

A default value for the tuning search method may further be stored, for example, in computer-readable medium 208. As an example, the one or more tuning search methods may be selected from "Grid", "Random", "Latin Hypercube Sampling (LHS)", "Genetic Algorithm (GA)", "Genetic Set Search (GSS)", "Bayesian", "DIRECT", "Nelder-Mead Simplex", "DIRECT/Nelder-Mead Hybrid", "Random+GA", "Random+GA/GSS", "Random+Bayesian", "LHS+GA", "LHS+GA/GSS", "LHS+Bayesian", etc. In the illustrative selections, "+" indicates a successive execution. Simultaneous execution may be indicated by a comma delimited list of tuning search method selections such as "LHS, GA1, Bayesian". Multiple search methods of the same search method type may be defined with different parameter values. For example, "LHS,LHS" may be specified. The tenth indicator may further include one or more tuning search parameter values associated with each indicated tuning search method. For example, a random seed value may be specified for each search method that may be the same for all search methods or may be defined separately for each search method.

A default tuning search method may be the "LHS+GA/GSS" tuning search method in which an LHS search method is used to generate a first set of hyperparameter configurations that are each executed to generate an objective function value using the objective function indicated in an operation 522. The objective function values and the hyperparameter configuration associated with each are used to initialize a GA search method. Each population of the GA search method may be enhanced with a "growth step" in which a GSS search method is used to locally improve some of the more promising members of the GA population. Of course, the tuning search method may be labeled or selected in a variety of different manners by the user as understood by a person of skill in the art. In an alternative embodiment, the one or more tuning search methods may not be selectable, and a single tuning search method is implemented in training application 122. For example, the "LHS+GA/GSS" tuning search method may be used by default or without allowing a selection.

For illustration, the Grid search method generates uniform hyperparameter values across the range of each hyperparameter and combines them across hyperparameters. If the Grid search method is selected, a grid size (number of samples value) may be specified for all or for each hyperparameter that defines the size of the grid and therefore, the number of hyperparameter configurations to evaluate in a single iteration.

For illustration, the Random search method randomly generates hyperparameter values across the range of each hyperparameter and combines them across hyperparameters. If the Random search method is selected, a sample size value may be specified for all or for each hyperparameter that defines the number of hyperparameter configurations to evaluate in a single iteration.

For illustration, the LHS search method generates uniform hyperparameter values across the range of each hyperparameter and randomly combines them across hyperparameters. If the hyperparameter is continuous or discrete with more levels than a requested sample size, a uniform set of samples is taken across the hyperparameter range including a lower and an upper bound. If the hyperparameter is discrete with fewer levels than the requested sample size, each level is repeated an equal number of times across the set of hyperparameter configurations determined by the LHS search method. If a last set of hyperparameter configurations is less than the number of levels, the last set of values for the hyperparameter is uniformly sampled across the set of levels given the remaining set size. The samples for each hyperparameter are randomly shuffled so that the combination of hyperparameters is random—the first values for each hyperparameter are combined, followed by all the second values, etc. This LHS search method ensures that the lower and upper bounds of the hyperparameter tuning range are included, and for discrete hyperparameters with a number of levels less than the requested sample size, the levels are sampled evenly with the possible exception of the last set of values when the number of samples is not evenly divisible by the number of levels. If the LHS search method is selected, a sample size and a random interval flag may be specified. The sample size defines the number of hyperparameter configurations to evaluate in a single iteration. The random interval flag defines a Boolean option value to randomize samples for continuous hyperparameter values within each LHS interval For illustration, the GA search method defines a family of local search algorithms that seek optimal solutions to problems by applying the principles of natural selection and evolution. A GA search method can be applied to almost any optimization search problem and is especially useful for problems for which other calculus-based techniques do not work, such as when the objective function has many local optima, when the objective function is not differentiable or continuous, or when solution elements are constrained to be integers or sequences. In most cases, genetic algorithms require more computation than specialized techniques that take advantage of specific problem structures or characteristics. However, for search problems for which no such techniques are available, genetic algorithms provide a robust general method of solution.

There are two competing factors to balance in the selection process of the GA search method: selective pressure and genetic diversity. Selective pressure, the tendency to select only the best identified hyperparameter values of the current generation to propagate to the next, is used to direct the GA search method to an optimum. Genetic diversity, the maintenance of a diverse solution population, is also used to ensure that the solution space is adequately searched, especially in early iterations. Too much selective pressure can lower the genetic diversity so that the global optimum is overlooked, and the GA search method converges prematurely. Yet, with too little selective pressure, the GA search method might not converge to an optimum in a reasonable amount of computing time. A proper balance between the selective pressure and genetic diversity is maintained so the GA search method converges in a reasonable time to a global optimum. A tournament selection process may be used to randomly choose a group of members from the current population, compare their fitness, and select the fittest from the group to propagate to the next generation. The selective pressure can be controlled by specifying the tournament size, the number of members chosen to compete in each tournament. Members of the current generation that have passed the selection process either go to a crossover operator or are passed unchanged into the next generation based on a pre-defined crossover probability. Members of the current generation that have passed the cross-over process either go to a mutation operator or are passed unchanged into the next generation based on a pre-defined mutation probability. If the GA search method is selected, a population size, a maximum number of generations, a number of global searches, a number of local searches, a heuristic flag, and a maximum number of iterations may be specified where the population size defines the number of hyperparameter configurations to evaluate each iteration. The heuristic flag indicates whether a no clone heuristic should be used.

For illustration, the GSS search method is designed for problems that have continuous variables and have the advantage that, in practice, they often require significantly fewer evaluations to converge than does a GA search method. Furthermore, a GSS search method can provide a measure of local optimality that is very useful in performing multimodal optimization. The GSS search method may add additional "growth steps" to the GA search method whenever the hyperparameter is a continuous variable. For example, a local search selection may include a small subset of hyperparameter values selected based on their fitness score and distance to other hyperparameter values and on pre-existing locally optimal hyperparameter values. A local search optimization may be applied such that the lower and upper bounds of the hyperparameter are modified to temporarily fix integer variables to their current setting. These additional growth steps may be performed each iteration to permit selected hyperparameter configurations of the population (based on diversity and fitness) to benefit from local optimization over the continuous variables. If only integer hyperparameters are present, the GSS search method may not be used to supplement the GA search method. An iteration of the GA search method may be performed before the GSS search method is started to identify additional hyperparameter configurations.

For illustration, the Bayesian search method is based on creating and exploring a Kriging surrogate model to search for improved solutions. A Kriging model is a type of interpolation algorithm for which the interpolated values are modeled by a Gaussian process governed by prior covariance values. The basic idea of Kriging is to predict the value of a function at a given point by computing a weighted average of the known values of the function in the neighborhood of the point. The method is mathematically closely related to regression analysis. The results from the previous iteration may be used to generate the initial Kriging model or update the previous Kriging model. The Bayesian search method may be used to generate new hyperparameter configurations (evaluation points) by exploring the model both using the DIRECT solver to find a global optimum of a surrogate model and by generating consecutive LHS points and calculating an acquisition function that accounts for the uncertainty of the surrogate model. If the Bayesian search method is selected, a population size, an initial LHS size for the Kriging model, a maximum number of points in the Kriging model, a number of trial points when optimizing the Kriging model using LHS sampling at each iteration, and a maximum number of iterations may be specified where the population size defines the number of hyperparameter configurations to evaluate each iteration.

For illustration, the DIRECT search method is an implicit branch and bound type algorithm that divides a hyperrectangle defined by variable bounds into progressively smaller rectangles where the relevance of a given rectangle is based on its diameter and the objective value at the center point. The former is used to quantify uncertainty, the latter is used to estimate the best identified value within. A pareto-set is maintained for these two quantities and used to select which of the hyper-rectangles to trisect at the next iteration. If the DIRECT search method is selected, an iteration size and a maximum number of iterations may be specified where the iteration size defines the number of hyperparameter configurations to evaluate each iteration.

For illustration, the Nelder-Mead Simplex search method is a variable shape simplex direct-search optimization method that maintains the objective values of the vertices of a polytope whose number is one greater than the dimension being optimized. It then predicts new promising vertices for the simplex based on current values using a variety of simplex transformation operations. If the Nelder-Mead Simplex search method is selected, an iteration size and a maximum number of iterations may be specified where the iteration size defines the number of hyperparameter configurations to evaluate each iteration.

For illustration, the DIRECT/Nelder-Mead Hybrid search method is a tightly coupled hybrid algorithm that uses DIRECT principles to divide and sort the feasible regions into a set of hyper-rectangles of varying dimension based on likelihood of containing a global minimizer. As the hyperrectangles are divided, the size of the rectangles as measured by the distance between its center and corners reduces. When this size is small enough, a Nelder-Mead optimization is created based on the small hyper-rectangle to further refine the search and the small hyper-rectangle is no longer considered for division. A best identified value found by a small hyper-rectangle's Nelder-Mead optimizer is used to represent that given rectangle. If the DIRECT/Nelder-Mead Hybrid search method is selected, an iteration size, a maximum number of iterations, and a rectangle size threshold value may be specified. The iteration size defines the number of hyperparameter configurations to evaluate each iteration. The rectangle size threshold value defines a threshold used to determine when the rectangle size is small enough to start Nelder-Mead optimization.

In an operation 522, an eleventh indicator of an objective function may be received. For example, the eleventh indicator indicates a name of an objective function. The objective function specifies a measure of model error (performance) to be used to identify a best identified configuration of the hyperparameters among those evaluated. The eleventh indicator may be received by training application 122 after selection from a user interface window or after entry by a user into a user interface window. A default value for the objective function may further be stored, for example, in computer-readable medium 208. As an example, an objective function may be selected from "ASE", "AUC", "F05", "F1", "GAMMA", "GINI", "KS", "MAE", "MCE", "MCLL", "MISC", "MSE", "MSLE", "RASE", "RMAE", "RMSLE", "TAU", etc. Some values can be specified only when the target variable is of a particular type. For example, a default objective function may be the "MISC" objective function for nominal type targets or "MSE" for interval type targets. The objective function may be labeled or selected in a variety of different manners by the user as understood by a person of skill in the art. In an alternative embodiment, the objective function may not be selectable, and a single objective function is implemented in training application 122. For example, the MISC" objective function may be used by default or without allowing a selection for nominal type targets and "MSE" may be used by default or without allowing a selection for interval type targets.

ASE uses an average squared error as the objective function; AUC uses an area under a curve as the objective function (nominal type only); F05 uses a F0.5 coefficient as the objective function (nominal type only); F1 uses an F1 coefficient as the objective function (nominal type only); GAMMA uses a gamma coefficient as the objective function (nominal type only); GINI uses a Gini coefficient as the objective function (nominal type only); KS uses a Kolmogorov-Smirnov coefficient as the objective function (nominal type only); MAE uses a mean absolute error as the objective function (interval type only); MCE uses a misclassification rate as the objective function (nominal type only); MCLL uses a multiclass log loss as the objective function (nominal type only); MISC uses a misclassification error percentage as the objective function (nominal type only); MSE uses a mean squared error as the objective function (interval type only); MSLE uses a mean squared logarithmic error as the objective function (interval type only); RASE uses a root average squared error as the objective function; RMAE uses a root mean absolute error as the objective function (interval type only); RMSLE uses a root mean squared logarithmic error as the objective function (interval type only); TAU uses a tau coefficient as the objective function (nominal type only).

The following notation is used to provide a discussion of fit statistics for illustrative objective functions:

$n_o$ is a number of observations in a dataset,
r is a number of levels for a nominal target,
N is a sum of observation frequencies in the data,
$\omega_i$ is a frequency of observation i, so $$N = \sum_{i=1}^{n_o} \omega_i,$$

$y_i$ is a target value of observation i,
$\hat{y}_i$ is a predicted target value of observation i,
m is a number of target levels,
$t_i$ is a level from the target in observation i,
$\hat{t}_i$ is a predicted level from the target in observation i,
$y_{i,j}=1$ if observation i is assigned to target level j, otherwise $y_{i,j}=0$,
$p_{i,j}$ is a predicted probability that observation i is assigned to target level j,
$m_{tc}$ is a number of total cutoff points,
$a_k$ is a true positive at cutoff point k,
$b_k$ is a false positive at cutoff point k,
$c_k$ is a false negative at cutoff point k, $$\theta = \sum_{k=1}^{m_{tc}} (a_{k-1} - a_k)(b_{k-1} - b_k),$$

-continued $$\mu = \sum_{k=2}^{m_{tc}} \left( (a_{k-1} - a_k) \sum_{j=1}^{k} (b_{j-1} - b_j) \right),$$

$$w = \sum_{k=1}^{m_{tc}} \left( (a_{k-1} - a_k) \sum_{j=k+1}^{m_{tc}} (b_{j-1} - b_j) \right),$$

$\rho = a_0 b_0$,
$a_{m_{tc}} = 0$,
$b_{m_{tc}} = 0$,
$p = a_k/(a_k + b_k)$,
$q = a_k/(a_k + c_k)$, and
$\beta = 0.5$.

For interval targets, the objective functions may be defined as:

$$ASE = \frac{1}{N} \sum_{i=1}^{n_o} \omega_i (y_i - \hat{y}_i)^2,$$

$RASE = \sqrt{ASE}$, $$MSLE = \frac{1}{N} \sum_{i=1}^{n_o} \omega_i (\log(\hat{y}_i + 1) - \log(y_i + 1))^2,$$

$RMSLE = \sqrt{MSLE}$, $$MAE = \frac{1}{N} \sum_{i=1}^{n_o} \omega_i |y_i - \hat{y}_i|,$$

and
$RMAE = \sqrt{MAE}$.

For nominal targets, the objective functions may be defined as:

$$ASE = \frac{1}{rN} \sum_{i=1}^{n_o} \sum_{j=1}^{m} \omega_i (y_{i,j} - p_{i,j})^2,$$

$RASE = \sqrt{ASE}$, $$MCE = \frac{1}{N} \sum_{t_i \neq \hat{t}_i} \omega_i, \text{ and}$$

$$MCLL = -\frac{1}{N} \sum_{i=1}^{n_o} \sum_{j=1}^{m} \omega_i y_{i,j} \log p_{i,j}.$$

Additional objective functions may be defined as:

$$AUC = \frac{\mu + \theta/2}{\rho},$$

$$GINI = \frac{\mu - w}{\rho},$$

-continued $$GAMMA = \frac{\mu - w}{\mu + w},$$

$$TAU = \frac{\mu - w}{N/2(N-1)}, \text{ and}$$

$$F05 = \frac{(1+\beta^2)pq}{\beta^2 p + q}.$$

In an operation 524, a twelfth indicator may be received that provides information for history table 224. For example, the twelfth indicator indicates a location and a name of history table 224 that may include one or more tables of data. As an example, the twelfth indicator may be received by model tuning application 222 after selection from a user interface window or after entry by a user into a user interface window. In an alternative embodiment, the location and the name of history table 224 may not be selectable. Instead, history table 224 may be created automatically in a default location.

In an operation 526, the tuning evaluation parameters that may include the parameters indicated in operations 502 to 524 are made available to selection manager device 104. For example, the values of any of the parameters that are not default values may be sent to selection manager device 104. As another option, a location of the values of any of the parameters that are not default values may be sent to selection manager device 104. As still another option, the parameters may be stored in a location known to and accessible by selection manager device 104.

In an operation 528, a tuning evaluation to select hyperparameters is requested of selection manager device 104 using the tuning evaluation parameters. Processing continues in an operation 530 shown referring to FIG. 5B. For example, the following statements request tuning of a gradient boosting tree model type:

proc gradboost data=PUBLIC.mydata;
    target &target/level=nominal;
    input &inputs/level=interval;
      autotune popsize=5 maxiter=10 objective=MISC fraction=0.3 evalhistory=all tuningparameters=(ntrees samplingrate(exclude) vars_to_try(init=100) learningrate(lb=0.1, ub=0.8) lasso ridge(lb=0.1, ub=5));
      historytable=public.myGBhist(replace=no) liveupdate;
run;

where "gradboost" identifies the gradient boosting tree model type,
"data=PUBLIC.mydata" identifies the input dataset, "target" and "inputs" define the plurality of variables of the input dataset to define $x_j$, and "autotune" is the request to perform the hyperparameter tuning evaluation. The tuning evaluation parameters include a population size of 5, a maximum of 10 iterations, the MISC objective function, the default search method, with the "vars_to_try" hyperparameter selected with an initial value of 100, with the "learningrate" hyperparameter selected between 0.1 and 0.8, with the "ridge" hyperparameter selected between 0.1 and 5, and with the remaining hyperparameters for the gradient boosting tree model type using the default values. History table 224 is defined by the name/location "public.myGBhist" and includes live updates during the tuning process without replacing values previously written to history table 224. "run" triggers execution of the request.

Referring to FIG. 5B, in operation 530, a determination is made concerning whether a cancel tuning indicator is received, for example, from visualization application 226. If the cancel tuning indicator is received, processing continues in an operation 532. If the cancel tuning indicator is not received, processing continues in an operation 534.

In operation 532, a tuning evaluation cancel is requested of selection manager device 104 that indicates that the tuning process be stopped, and processing continues in an operation 540.

In operation 534, a determination is made concerning whether a stop tuning indicator is received, for example, from visualization application 226. If the stop tuning indicator is received, processing continues in an operation 536. If the stop tuning indicator is not received, processing continues in an operation 538.

In operation 536, a tuning evaluation stop is requested of selection manager device 104 that indicates that the tuning process be stopped and a final model be trained with the current best identified hyperparameter configuration as measured by the objective function value, and processing continues in operation 540.

In operation 538, a determination is made concerning whether a finished tuning indicator is received, for example, from selection manager device 104 that indicates that the tuning process is complete. If the finished tuning indicator is received, processing continues in operation 540. If the finished tuning indicator is not received, processing continues in operation 530 to continue to wait for a processing indicator.

In operation 540, tuning evaluation results are accessed. For example, one or more of the output tables may be presented on display 216. As another option, display 216 may present a statement indicating that the tuning process is complete. The user can then access the output tables in the specified location.

Figure 6A:
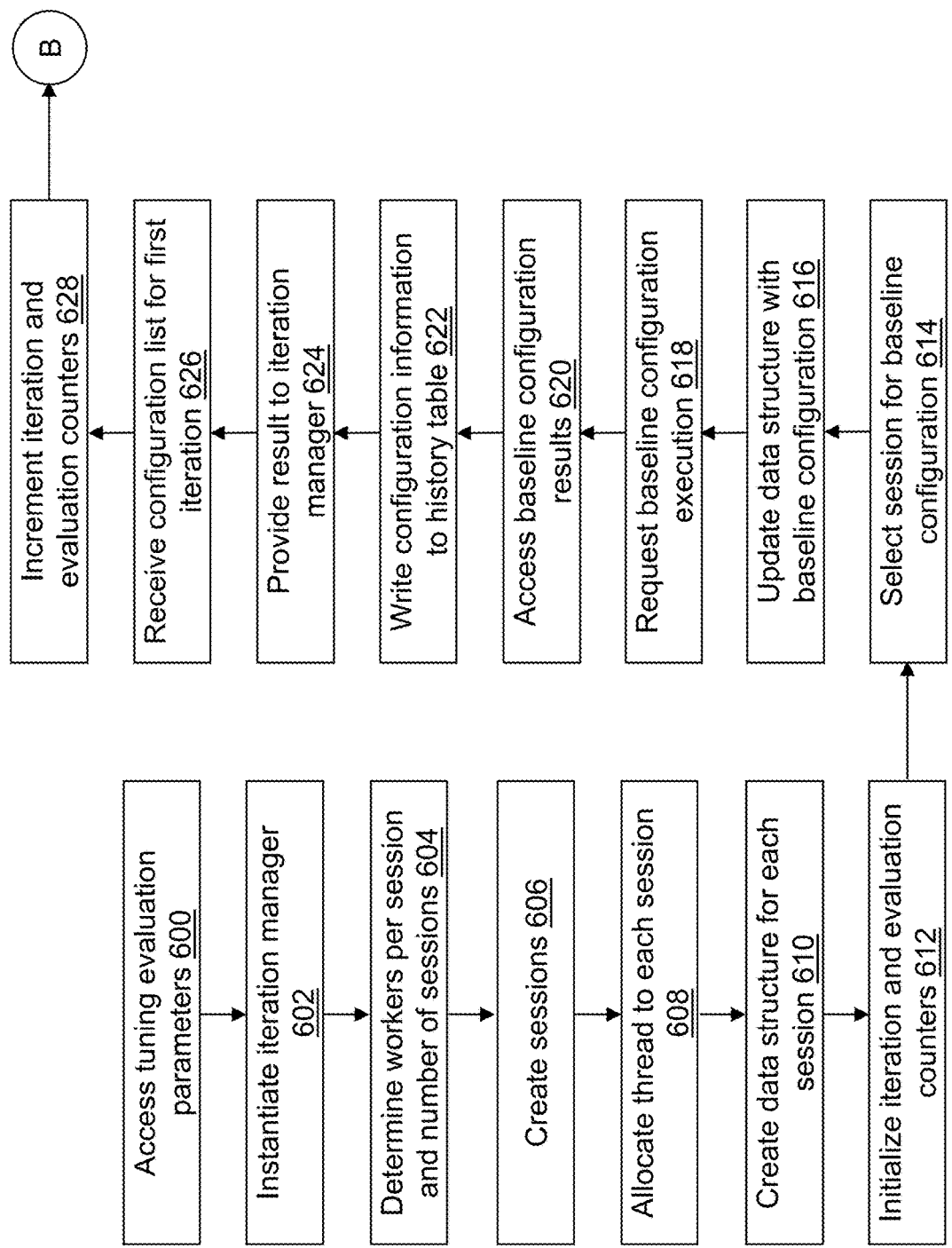
FIGS. 6A through 6C depict a flow diagram illustrating examples of operations performed by the selection manager device of FIG. 3 in accordance with an illustrative embodiment.
Figure 6B:
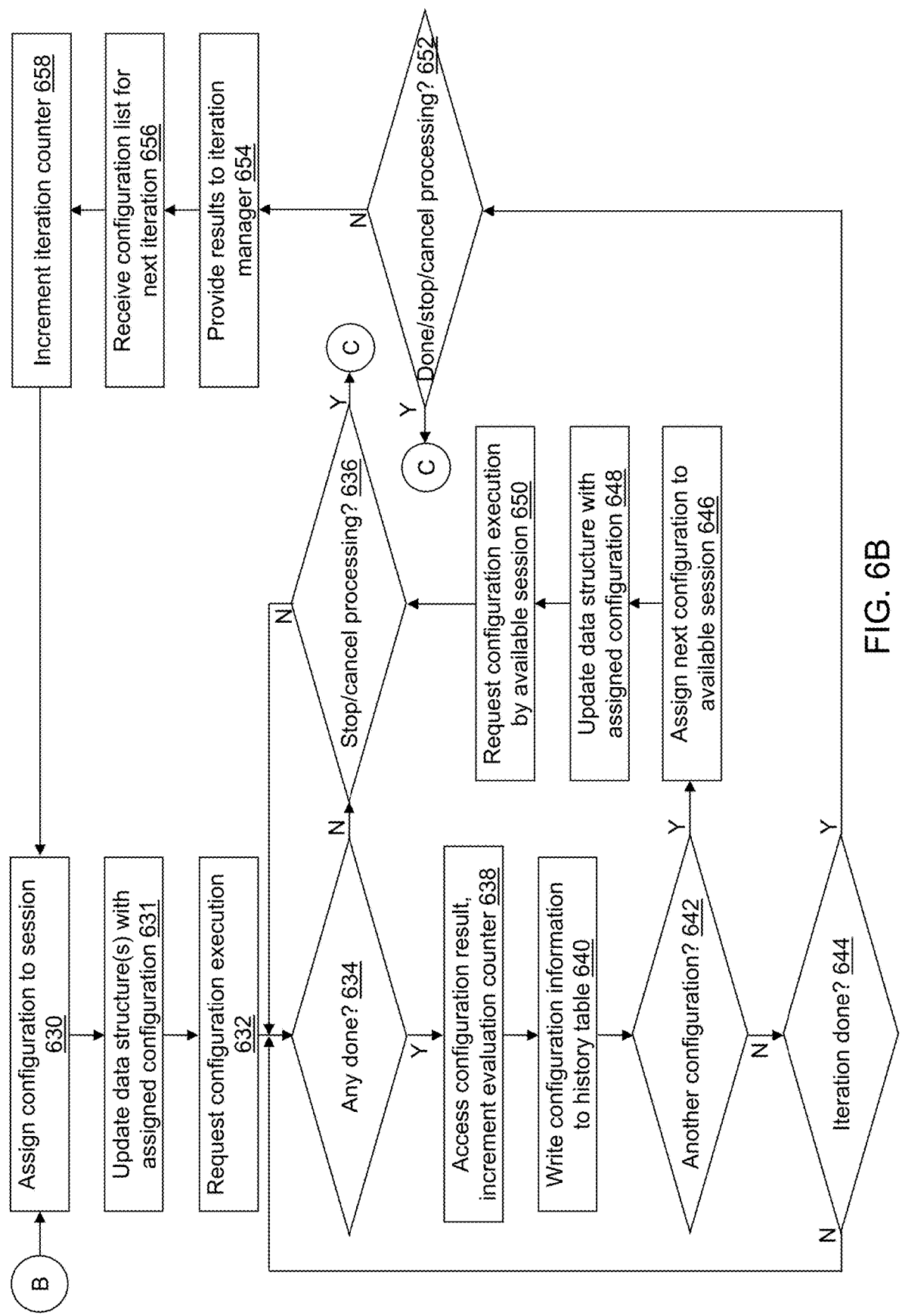
Figure 6C:
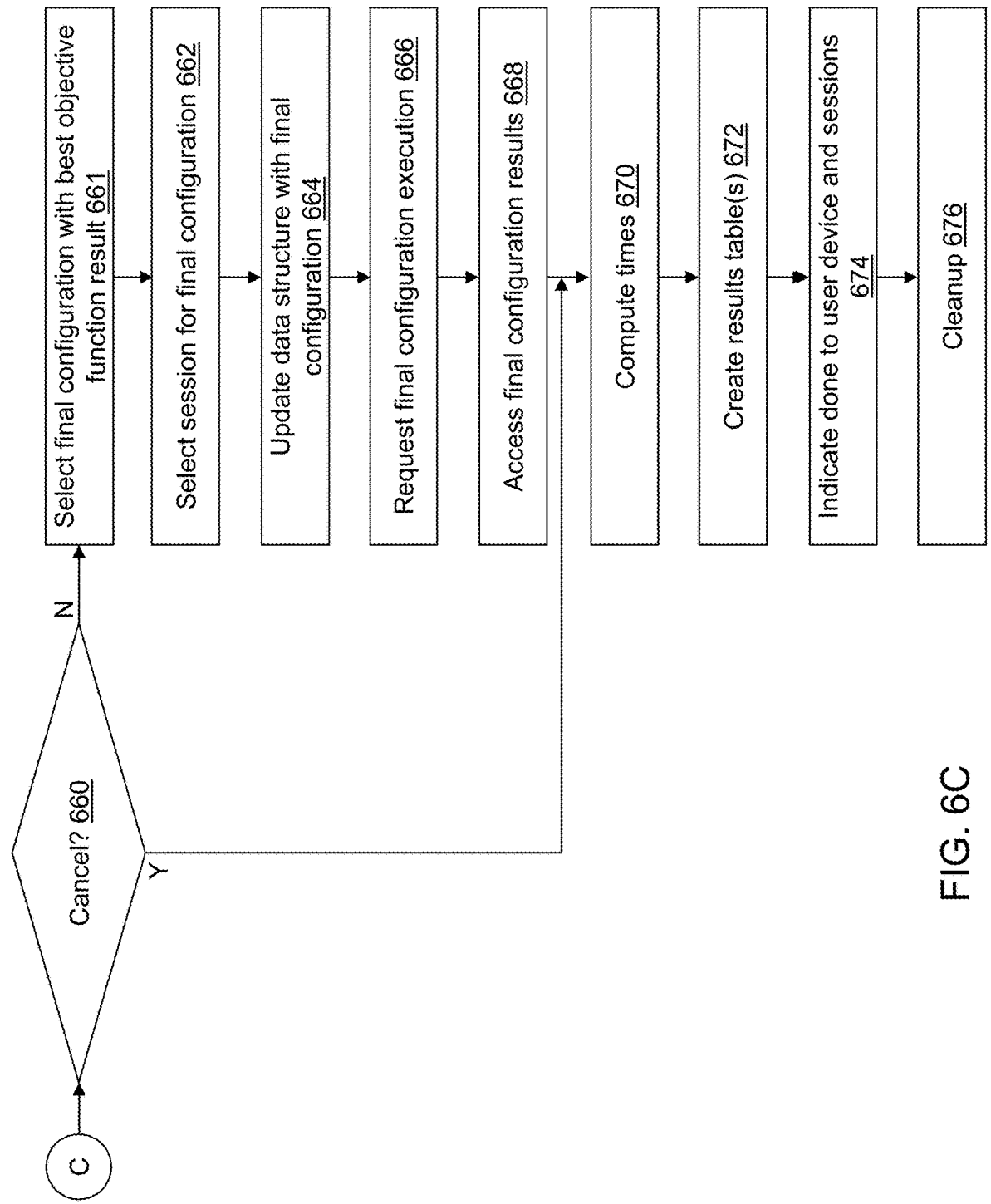

Referring to FIGS. 6A, 6B, and 6C, example operations associated with selection manager application 312 are described. Additional, fewer, or different operations may be performed depending on the embodiment. The order of presentation of the operations of FIGS. 6A, 6B, and 6C is not intended to be limiting. Selection manager device 104 establishes communication with the computing devices of worker system 106, sends instructions to each session manager device 400 associated with each session established by selection manager device 104, collects and aggregates the results of computations from each session, and communicates final results to user device 200. Selection manager device 104 may utilize itself as a worker computing device of worker system 106. The computing devices of worker system 106 receive instructions from selection manager device 104, store and process data, and send the results of computations back to selection manager device 104 under control of each session manager device 400 of each session. Worker computing devices of each session may also communicate to each other directly to complete tasks.

In an operation 600, tuning evaluation parameters obtained by model tuning application 222 are accessed. For example, values for parameters indicated in operations 502 to 524 and made available to selection manager device 104 in operation 526 are accessed.

In an operation 602, iteration manager 314 is instantiated. Iteration manager 314 determines and updates a configuration list that includes a set of hyperparameter configurations to evaluate each iteration as described further below. Again, a hyperparameter configuration includes a value for each hyperparameter to evaluate based on the selected model type. A set of hyperparameter configurations includes a plurality of hyperparameter configurations selected for evaluation before a next set of hyperparameter configurations is selected for evaluation in a next iteration based on the tuning search method(s) and the objective function values computed for each hyperparameter configuration.

In an operation 604, the number of workers per session M and the number of sessions $N_s$ are determined. For example, when the second indicator specifies $N_s$, that value is used for the number of sessions, or when the second indicator specifies M, that value is used for the number of workers per session. If $N_W$ is equal to all of the workers that are connected to selection manager device 104 and there are at least 16 worker computing devices included in worker system 106, $N_s$ may be limited to eight so that the number of workers per session M is at least two.

Optionally, the second indicator may indicate that M is set based on a size of the input dataset. For example, M may be set based on a number of rows r and a number of columns c of the input dataset and a distribution factor d. For illustration, M=1+rcd. An illustrative value of d=2e$^{-8}$ may be used so that another session worker device 420 is added to each session for every 50 million data values. The value of d may be selected by a user of user device 200. The number of columns c further may be the number of variables to include in the training dataset instead of a total number of columns. The number of rows r further may be the number of rows to include in the training dataset instead of a total number of rows.

$N_s$ may be determined as either one less than a population size specified for the GA tuning search method or the Bayesian search method because one hyperparameter configuration is carried forward each iteration. The best identified point is carried forward so that if the next iteration does not find an improvement, the returned set of evaluations still includes the current best identified for consideration in generating the next iteration of hyperparameter configurations. If the GSS tuning search method is selected, twice the number of hyperparameters is added to the value of $N_s$. For the LHS, Grid, or Random tuning search methods, $N_s$ is determined as one less than a sample size. $N_s$ may then be limited by a configuration of selection manager device 104. When selection manager device 104 is configured in single-machine mode and $N_s$ is greater than four and not specified by the second indicator, $N_s$ is limited to four. When selection manager device 104 is configured in single-machine mode and $N_s$ is specified by the second indicator, $N_s$ may be limited to 32 or a number of threads of selection manager device 104. When selection manager device 104 is configured in distributed mode, and $N_s$ is not specified by the second indicator, $N_s \leq N_W/M$ may be used. When selection manager device 104 is configured in distributed mode and $N_s$ is specified by the second indicator, $N_s \leq 2N_W/M$ may be applied.

For illustration, if a population size specified for a GA search method is ten, even if $N_W$=100 and M=2 based on a size of the input dataset, $N_s$=10 instead of $N_s$=50 because the GA population size (number of hyperparameter configurations created each iteration by the GA search method) limits the number of hyperparameter configurations created. The user could increase the population size of the GA search method to allow evaluation of more hyperparameter configurations each iteration, if not limited by an administrator. For example, an administrator may define limits so that no single user can use all of the computing devices of worker system 106.

When $N_s$ is greater than one and M is equal to one, selection manager application 312 may be executed in a model parallel mode; when M is greater than one and $N_s$ is equal to one, selection manager application 312 is executed in a data parallel mode; and when both M and $N_s$ are greater than one, selection manager application 312 is executed in a data and model parallel mode. In an automatic mode, $N_s$ may be selected to be as large as possible with M as small as possible subject to the size of the input dataset because model parallel is more efficient than data parallel.

In an operation 606, the number of sessions $N_s$ are created to include the number of workers per session M with session manager device 400 selected for each created session.

In an operation 608, a thread is allocated from an available thread pool to each created session. The allocated threads each manage the communications between selection manager device 104 and each session manager device 400.

In an operation 610, a data structure is created for each session through which each session is notified of the input dataset, of the hyperparameter values for the assigned hyperparameter configuration, of the model type to train and score, and of other input values for the model type. An illustrative data structure includes a thread identifier that links the data structure to each thread, a session handle for the thread, a parameter list for training with the model type, a data filter for the training dataset based on whether the training mode is using cross validation or a single partition, the hyperparameter values assigned to the thread, a pruning parameter list when a decision tree model type is used, a parameter list for scoring with the model type, a data filter for the validation dataset based on whether the training mode is using cross validation or a single partition, a training time, a scoring time, a total time, a format link, a completion indicator, a number of folds completed indicator, and an extension for reading results. The session handle contains information about the session that was started in a new process to run actions. The training time, the scoring time, the total time, and the completion indicator may be set by session manager device 400 when each evaluation is complete and/or when each iteration is complete and/or when the tuning process is complete. The format link is added to each data structure if formats were used to define how data is read from the input dataset and is a link to a list of formats defined by the user using model tuning application 222. For example, the user may have specified a variable order and a data type for each variable in operation 518 that is passed to session manager device 400.

In an operation 612, an iteration counter $I_c$ and an evaluation counter $E_c$ may be initialized, for example using $I_c$=0 and $E_c$=0.

In an operation 614, a session is selected to execute a baseline hyperparameter configuration used as a baseline. The baseline hyperparameter configuration may be associated with $I_c$=0 and $E_c$=0.

In an operation 616, the data structure associated with the selected session is loaded with the baseline hyperparameter configuration. For example, the parameter list for training with the model type, the data filter for the training dataset, the default or baseline hyperparameter values, optionally the pruning parameter list, the parameter list for scoring with the model type, and the data filter for validation data, etc. are defined in the data structure linked to the selected session.

In an operation 618, the selected session is requested to execute the baseline hyperparameter configuration based on the parameter values in the data structure. The handle to the session process stored in the data structure associated with the selected session may be used to make this request or call. A first objective function value is obtained by using either single partition validation or k-fold cross validation depending on the user validation selection.

In an illustrative embodiment, a train request is sent to session manager device 400 of the selected session to execute the "train" action based on the selected model type. After receiving an indication that the "train" action is complete from session manager device 400, a score request is sent to session manager device 400 of the selected session to execute the "score" action based on the selected model type. After each request, a series of "get response from session" calls may be made until a "finished/complete" response is received from session manager device 400. Each response obtained from the "get response" calls is compiled into a response object using the thread allocated to the selected session. After the responses are compiled, a result is extracted from the response depending on the type of objective function selected where an associated table may be found in the results object and from which a value computed for the objective function is read. The objective function value is provided back to the main thread on which selection manager application 312 is instantiated and associated with the set of hyperparameter values (in this case, the baseline configuration) assigned to the selected session.

In an operation 620, results generated from the baseline hyperparameter configuration are accessed. For example, the results may be received from the selected session or accessed in a global table, etc. The extension pointer stored in the data structure associated with the selected session is a pointer to a set of utility functions that support parsing of tabular results created by actions in an internal format. The objective function value for each hyperparameter configuration may be extracted from an in-memory table created by an action called for validation of the trained model. The results may be extracted from an in-memory "blob" and converted to tabular form using the extension pointer.

In an operation 622, the results may be stored in history table 224 and in model data 316 in association with the set of hyperparameter values. For example, iteration counter $I_c$, evaluation counter $E_c$, the objective function value, the baseline hyperparameter configuration values, evaluation time, etc. may be stored in history table 224 and in model data 316.

In an operation 624, the results are provided to iteration manager 314. Based on the baseline results and hyperparameters, iteration manager 314 determines a first set of hyperparameter configurations to evaluate in a first iteration. Again, each hyperparameter configuration includes a specific value for each hyperparameter based on the selected model type. For example, iteration manager 314 executes a first tuning search method of the tuning search method specified in operation 520. Alternatively, multiple tuning search methods may be executed concurrently such that iteration manager 314 executes each tuning search method to determine a set of hyperparameters that are combined to define the first set of hyperparameter configurations. For illustration, the LHS, the Random, and/or the Grid search methods may be used in a first iteration to define the first set of hyperparameter configurations that sample the search space. The initial the configuration list may also be called a "population".

In an operation 626, the configuration list is received that includes the first set of hyperparameter configurations generated by iteration manager 314.

In an operation 628, iteration counter $I_c$ and evaluation counter $E_c$ may be incremented, for example using $I_c=I_c+1$ and $E_c=E_c+1$, and processing continues in an operation 630 shown referring to FIG. 6B.

Referring to FIG. 6B, in operation 630, a hyperparameter configuration is selected from configuration list and assigned to a selected session. For example, if the model type is support vector machine, a first value for the penalty parameter C and a second value for the degree parameter is assigned as a pair to a session with different values for the pair assigned to different sessions. Iteration manager 314 defined the pair of values for each hyperparameter configuration included in the configuration list.

In an operation 631, the data structure associated with each session is loaded with the assigned hyperparameter configuration. For example, the parameter list for training with the model type, the data filter for the training dataset, the assigned hyperparameter values, optionally the pruning parameter list, the parameter list for scoring with the model type, and the data filter for the validation data are defined in the data structure linked to the selected session.

In an operation 632, a request is sent to each session manager device 400 to execute model manager application 412 and/or model worker application 432 with the assigned hyperparameter configuration included in the created data structure. Again, as discussed previously, separate train and score requests may be made. If cross validation is performed, there may be multiple train and score requests based on a number of folds. Alternatively, a single request is sent that triggers training and scoring based on the validation parameters.

In an operation 634, a determination is made concerning whether any training/scoring execution is finished. For example, session manager device 400 may set the completion indicator to indicate finished in the data structure associated with it. If no execution is finished, processing continues in an operation 636. If any execution is finished, processing continues in an operation 638. For illustration, selection manager device 104 loops through each of its thread handles, checking to see if that particular thread is busy or free. When a session finishes evaluating its assigned hyperparameter configuration, session manager device 400 returns the computed values back to selection manager device 104 and sets its completion indicator indicating that it is free to receive a new hyperparameter configuration for evaluation.

In operation 636, a determination is made concerning whether a cancel tuning indicator or a stop tuning indicator is received from user device 200. If neither the cancel tuning indicator nor the stop tuning indicator is received, processing continues in operation 634 until indication that a session is finished is received or the cancel tuning indicator or the stop tuning indicator is received. If the cancel tuning indicator or the stop tuning indicator is received, processing continues in an operation 660 shown referring to FIG. 6C.

Similar to operation 620, in operation 638, results generated by the now free session are accessed, and evaluation counter $E_c$ may be incremented, for example, $E_c=E_c+1$.

Similar to operation 622, in an operation 640, the results may be stored in history table 224 and in model data 316 in association with the set of hyperparameter values. For example, iteration counter $I_c$, evaluation counter $E_c$, the objective function value, the baseline hyperparameter configuration values, evaluation time, etc. may be stored in history table 224 and in model data 316.

In an operation 642, a determination is made concerning whether the configuration list includes another hyperparameter configuration to evaluate that has not been assigned to a session. If the configuration list includes another hyperparameter configuration to evaluate, processing continues in an operation 646. If the configuration list does not include another hyperparameter configuration to evaluate, processing continues in an operation 644.

In operation 644, a determination is made concerning whether the iteration is finished such that each hyperparameter configuration on the configuration list has been evaluated. If the iteration is finished, processing continues in an operation 652. If the iteration is not finished, processing continues in operation 634 to continue to wait for sessions to complete execution with their assigned hyperparameter configuration.

In operation 646, a next hyperparameter configuration is selected from the configuration list and assigned to the now free session.

In an operation 648, the data structure associated with the now free session is loaded with the next assigned hyperparameter configuration.

In an operation 650, a request is sent to session manager device 400 associated with the now free session to execute model manager application 412 and/or model worker application 432 with the hyperparameter configuration included in the data structure, and processing continues in operation 636 to continue to monitor for the cancel tuning indicator or the stop tuning indicator and for sessions that have completed their assigned hyperparameter configuration evaluation.

In operation 652, a determination is made concerning whether processing is finished or the cancel tuning indicator or the stop tuning indicator is received. If processing finished or the cancel tuning indicator or the stop tuning indicator is received, processing continues in operation 660 shown referring to FIG. 6C. If processing should not be stopped or is not finished, processing continues in an operation 654. For example, processing is finished when a maximum number of iterations have been performed, when a maximum number of hyperparameter configuration evaluations have been performed, when a maximum time (computing time or wall clock time) has been exceeded, etc. As another option, processing is finished if the current tuning search method(s) have each completed based on the parameters defined for each search method in operation 520. For example, a maximum number of iterations may have been exceeded by each of the current tuning search method(s).

In operation 654, the results for each hyperparameter configuration included in the configuration list is provided to iteration manager 314. Based on the results and the current tuning search method(s), iteration manager 314 determines a next set of hyperparameter configurations to evaluate in a next iteration. The best identified model hyperparameter configurations from the previous iteration are used to generate the next population of hyperparameter configurations to evaluate with the selected mode type. If multiple search methods are running concurrently, the results from all of the hyperparameter configurations include in the configuration list as part of the current iteration are used to determine the next population irrespective of whether that search method requested evaluation of a specific hyperparameter configuration. This process is repeated for remaining iterations based on the search method(s) chosen. In this manner, a search method gains information based on one or more hyperparameter configurations generated by another search method.

For example, iteration manager 314 executes a next tuning search method of the tuning search method specified in operation 524. For illustration, after a first iteration, a GA search method and/or a Bayesian search method may be used by iteration manager 314 to determine the next set of hyperparameter configurations. Each population of the GA search method may be enhanced with a "growth step" in which a GSS is used to locally improve some of the more promising members of the GA population.

In an operation 656, the configuration list is received that includes a next plurality of hyperparameter configurations for a next iteration.

In an operation 658, iteration counter $I_c$ may be incremented, for example, $I_c=I_c+1$, and processing continues in operation 630

Referring to FIG. 6C, in operation 660, a determination is made concerning whether the cancel tuning indicator is received from user device 200. If the cancel tuning indicator is not received, processing continues in an operation 661. If the cancel tuning indicator is received, processing continues in an operation 670.

In operation 661, a final hyperparameter configuration is selected based on the hyperparameter configuration that generated the best identified or extremum objective function value. For example, in some cases, the extremum objective function value may be a minimum value or a maximum value. For example, the extremum objective function value for a measure of error may be a minimum value. For example, the extremum objective function value for a measure of accuracy may be a maximum value.

In an operation 662, a session is selected to execute the final hyperparameter configuration.

In an operation 664, the data structure associated with the selected session is updated with the final hyperparameter configuration.

Similar to operation 618, in an operation 666, the selected session is requested to execute the final hyperparameter configuration based on the parameter values in the data structure. Characteristics that define the trained model using the final hyperparameter configuration may be provided back to the main thread on which selection manager application 312 is instantiated. For example, the ASTORE procedure may be used to store the trained model for use in predicting a target value for a new observation vector included in new data such as second dataset 1724.

Similar to operation 620, in an operation 668, results generated from the final hyperparameter configuration are accessed.

In operation 670, computation times used to perform the hyperparameter tuning are computed for example, using the training time, the scoring time, and the total time included in the data structure associated with each session manager device 400 that contains times for the model train and score executions for that session. The wall clock time may also be computed. By dividing the sum of all objective evaluation times across all sessions by the wall clock time, a 'parallel speed up' time savings can be estimated and returned with the results.

In an operation 672, results tables are created. For example, the results tables indicated in operation 508 are created and returned to or otherwise made accessible by user device 200.

In an operation 674, a finished indicator is sent to user device 200 and to each session manager device 400.

In an operation 676, session cleanup is performed. For example, the sessions are closed, the created data structures are cleared and released, and all memory is freed.

Figure 7:
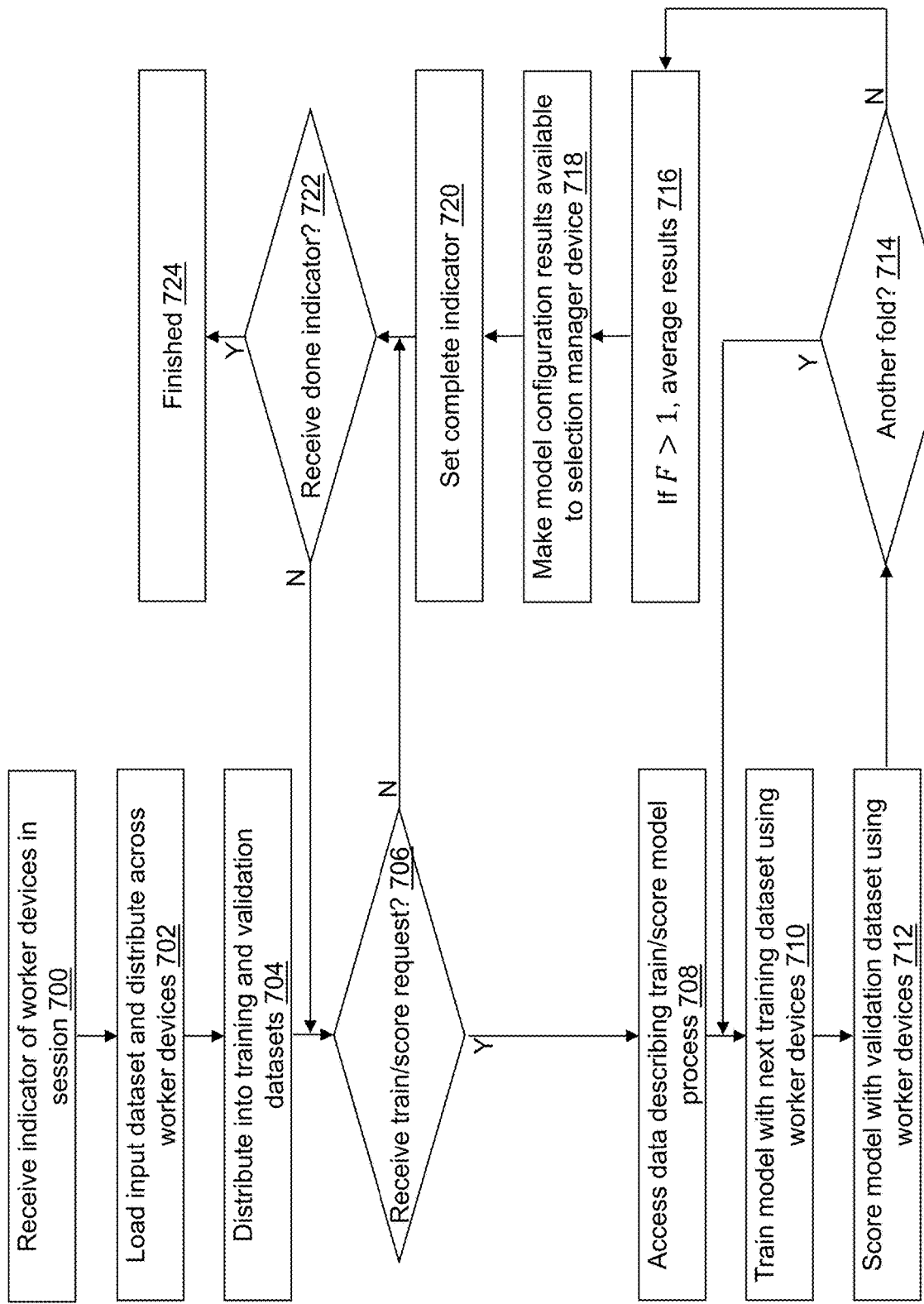
FIG. 7 depicts a flow diagram illustrating examples of operations performed by the session manager/worker device of FIGS. 4A and 4B in accordance with an illustrative embodiment.

Referring to FIG. 7, example operations associated with model manager application 412 are described. Additional, fewer, or different operations may be performed depending on the embodiment. The order of presentation of the operations of FIG. 7 is not intended to be limiting.

In an operation 700, an indicator of worker devices in the session to which session manager device 400 is assigned is received from selection manager device 104.

In an operation 702, the input dataset is loaded and distributed across the computing devices of the session such that each computing device is loaded with a portion of the input dataset.

In an operation 704, the portion of the input dataset distributed to each computing device of the session is distributed into training dataset subset 434 and validation dataset subset 436 at each session worker device 420 of the session and optionally into training dataset subset 414 and validation dataset subset 416 at session manager device 400. The distribution is based on whether a single partition between training dataset subset 434 and validation dataset subset 436 is created or whether k-folds or partitions are used to form a plurality of training dataset subsets 434 and validation dataset subset 436.

For example, session manager device 400 may request that each session worker device 420 create training dataset subset 434 and validation dataset subset 436 as a single-partition based on the fraction value indicated in operation 510 such that F=1. In this process, session manager device 400 may also partition its portion of the input dataset into training dataset subset 414 and validation dataset subset 416. For illustration, if fraction value is 0.3 or 30%, 30% of the observation vectors in the portion of the input dataset at each session worker device 420 of the session is extracted to create validation dataset subset 436 and the remaining 70% of the observation vectors in the portion of the input dataset at each session worker device 420 of the session forms training dataset subset 434. Similarly, if session manager device 400 also hosts a portion of the input dataset, 30% of the observation vectors in the portion of the input dataset at session manager device 400 is extracted to create validation dataset subset 416 and the remaining 70% of the observation vectors in the portion of the input dataset at session manager device 400 forms training dataset subset 414.

When F>1, the portion of the input dataset distributed to each computing device of the session is distributed into a plurality of training dataset subsets 434 and into validation dataset subset 436 at each session worker device 420 of the session and optionally into a plurality of training dataset subsets 414 and into validation dataset subset 416 at session manager device 400. For example, session manager device 400 may request that each session worker device 420 create training dataset subsets 434 and validation dataset subset 436 from multiple partitions based on the number of folds F defined for cross-validation and indicated in operation 510. F−1 partitions form F−1 training dataset subsets 434 with the remaining partition forming validation dataset subset 436.

In an operation 706, a determination is made concerning whether a train/score request is received from selection manager device 104. If a train/score request is received, processing continues in an operation 708. If a train/score request is not received, processing continues in operation 722.

In operation 708, the data describing the train model process including the hyperparameter configuration is accessed. For example, data in the data structure associated with the thread is accessed.

In an operation 710, the model type is trained using the hyperparameter configuration accessed and training dataset subset 434 at each session worker device 420 and optionally training dataset subset 414 at session manager device 400. As discussed previously, using cross validation, each model evaluation requires F−1 training and scoring executions with different training dataset subsets. For example, if the number of folds value F=4, each session worker device 420 partitions its portion of the input dataset into four subsets A, B, C, D. For a first execution loop, a first partition (e.g., A) is selected to form a first training dataset subset 434 at each session worker device 420 with a fourth partition D selected to form validation dataset subset 436. For a second execution loop, a second partition (e.g., B) is selected to form a second training dataset subset 434 at each session worker device 420 with the fourth partition D again forming validation dataset subset 436. For a third execution loop, a third partition (e.g., C) is selected to form a third training dataset subset 434 at each session worker device 420 with the fourth partition D again forming validation dataset subset 436. Thus, the training and scoring process is repeated F−1 times with different training datasets used to define the trained model and the same validation dataset used to determine scoring performance. The partitions may similarly be formed at session manager device 400 if a portion of the input dataset is stored to computer-readable medium 208. As a result, when F>1, a first iteration of operation 710 after receipt of the train/score request, selects the first partition; a second iteration of operation 710 after receipt of the train/score request, selects the second partition; and so on up to the F−1th partition is processed.

In an operation 712, the trained model is scored using the hyperparameter configuration accessed, the trained model defined in operation 710, and validation dataset subset 436 at each session worker device 420 and optionally validation dataset subset 416 at session manager device 400 to determine one or more objective function values based on the objective function indicated in operation 522.

In an operation 714, a determination is made concerning whether the F−1 folds have been processed. If the F−1 folds have been processed, processing continues in an operation 716. If the F−1 folds have not been processed, processing continues in operation 710 to process the next partition of training dataset subset 434 and optionally training dataset subset 414.

In operation 716, if F>1, the objective function values computed for each partition are averaged to obtain a single objective function value.

In an operation 718, the model configuration results are made available to selection manager device 104, for example, by including them in the data structure and/or updating a globally accessible table and/or storing them in model configuration data 418.

In an operation 720, the completion indicator of the data structure is set to notify selection manager device 104 that processing of the hyperparameter configuration is complete.

In operation 722, a determination is made concerning whether a finished indicator is received from selection manager device 104. If the finished indicator is received, processing continues in an operation 724. If the finished indicator is not received, processing continues in operation 706 to await receipt of another request from selection manager device 104.

In operation 724, processing is finished.

Figure 8A:
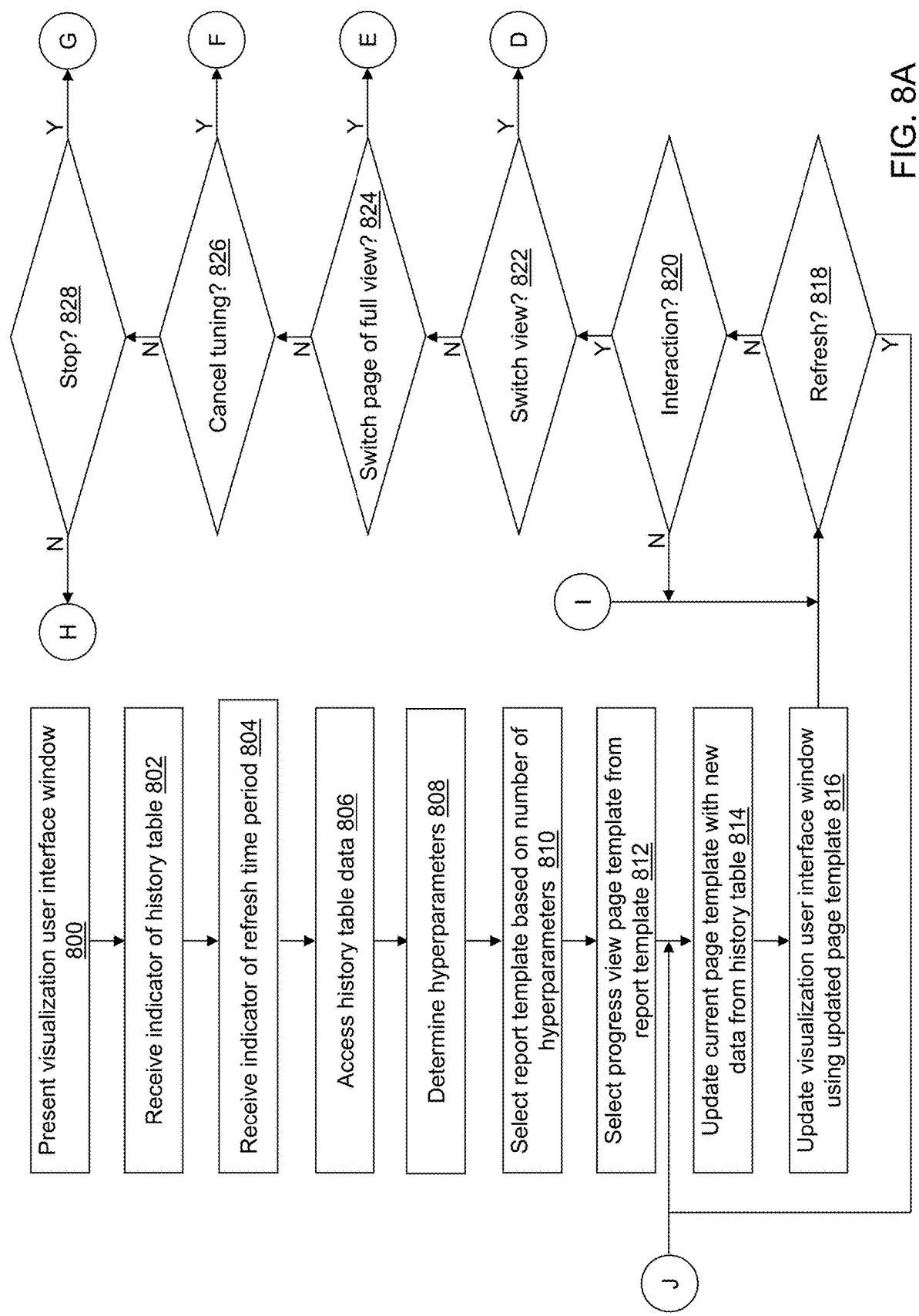
FIGS. 8A through 8C depict a flow diagram illustrating examples of operations performed by the user device of FIG. 2 to visually monitor the tuning process executed by the hyperparameter selection system of FIG. 1 in accordance with an illustrative embodiment.
Figure 8B:
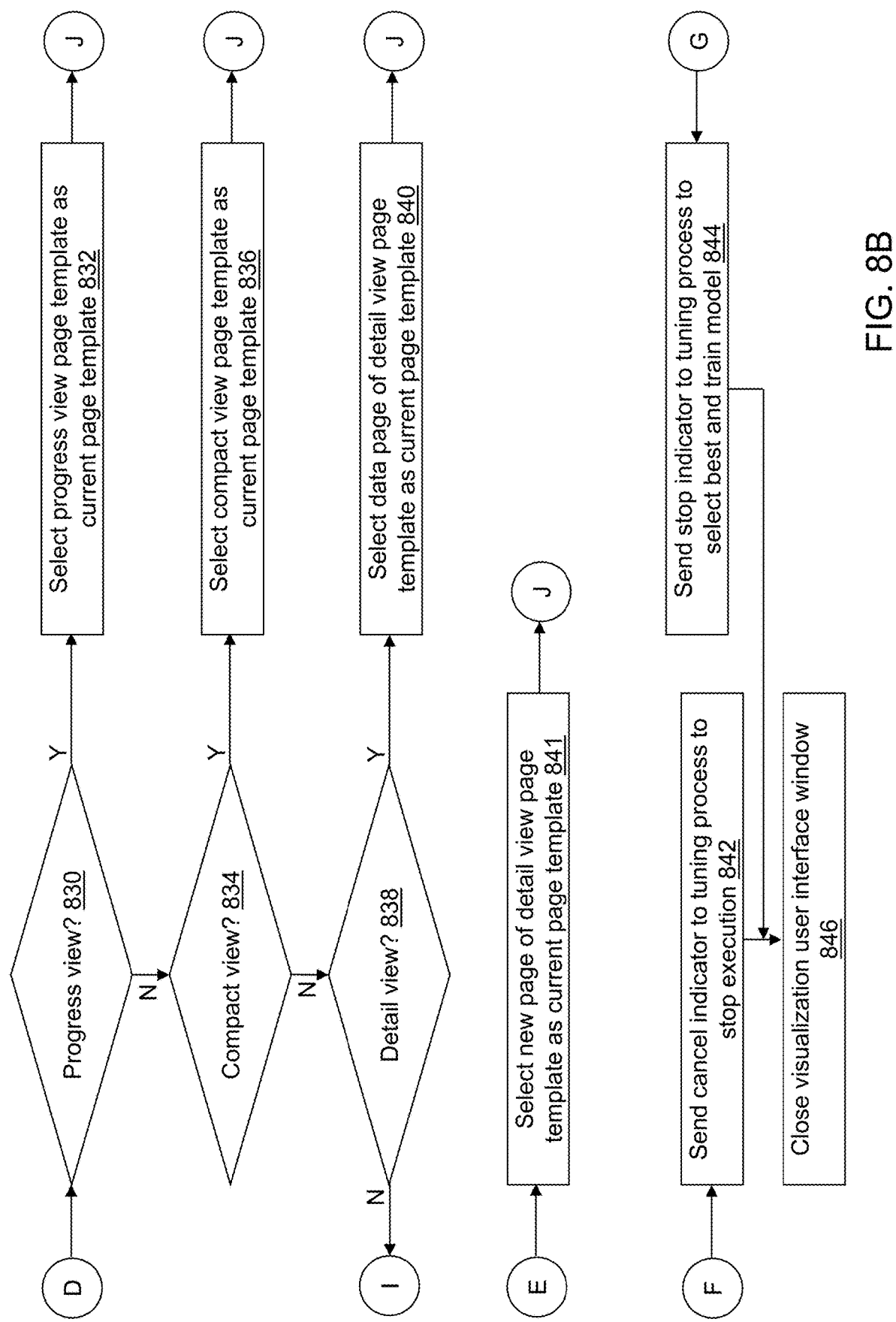
Figure 8C:
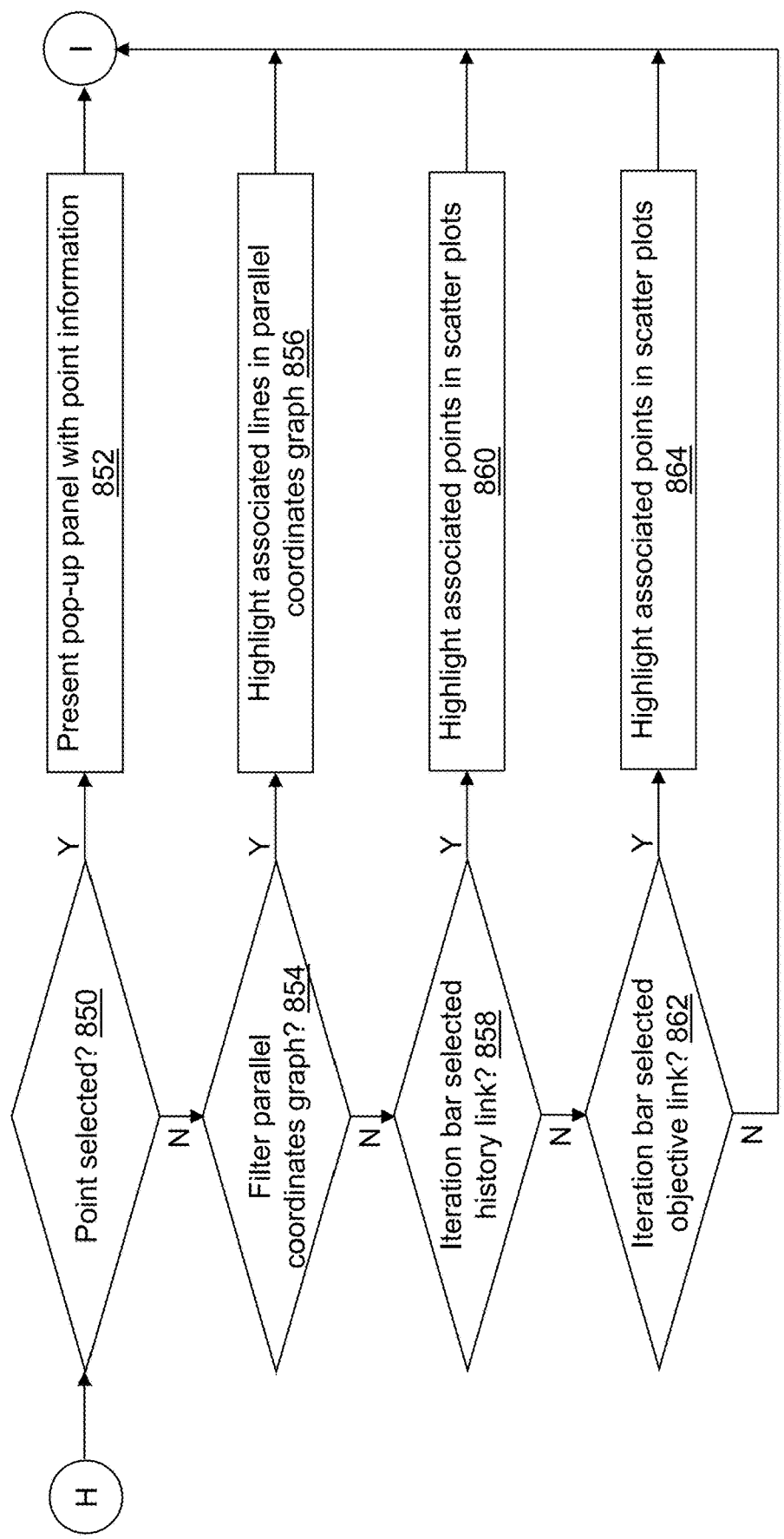

Referring to FIGS. 8A through 8C, example operations associated with visualization application 226 are described. Additional, fewer, or different operations may be performed depending on the embodiment. The order of presentation of the operations of FIGS. 8A through 8C is not intended to be limiting. A user can interact with one or more user interface windows presented to the user in a display under control of visualization application 226 independently or through a browser application in an order selectable by the user.

Although some of the operational flows are presented in sequence, the various operations may be performed in various repetitions, concurrently, and/or in other orders than those that are illustrated. For example, a user may execute visualization application 226, which causes presentation of a visualization user interface window, which may include a plurality of menus and selectors such as drop down menus, buttons, text boxes, hyperlinks, etc. associated with visualization application 226 as understood by a person of skill in the art selection of which triggers events to be handled by visualization application 226 as they are received. As further understood by a person of skill in the art, various operations may be performed in parallel, for example, using a plurality of threads or a plurality of computing devices such as a grid or a cloud of computing devices.

Referring to FIG. 8A, in an operation 800, the visualization user interface window is presented in display 216. For illustration, visualization application 226 may be a browser-based application such that visualization user interface window is presented in a browser window of display 216. Visualization application 226 may be a JavaScript application that uses a node.js server. For example, visualization application 226 may be a Web wrapper application that utilizes SAS® Visual Analytics to render various graphs used to monitor a status of processing by the model tuning process controlled by selection manager device 104.

In an operation 802, a thirteenth indicator may be received that provides information for history table 224. For example, the thirteenth indicator indicates a location and a name of history table 224. As an example, the twelfth indicator may be received by model tuning application 222 after selection from the visualization user interface window or after entry by a user into the visualization user interface window. In an alternative embodiment, the location and the name of history table 224 may not be selectable. Instead, history table 224 may be created automatically in a default location or may be received in some manner from an instance of model tuning application 222. In an illustrative embodiment, the thirteenth indicator may further provide information regarding template data 228 or a location and a name of template data 228 may be stored in a known location with a known name or otherwise provided to visualization application 226.

In an operation 804, a fourteenth indicator of a refresh time period may be received. The refresh time period defines a time period used to define how frequently history table 224 is read for new values used to update the visualization user interface window. In an alternative embodiment, the fourteenth indicator may not be received. For example, a default value may be stored, for example, in computer-readable medium 208 and used automatically. In another alternative embodiment, the value of the refresh time period may not be selectable. Instead, a fixed, predefined value may be used. For illustration, a default value of the refresh time period may be 2 seconds though other values may be used.

In an operation 806, data from history table 224 is accessed, for example, by opening and reading history table 224.

In an operation 808, data describing the tuning process being executed by the instance of model tuning application 222 is read from history table 224 including the objective function indicated in operation 522 and the hyperparameters associated with the model type indicated in operation 512. For example, a column header identifies the objective function and a name of each hyperparameter of the hyperparameters. Additional columns included in history table 224 may include an iteration counter column, an evaluation counter column, and an evaluation time column that includes values for the iteration counter, the evaluation counter, and the evaluation time, respectively.

In an operation 810, a report template is selected from a plurality of report templates stored in and read from template data 228. For example, the report template may be selected from template data 228 based on a number of the hyperparameters associated with the model type indicated in operation 512. For illustration, each report template may include a description of a plurality of different views. In the illustrative embodiment, each report template may include a description of three different views presentable by the visualization user interface window by default and based on a user's interaction with the visualization user interface window. Each report template of the plurality of report templates may include the description of the three different views for a different number of the hyperparameters, for example, from two to nine hyperparameters. In alternative embodiments, there may be a fewer or a greater number of views with different characteristics than those provided as examples optionally with a greater number of hyperparameters or other parameters of interest when monitoring a performance of visualization application 226. For illustration, each report template may describe a report designed using SAS® Visual Analytics that describes a plurality of pages each with a predefined layout of text, controls, and graphs and predefined objects used to graphically render/present data read from history table 224.

The three different views that may be presented in the visualization user interface window may include a progress view, a compact view, and a detail view. In an operation 812, a progress view page is selected from the selected report template to describe an initial page for visualization. The detail view may include a plurality of different pages created as distinct tabs in an illustrative embodiment as described further below. In alternative embodiments, other views may be selected initially. A portion of the selected report template may describe each view of the plurality of views and each page of the plurality of pages. That portion may be referred to as a page template such as a progress view page template though each page template is included in the selected report template.

Figure 9A:
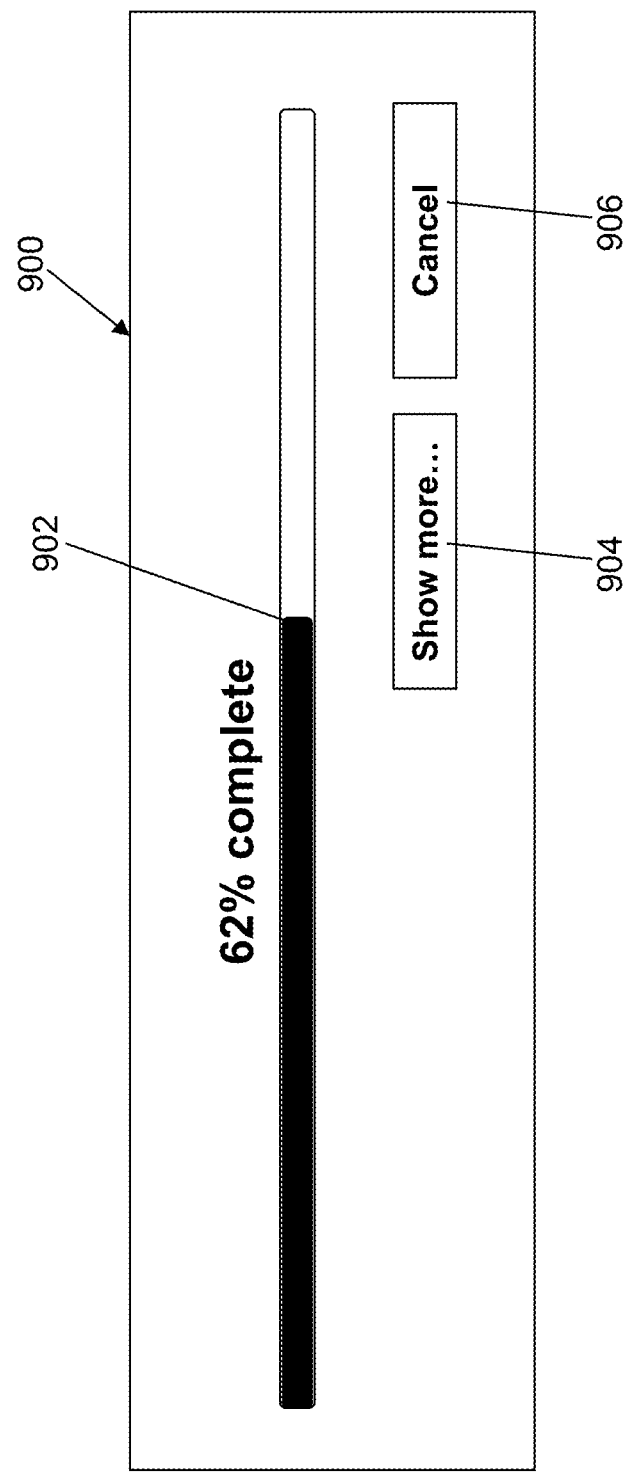
FIG. 9A shows a progress bar page of a visualization user interface window presented to visually monitor the tuning process in accordance with an illustrative embodiment.

Referring to FIG. 9A, in the progress view, the visualization user interface window includes a progress view window 900 that includes a progress bar 902 that visually shows an approximate fraction of the entire tuning process that has been completed so far. Selecting a show more button 904 of progress view window 900 may trigger receipt of a switch view indicator that may cause the visualization user interface window to switch to the compact view from the progress view as described below in operations 822 and 841. Selecting a cancel button 906 of progress view window 900 may cause visualization application 226 to receive a cancel tuning selector, to send the cancel tuning indicator to the executing instance of model tuning application 222, and to stop processing as described below in operations 842 and 846. The information for the progress bar indicator may be received directly from model tuning application 222, read from a known location, etc. For example, a total expected number of evaluations may be obtained from model tuning application 222, and a current number of evaluations may be read from history table 224. A progress bar percentage shown by progress bar 902 may be computed by dividing the current number of evaluations by the total expected number of evaluations.

Referring again to FIG. 8A, in an operation 814, a current page template is updated with new data read from history table 224 as needed based on the characteristics of the current page template. For example, on a first iteration of operation 814, the current page template may be the progress view page selected in operation 812 that describes progress view window 900, and the new data is all of the data currently written to history table 224. On a next iteration of operation 814, the current page template may have been changed through a user interaction with the visualization user interface window as described further below. The new data read from history table 224 is the data written to history table 224 since the last read from history table 224.

For illustration, the current page template may be updated by editing a text file associated with the current page template and processed to include the new data. For example, the text file may be encoded using tags that are replaced with the new data read from the columns of history table 224 and inserted in the appropriate location based on the tag. The text file may be defined using a markup language such as the extensible markup language. Each page template included in the selected report template may use different columns of data read from history table 224. The text file describes the characteristics of the graphical objects rendered for the currently selected page in the visualization user interface window. The graphical objects include control buttons, graphs of various types, interactive tables, interactive data points, text, etc.

In an operation 816, the visualization user interface window is updated to present the new data using the updated current page template. For illustration, the text file may be imported into SAS® Visual Analytics that updates the graphical objects associated with the current page template using the new data read from the text file and associated with the graphical objects. In this way, visualization application 226 is a Web wrapper application that uses SAS® Visual Analytics to render each page. In alternative embodiments, other graphics rendering tools may be used.

In an operation 818, a determination is made concerning whether an end of the refresh time period has been reached based on a last refresh time and a value of the refresh time period indicated in operation 804. When the end of the refresh time period has been reached, processing continues in operation 814 to update the graphical objects associated with the current page template. When the end of the refresh time period has not been reached, processing continues in an operation 820.

In operation 820, a determination is made concerning whether an interaction by the user with the visualization user interface window is detected. When the interaction by the user with the visualization user interface window is detected, processing continues in an operation 822. When the interaction by the user with the visualization user interface window is not detected, processing continues in operation 818.

In operation 822, a determination is made concerning whether the interaction is to switch to a different view. When the interaction is to switch to a different view, processing continues in an operation 830 shown referring to FIG. 8B. When the interaction is not to switch to a different view, processing continues in an operation 824.

In operation 824, a determination is made concerning whether the interaction is to switch to a different page of the detail view. When the interaction is to switch to a different page of the detail view, processing continues in an operation 841 shown referring to FIG. 8B. When the interaction is not to switch to a different page of the detail view, processing continues in an operation 826.

In operation 826, a determination is made concerning whether the interaction is to select a cancel tuning selector. When the interaction is to select the cancel tuning selector, processing continues in an operation 842 shown referring to FIG. 8B. When the interaction is not to select the cancel tuning selector, processing continues in an operation 828.

In operation 828, a determination is made concerning whether the interaction is to select a stop tuning selector. When the interaction is to select the stop tuning selector, processing continues in an operation 844 shown referring to FIG. 8B. When the interaction is not to select the stop tuning selector, processing continues in an operation 850 shown referring to FIG. 8C.

Referring to FIG. 8B, in operation 830, a determination is made concerning whether the switch to the different view is to the progress view. When the interaction is to switch to the progress view, processing continues in an operation 832. When the interaction is not to switch to the progress view, processing continues in an operation 834.

In operation 832, the progress view page template is selected from the selected report template as the current page template, and processing continues in operation 814 to present and to update the progress view page and the visualization user interface window to show the updated progress view.

In operation 834, a determination is made concerning whether the switch to the different view is to the compact view. When the interaction is to switch to the compact view, processing continues in operation 836. When the interaction is not to switch to the compact view, processing continues in an operation 838.

In operation 836, the compact view page template is selected from the selected report template to describe a compact view page, and processing continues in operation 814 to present and to update the compact view page such that the visualization user interface window shows the updated compact view.

Figure 9B:
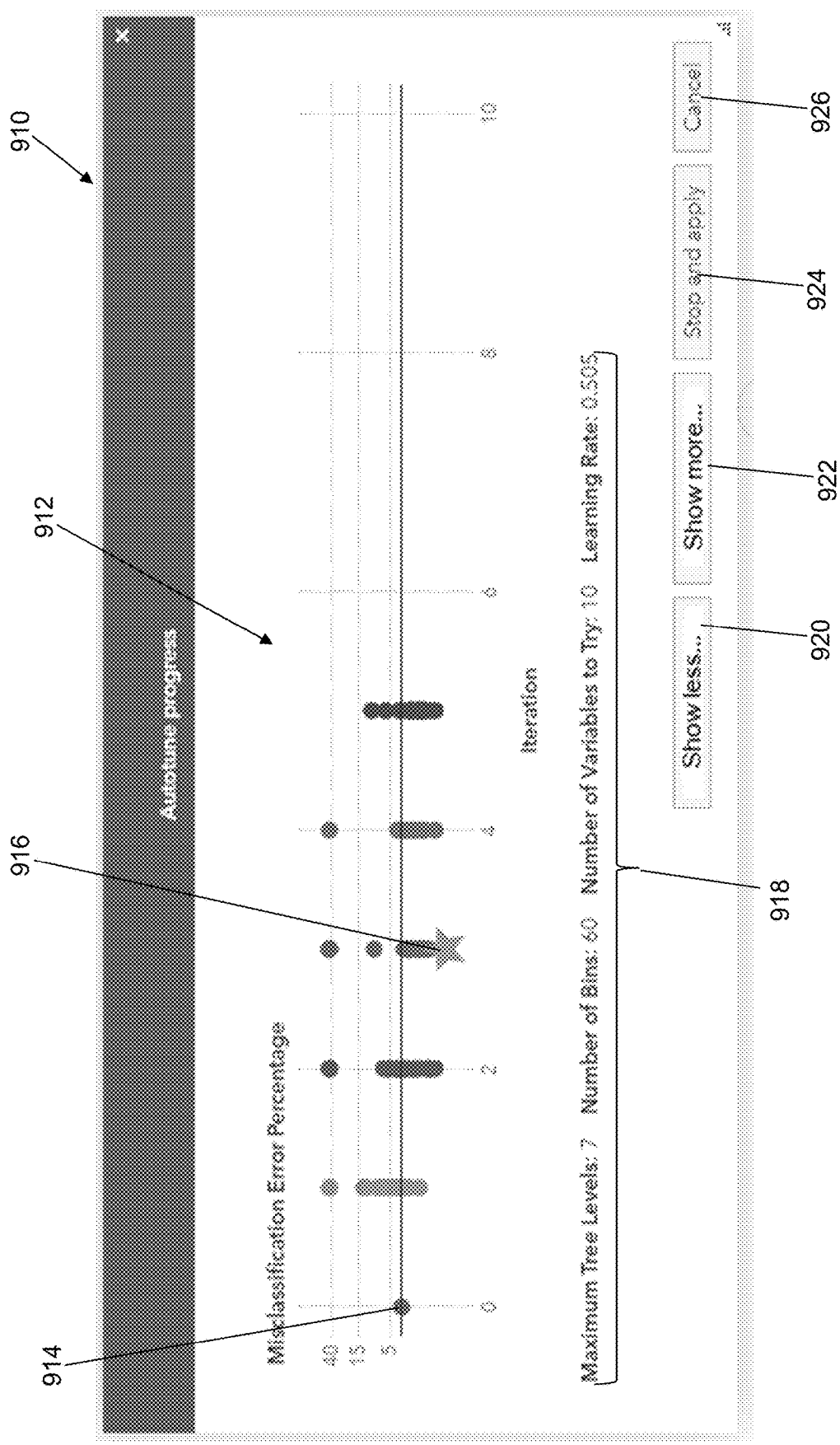
FIG. 9B shows a compact view page of a visualization user interface window presented to visually monitor the tuning process in accordance with an illustrative embodiment.

Referring to FIG. 9B, a compact view page 910 is presented in the visualization user interface window in accordance with an illustrative embodiment. Compact view page 910 may include a scatter plot 912 of the objective function value as a function of the iteration counter. Data points of scatter plot 912 may be presented using different colors and/or symbols to further distinguish each iteration. Scatter plot 912 allows the user to quickly see the history of the objective function values and view the progress of the tuning process iteration-by-iteration. If the tuning process is improving the quality of the machine learning model, the cloud of data points on the graph will be shifting down and ideally converging to a narrower range. If the tuning process is not improving the quality of the machine learning model on subsequent iterations, the user can stop the execution, make corrections to the tuning process setup, and restart the tuning process again.

A baseline point 914 represents the objective function value of the baseline hyperparameter configuration with a horizontal line drawn therethrough to delineate improved evaluations (improvements over the initial objective value shown below the horizontal line) from worse evaluations shown above the horizontal line. A best identified point 916 at any moment may be marked with a distinguishing symbol and/or color such as a gold star. Best identified point 916 changes as the model tuning process executes.

Hovering a pointer a predefined period of time above any point on scatter plot 912 may display a pop-up panel with the values of the hyperparameters and the objective function associated with that point. Scatter plot 912 may further include indicators and values 918 for each hyperparameter associated with best identified point 916 based on the model type being tuned and which hyperparameters are being tuned of the model type.

Compact view page 910 may further include a switch to detail view button 920, a switch to progress bar view button 922, a stop button 924, and a cancel button 926. Selection of switch to detail view button 920 by the user triggers an indicator that the interaction is to switch the visualization user interface window to show the detail view described further below. Selection of switch to switch to progress bar view button 922 by the user triggers an indicator that the interaction is to switch the visualization user interface window to show the progress view. Selection of stop button 912 by the user triggers an indicator that the interaction is to select the hyperparameter values associated with best identified point 916 and to select the stop tuning selector. Selection of cancel button 914 by the user triggers an indicator that the interaction is to select the cancel tuning selector.

Referring again to FIG. 8B, in operation 838, a determination is made concerning whether the switch to the different view is to the detail view. When the interaction is to switch to the detail view, processing continues in operation 840. When the interaction is not to switch to the detail view, processing continues in operation 818.

In operation 840, a first page of the detail view page is selected from the selected report template as the current page template, and processing continues in operation 814 to present and to update the detail view page and the visualization user interface window to show the updated detail view.

In operation 841, a new page of the detail view page is selected from the selected report template as the current page template, and processing continues in operation 814 to present and to update the detail view page and the visualization user interface window to show the newly selected page of the detail view. For example, the user may select the new page from a tab included on each page of the detail view as described further below.

Figure 10:
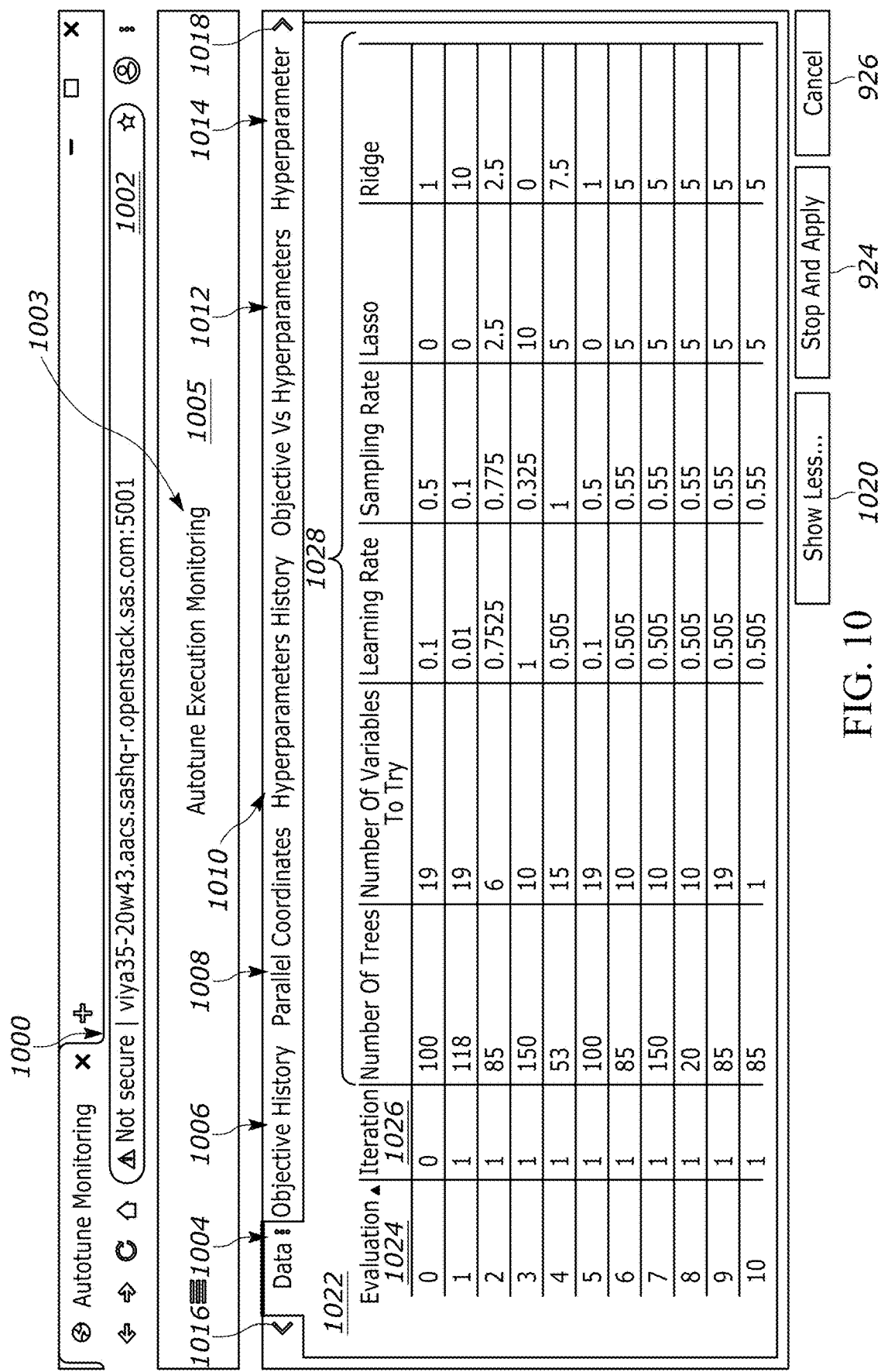
FIG. 10 shows a detail view page of a visualization user interface window presented to visually monitor the tuning process in accordance with an illustrative embodiment.

Referring to FIG. 10, a detail view page 1000 is presented in the visualization user interface window in accordance with an illustrative embodiment. Detail view page 1000 may include a browser address bar 1002 and a detail page area 1003. Detail page area 1003 may include a plurality of page links below a banner 1005. Each of the plurality of page links may be tabs associated with a different page of the detail view. In the illustrative embodiment, the plurality of page links include a data link 1004, an objective history link 1006, a parallel coordinates link 1008, a hyperparameters history link 1010, an objective vs hyperparameters link 1012, a hyperparameters distribution link 1014, and an evaluation time link 1600 (shown referring to FIG. 16). The user can switch between pages of detail view page 1000 by selecting a page link of the plurality of page links. Selection of a page link of the plurality of page links triggers an indicator to switch to the selected page view. A page template included in the selected report template may be associated with each page link and is designed to present the information shown in each page view described further below.

Figure 16:
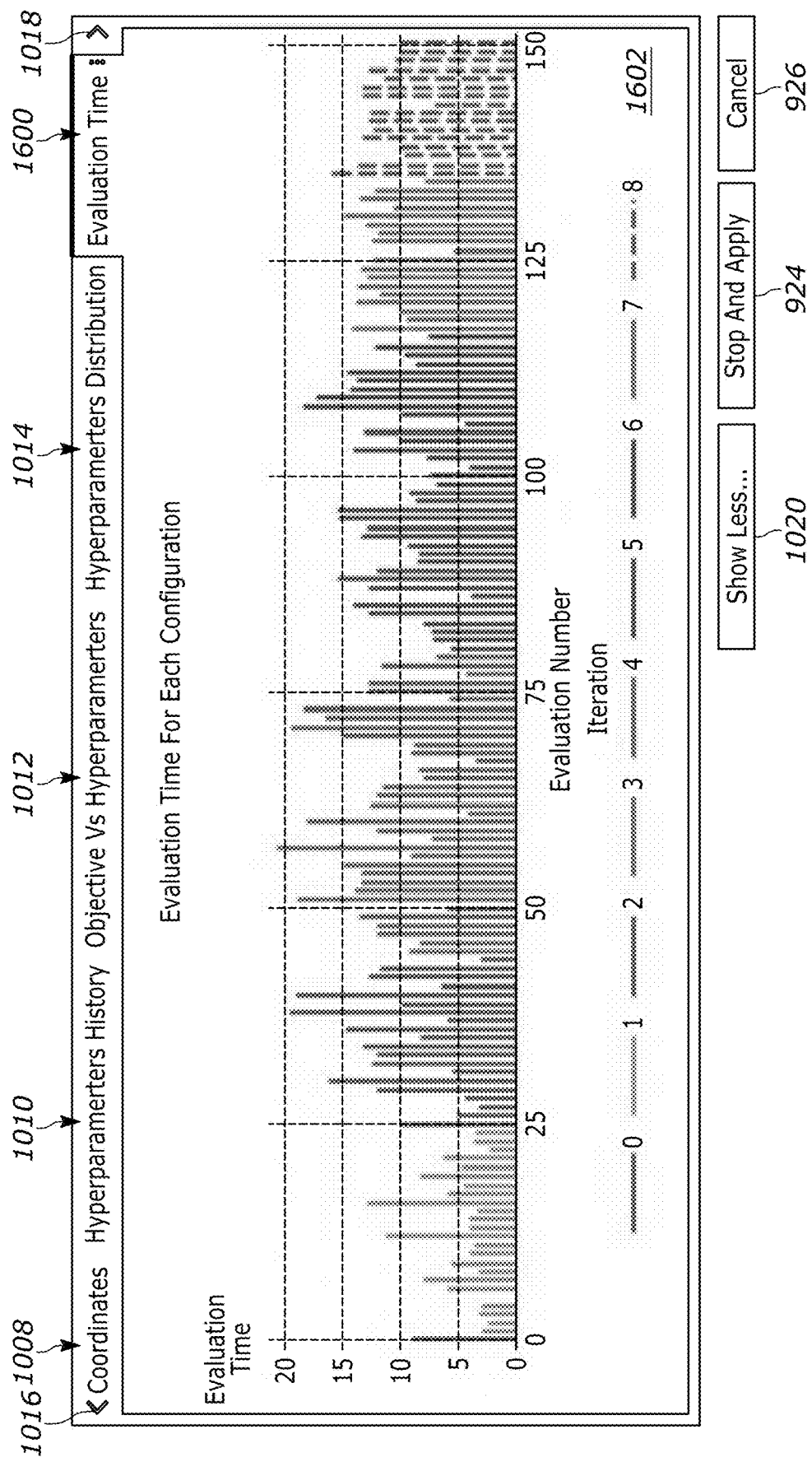
FIG. 16 shows an evaluation time page of a visualization user interface window presented to visually monitor the tuning process in accordance with an illustrative embodiment.

Detail view page 1000 may further include a left scroll button 1016, a right scroll button 1018, a switch to compact view button 1020, a stop button 924, and cancel button 926. Selection of left scroll button 1016 by the user triggers presentation of the plurality of page links scrolled to the left. Selection of right scroll button 1018 by the user triggers presentation of the plurality of page links scrolled to the right. For example, selection of right scroll button 1018 may trigger presentation of evaluation time link 1600 as shown in FIG. 16. Selection of switch to compact view button 1020 by the user triggers an indicator that the interaction is to switch the visualization user interface window to show the compact view.

For illustration, the page template associated with data link 1004 creates a data table 1022 where the values of the hyperparameter configurations that have been processed are shown. Data table 1022 includes an evaluation counter column 1024, an iteration counter column 1026, a plurality of hyperparameter columns 1028 based on the model type being tuned, an objective function column (not shown), and an evaluation time column (not shown). Data presented in data table 1022 can be sorted by any column in ascending or descending order by selecting an up or down arrow included in each column header when the column is selected by the user. Text used for each column header as well as the numerical values included in data table 1022 are read from history table 224 and inserted into the page template associated with data link 1004.

Figure 11:
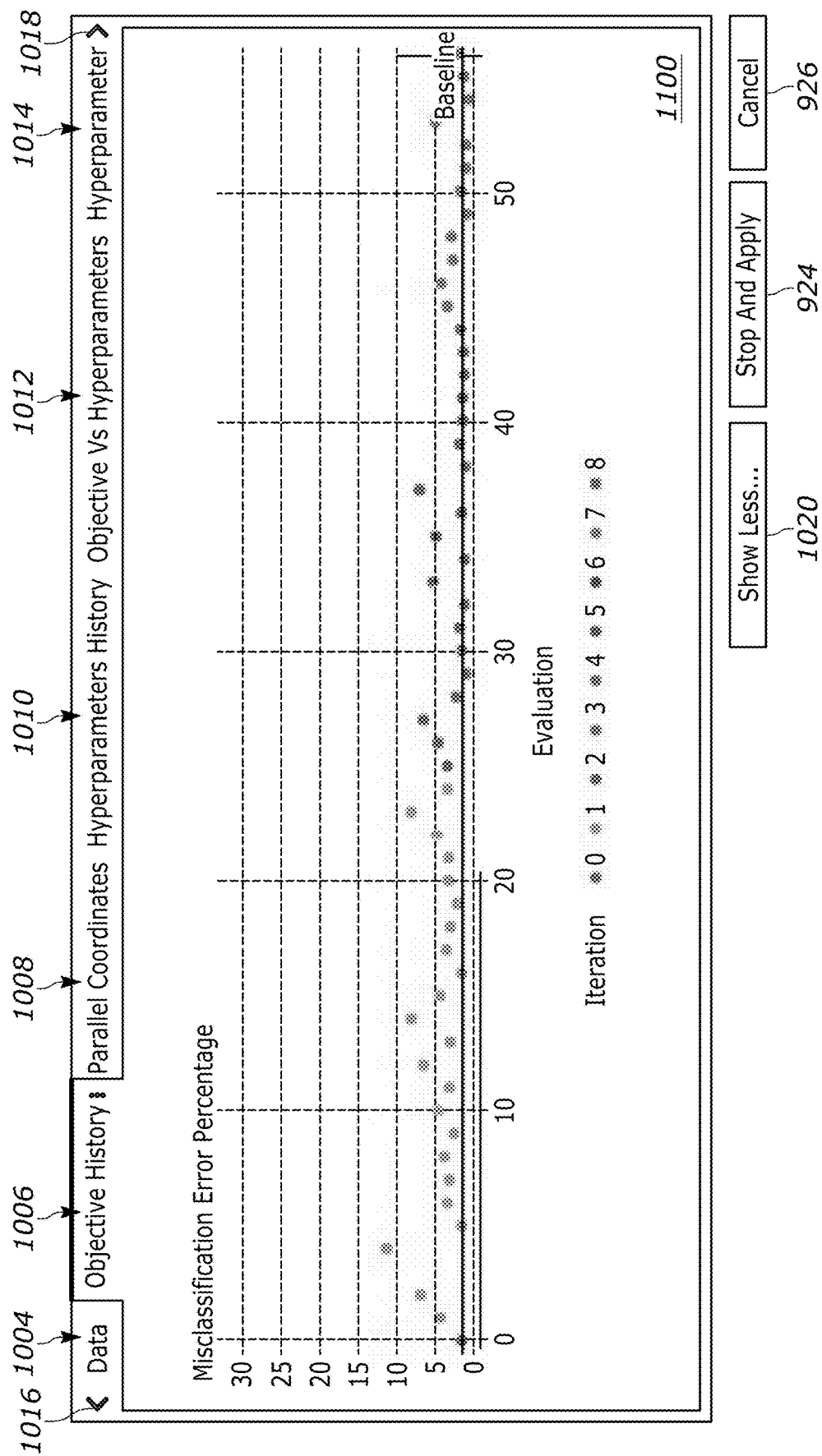
FIG. 11 shows an objective history page of a visualization user interface window presented to visually monitor the tuning process in accordance with an illustrative embodiment.

Referring to FIG. 11, the page template associated with objective history link 1006 creates an objective function scatter plot 1100 where the objective function value is plotted as a function of the evaluation number in accordance with an illustrative embodiment. Different iteration numbers may be represented using different colors and/or symbols as indicated below the x-axis of objective function scatter plot 1100. Objective function scatter plot 1100 allows the user to quickly see a history of the objective function values and view the progress of the tuning process evaluation-by-evaluation. Hovering a pointer a predefined period of time above any point on objective function scatter plot 1100 may display the pop-up panel with the values of the hyperparameters and the objective function associated with that point.

Text used for each axis as well as the numerical values used to plot the data points included in objective function scatter plot 1100 are read from history table 224 and inserted into the page template associated with objective history link 1006. If the tuning process is improving the quality of the machine learning model, the cloud of data points on the graph will be shifting down and ideally converging to a narrower range with increasing evaluation number and iteration number.

Figure 12A:
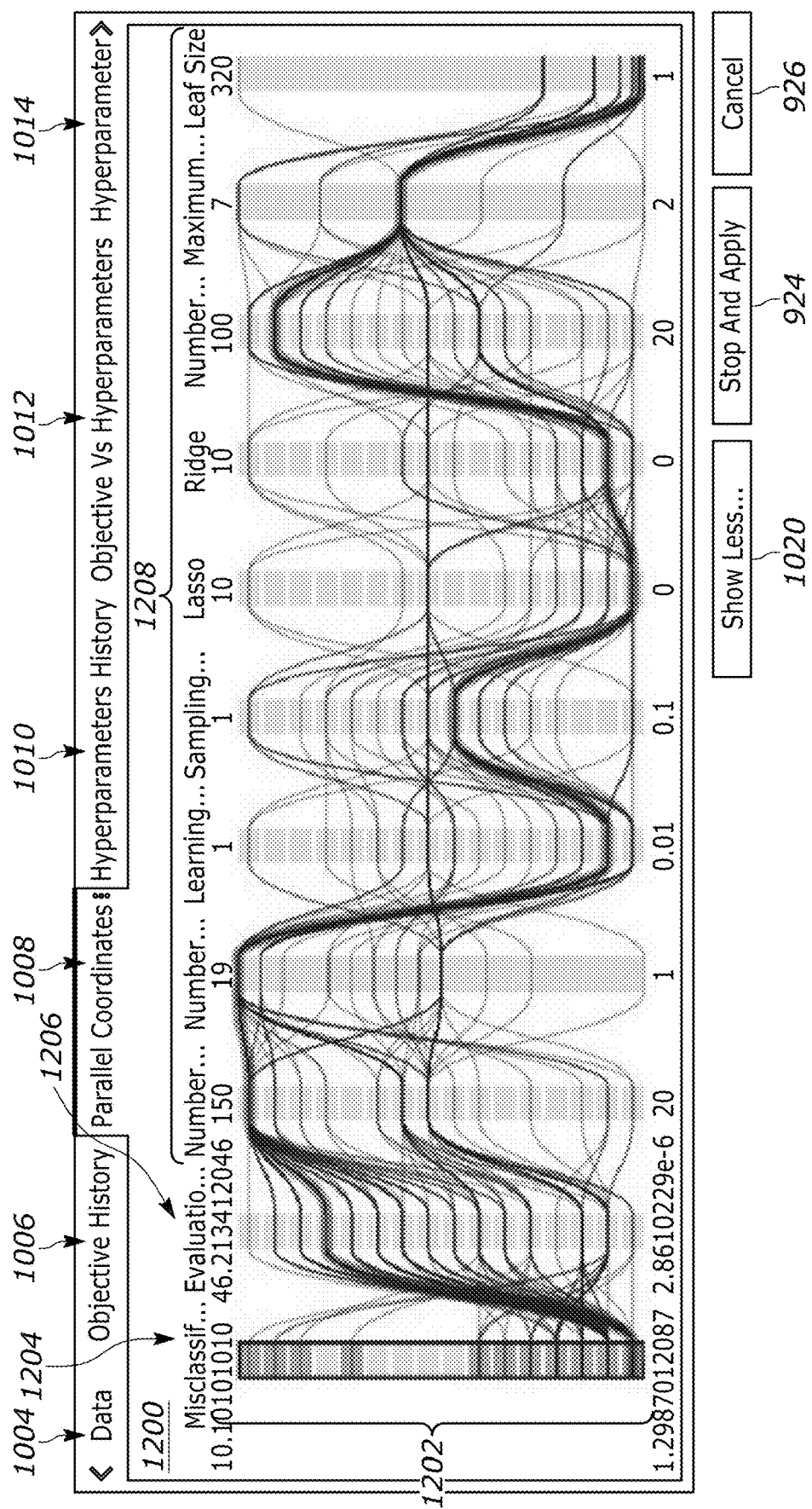
FIGS. 12A-12C show a parallel coordinates page of a visualization user interface window presented to visually monitor the tuning process in accordance with an illustrative embodiment.

Referring to FIG. 12A, the page template associated with parallel coordinates link 1008 creates a parallel coordinates graph 1200 in accordance with an illustrative embodiment that includes boxes 1202 arranged in separate columns for the objective function value, for the evaluation time value, and for each hyperparameter of the plurality of hyperparameters. A maximum value for each of the objective function value, the evaluation time value, and each hyperparameter of the plurality of hyperparameters is shown above the boxes 1202 associated with each column. A minimum value for each of the objective function value, the evaluation time value, and each hyperparameter of the plurality of hyperparameters is shown below the boxes 1202 associated with each column. Each box represents a range of values between a box minimum value and a box maximum value much like a bar of a histogram. Boxes 1202 included in each column are arranged to represent continuous values from the minimum value to the maximum value for each of the objective function value, the evaluation time value, and each hyperparameter of the plurality of hyperparameters.

Boxes 1202 for the objective function are shown in an objective function column 1204. A range of objective function values are included in each objective function box. Though not displayed, each objective function box is associated with a minimum box value and a maximum box value computed based on a number of the boxes 1202 for the objective function, a maximum objective function value, and a minimum objective function value. Each objective function value computed for each hyperparameter configuration executed by the model tuning process falls into a single objective function box.

Boxes 1202 for the evaluation time are shown in an evaluation time column 1206. A range of evaluation time values are included in each evaluation time box. Though not displayed, each evaluation time box is associated with a minimum box value and a maximum box value computed based on a number of the boxes 1202 for the evaluation time, a maximum evaluation time value, and a minimum evaluation time value. Each evaluation time value falls into a single evaluation time box.

Boxes 1202 for each hyperparameter of the plurality of hyperparameters are shown in successive labeled hyperparameter columns 1208. A range of respective hyperparameter values are included in each respective hyperparameter box. Though not displayed, each respective hyperparameter box is associated with a minimum box value and a maximum box value computed based on a number of the boxes 1202 for each hyperparameter, a maximum respective hyperparameter value, and a minimum respective hyperparameter value. Each respective hyperparameter value falls into a single box of a respective column.

Figure 12B:
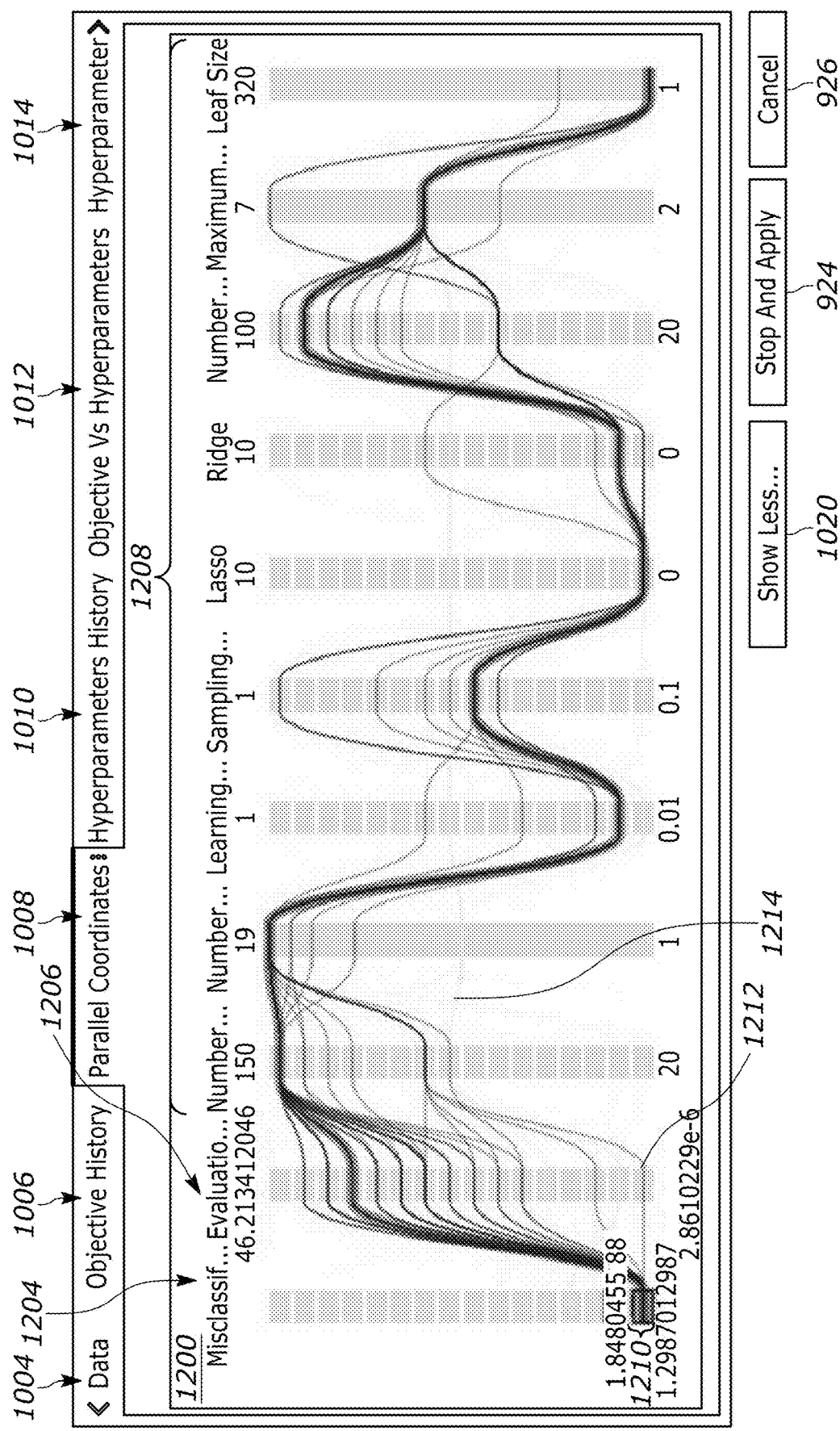

Each evaluated hyperparameter configuration is represented by a different configuration line 1212 (shown referring to FIG. 12B) that connects a center of a box in each column based on the objective function value, the evaluation time value, and each hyperparameter value of the plurality of hyperparameters of a respective configuration. In the illustrative embodiment, the region between the minimum value and the maximum value is divided into 16 equal parts or bins though a different number of bins may be used in alternative embodiments. Again, values of each hyperparameter, objective function value, or evaluation time value that fall within a bin are drawn on the graph in the middle of that bin, and the values for a respective hyperparameter configuration are connected by a line such as configuration line 1212.

Text used as a header for each column, the maximum values, and the minimum values, as well as the numerical values used to plot the lines that connect boxes 1202 for each hyperparameter configuration and a respective objective function value and evaluation time value included in parallel coordinates graph 1200 are read from history table 224 and inserted into the page template associated with parallel coordinates link 1008.

Boxes 1202 in the objective function column may be interactive in that one or more boxes may be selected by the user to highlight the lines that connect boxes 1202 between each hyperparameter configuration that resulted in objective function values that fall within the range of values defined by the selected one or more boxes. For example, referring to FIG. 12B, parallel coordinates graph 1200 is updated to highlight the lines that emanate from one or more boxes 1210 that were a range of objective function boxes selected by the user from boxes 1202 for the objective function. The lines that originate from the one or more boxes 1210 such as configuration line 1212 may be darkened, colored, and/or thickened to highlight them while remaining lines such as a second configuration line 1214 are lightened or narrowed. For example, configuration line 1212 may be blue while second configuration line 1214 is gray.

Figure 12C:
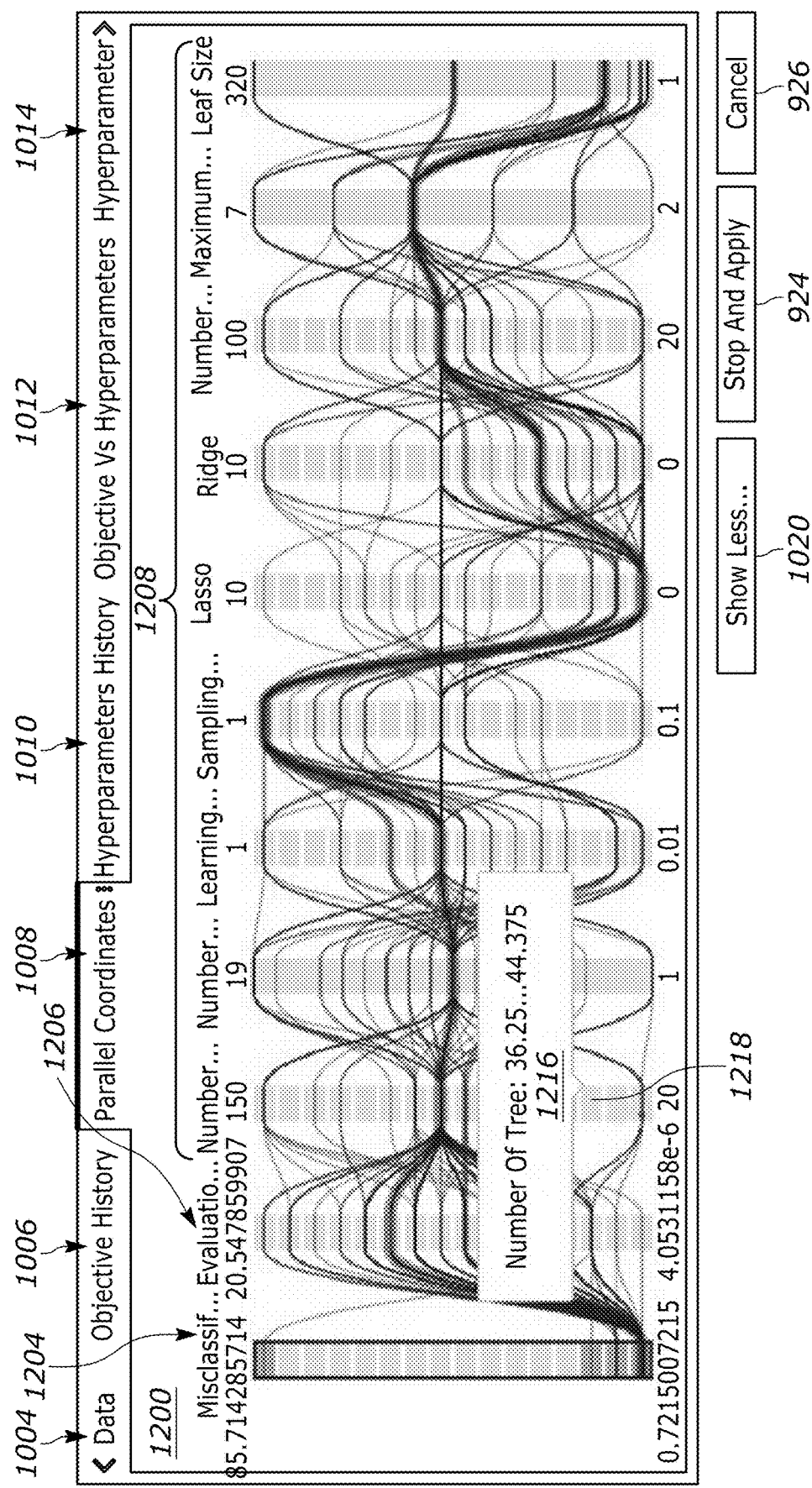

Filtering of the objective function values allows the user to quickly see how a specific range of objective function values projects onto the boxes 1202 of each hyperparameter. By selecting a desired region of the objective function axis defined by the one or more boxes 1210, the user can quickly identify more promising regions of values for the hyperparameters and potential trends and opportunities for reducing the tuning search space in future tuning processes. For example, if after filtering the lines to a desired region of the objective function values, one of the hyperparameters is concentrated in a small region of the entire column, the user can select that region as the new bounds for that hyperparameter. These bounds can be applied by model tuning application 222 before the next execution of the tuning process. Hovering a pointer a predefined period of time above any box of the boxes 1202 may trigger display of a pop-up panel 1216 shown referring to FIG. 12C that shows the minimum box value and the maximum box value of the selected box. For example, the user hovered the pointer a predefined period of time above a selected box 1218 which triggers presentation of pop-up panel 1216 that show a minimum number of trees value and a minimum number of trees value included in selected box 1218.

Figure 13A:
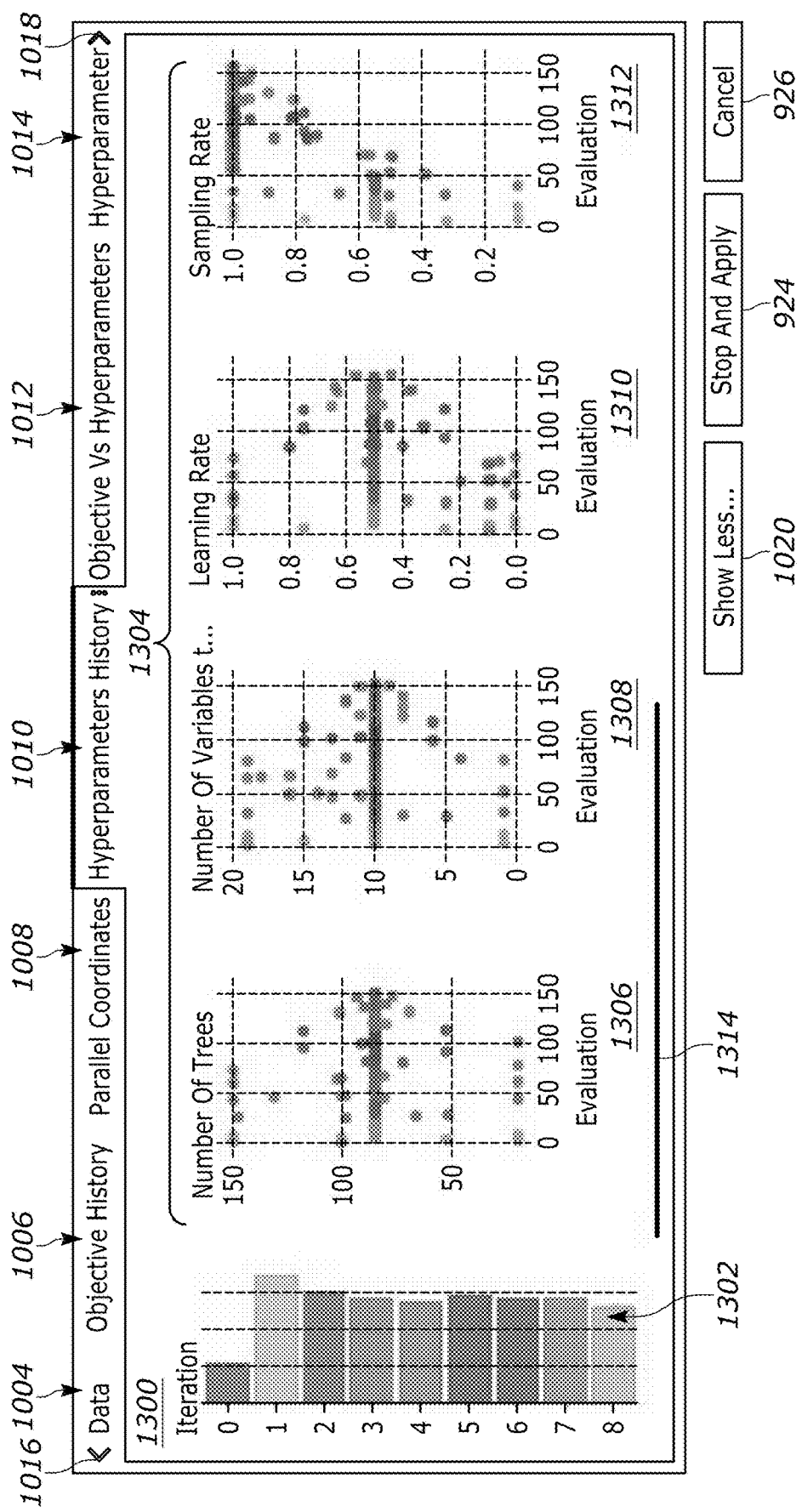
FIGS. 13A and 13B show a hyperparameters history page of a visualization user interface window presented to visually monitor the tuning process in accordance with an illustrative embodiment.

Referring to FIG. 13A, the page template associated with hyperparameters history link 1010 creates a hyperparameters history page 1300 in accordance with an illustrative embodiment that includes an iteration histogram 1302 and a plurality of scatter plots 1304. The plurality of scatter plots 1304 include a scatter plot created for each hyperparameter of the plurality of hyperparameters. For example, the plurality of scatter plots 1304 include a number of trees scatter plot 1306, a number of variables to try scatter plot 1308, a learning rate scatter plot 1310, a sampling rate scatter plot 1312, etc. for a gradient boosting tree model type. Each scatter plot plots the associated hyperparameter value as a function of the evaluation number. A scroll bar 1314 allows the user scroll to additional hyperparameter scatter plots. Text used for each axis of each scatter plot as well as the numerical values used to plot the data points included in iteration histogram 1302 and the plurality of scatter plots 1304 are read from history table 224 and inserted into the page template associated with hyperparameters history link 1010.

Iteration histogram 1302 is located to a left of the plurality of scatter plots 1304. Both the scatter plot symbols and iteration histogram 1302 are colored with a common color indicating a specific iteration counter to amplify a distinction between the hyperparameter values evaluated each iteration. Iteration histogram 1302 is a histogram that shows a number of evaluations included in each iteration as a function of the iteration with the histogram shown vertically.

Figure 13B:
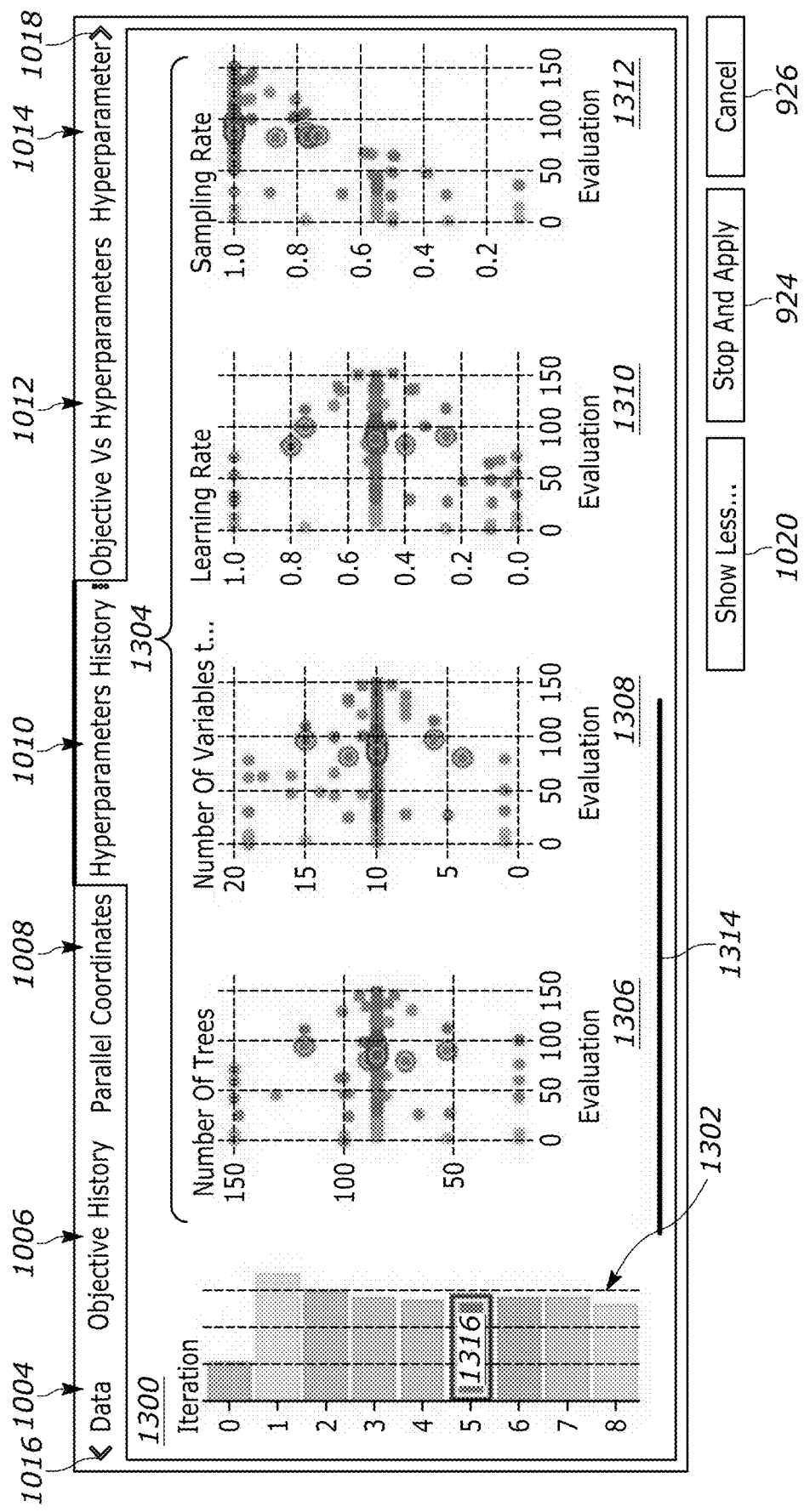

Iteration histogram 1302 may be an interactive bar chart that allows the user to select a bar included in iteration histogram 1302 that triggers an indicator to highlight scatter plot symbols associated with the iteration indicated by the selected iteration bar. For example, referring to FIG. 13B, an iteration bar 1316 of iteration histogram 1302 is selected by the user triggering a highlight of the scatter plot symbols in each of the plurality of scatter plots 1304 for iteration number 5 associated with iteration bar 1316.

Figure 14A:
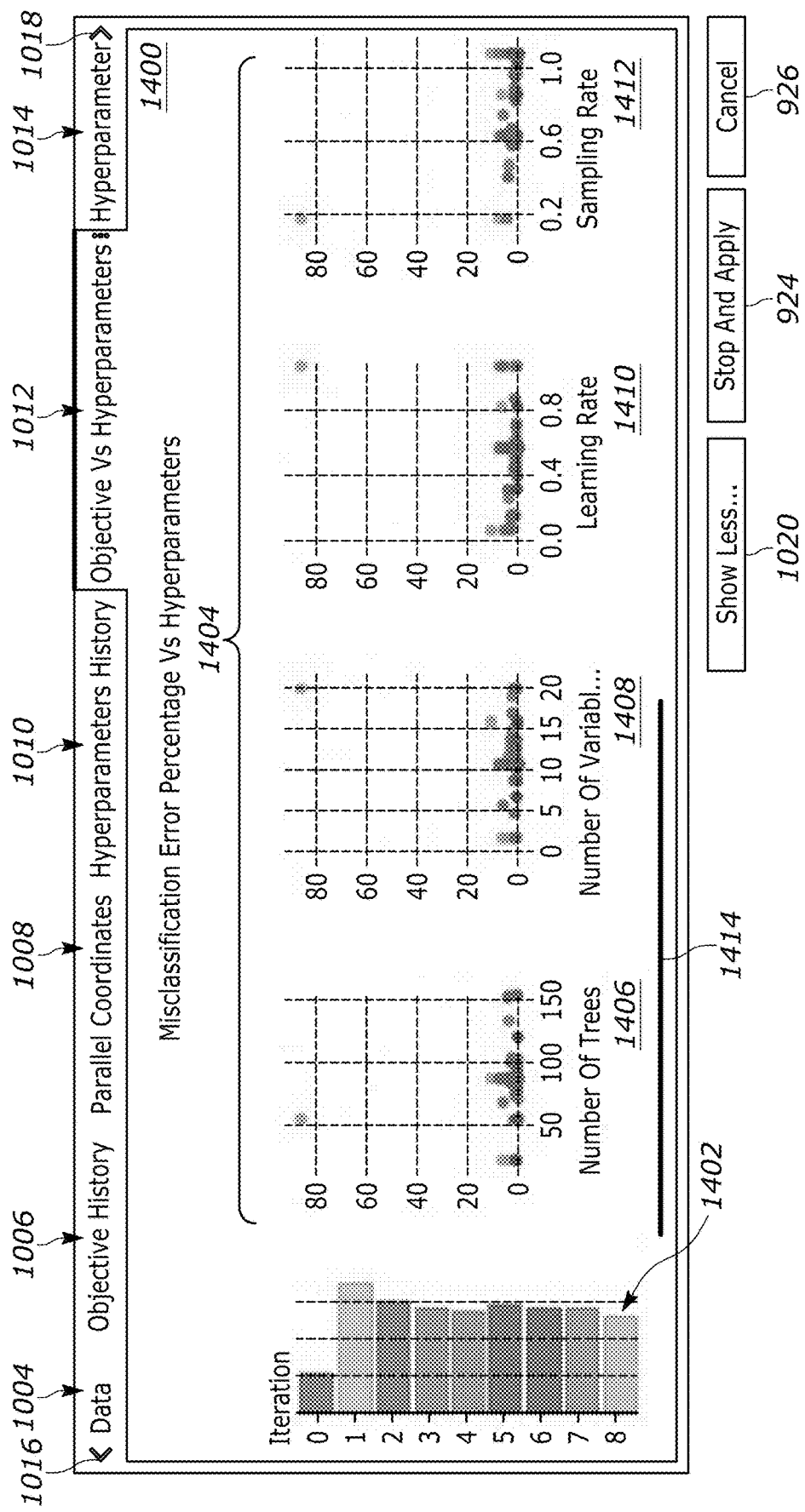
FIGS. 14A and 14B show an objective vs hyperparameters page of a visualization user interface window presented to visually monitor the tuning process in accordance with an illustrative embodiment.

Referring to FIG. 14A, the page template associated with objective vs hyperparameters link 1012 creates an objective vs hyperparameters history page 1400 in accordance with an illustrative embodiment that includes a second iteration histogram 1402 and a second plurality of scatter plots 1404. The second plurality of scatter plots 1404 include a scatter plot created for each hyperparameter of the plurality of hyperparameters. For example, the second plurality of scatter plots 1404 include a second number of trees scatter plot 1406, a second number of variables to try scatter plot 1408, a second learning rate scatter plot 1410, a second sampling rate scatter plot 1412, etc. Each second scatter plot plots the objective function value as a function of the associated hyperparameter value. A second scroll bar 1414 allows the user scroll to additional hyperparameter scatter plots. Text used for each axis of each scatter plot as well as the numerical values used to plot the data points included in second iteration histogram 1402 and the second plurality of scatter plots 1404 are read from history table 224 and inserted into the page template associated with objective vs hyperparameters link 1012.

Second iteration histogram 1402 is located to a left of the second plurality of scatter plots 1404. Both the scatter plot symbols and second iteration histogram 1402 are colored with a common color indicating a specific iteration counter to amplify a distinction between the hyperparameter values evaluated each iteration. Second iteration histogram 1402 is a histogram that shows a number of evaluations included in each iteration as a function of the iteration with the histogram shown vertically.

Figure 14B:
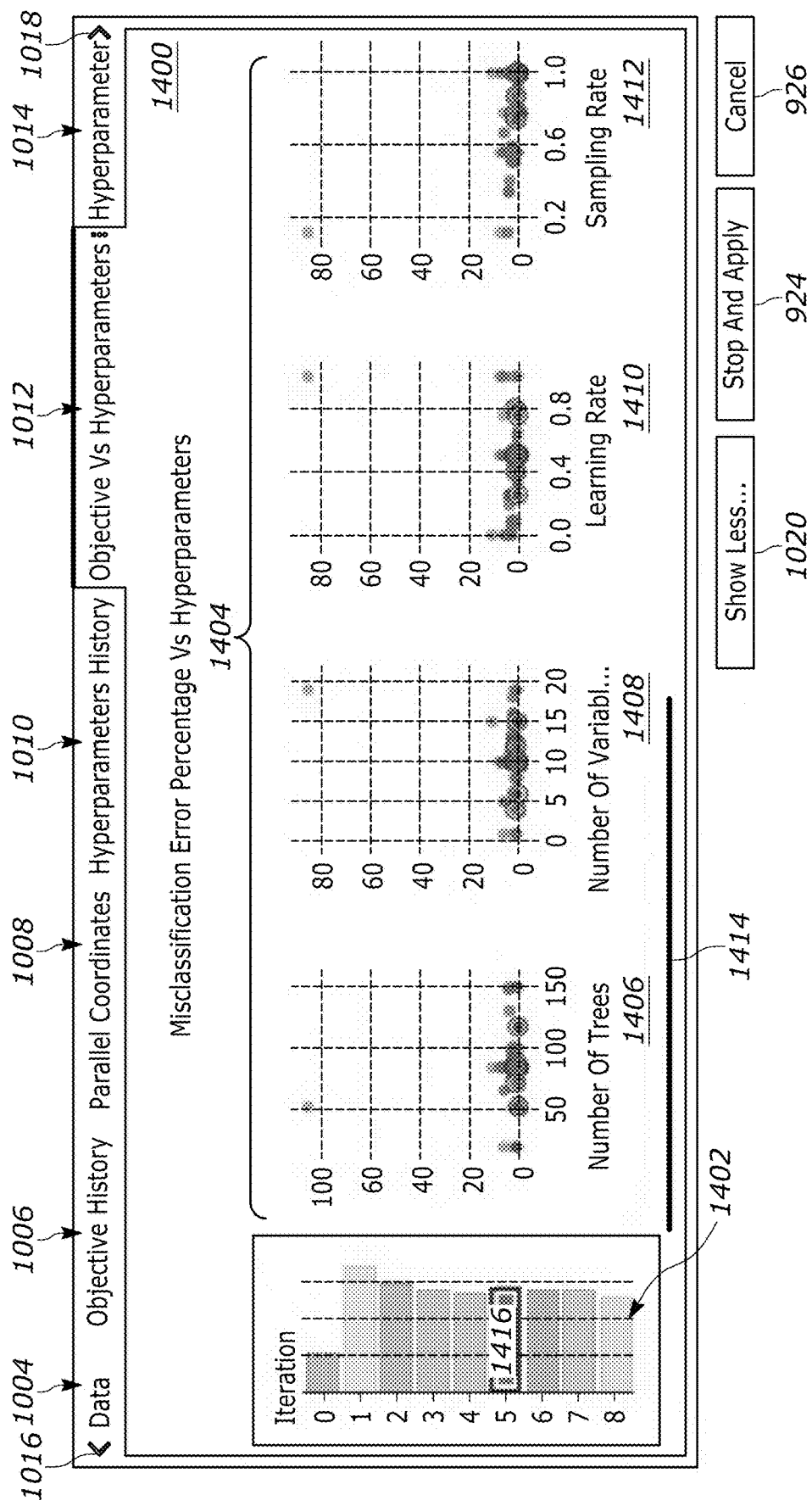

Second iteration histogram 1402 may be an interactive bar chart that allows the user to select a bar included in second iteration histogram 1402 that triggers an indicator to highlight scatter plot symbols associated with the iteration indicated by the selected iteration bar. For example, referring to FIG. 14B, a second iteration bar 1416 of second iteration histogram 1402 is selected by the user triggering a highlight of the scatter plot symbols in each of the second plurality of scatter plots 1404 for iteration number 5 associated with second iteration bar 1416.

Figure 15:
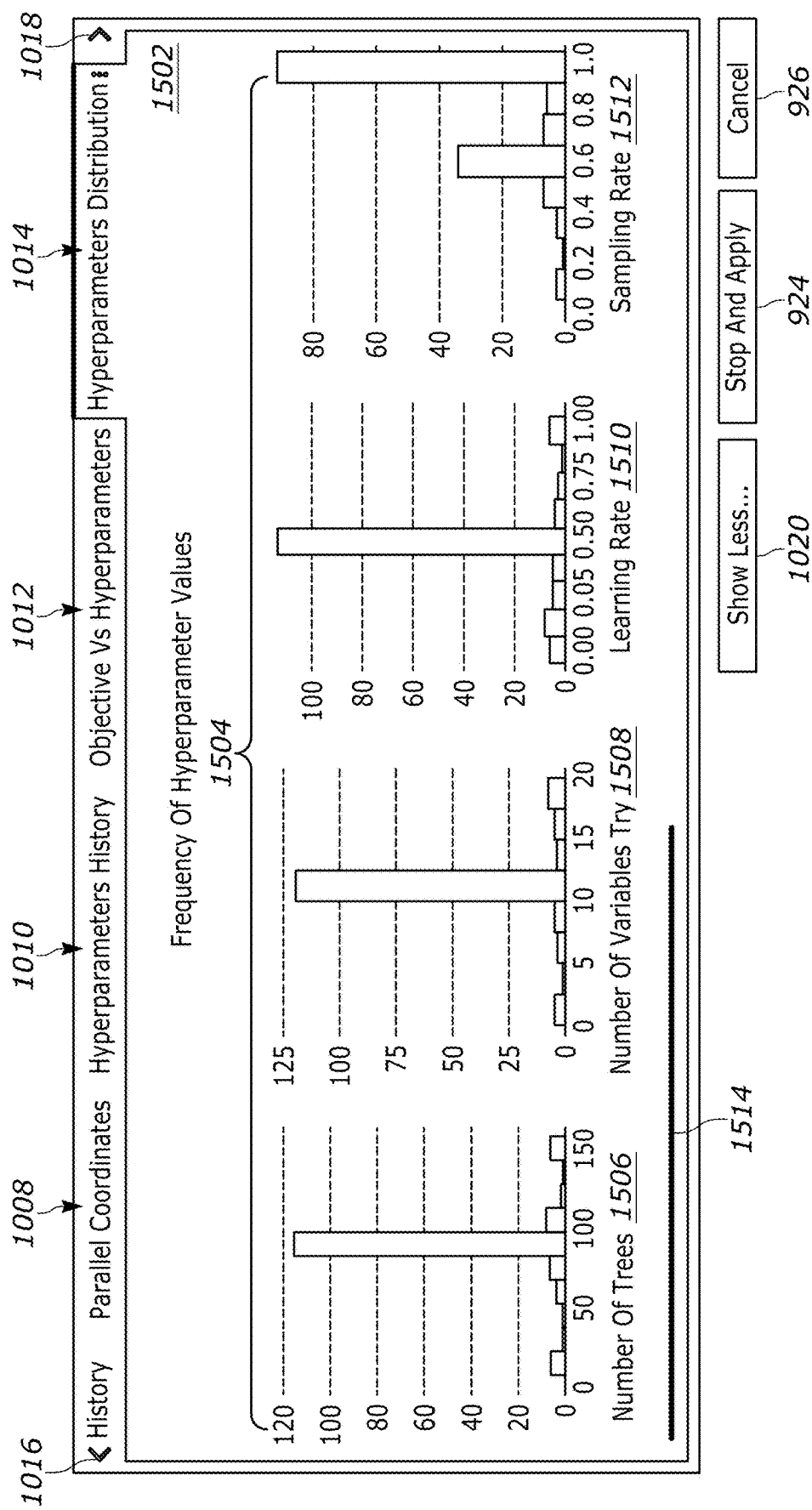
FIG. 15 shows a hyperparameters distribution page of a visualization user interface window presented to visually monitor the tuning process in accordance with an illustrative embodiment.

Referring to FIG. 15, the page template associated with hyperparameters distribution link 1014 creates a hyperparameters distribution page 1502 in accordance with an illustrative embodiment that includes a plurality of histograms 1504. The plurality of histograms 1504 includes a histogram created for each hyperparameter of the plurality of hyperparameters defined by the model type being tuned. For example, the plurality of histograms 1504 include a number of trees histogram 1506, a number of variables to try histogram 1508, a learning rate histogram 1510, a sampling rate histogram 1512, etc. Each histogram shows a distribution of the values of the associated hyperparameter between a minimum value and a maximum value. In an illustrative embodiment, each histogram may include ten bins though a greater or a fewer number of bins may be used in alternative embodiments.

A third scroll bar 1514 allows the user to scroll to additional hyperparameter histograms. Text used for each hyperparameter of each histogram as well as the numerical values used to plot the data points included in the plurality of histograms 1504 are read from history table 224 and inserted into the page template associated with hyperparameters distribution link 1014. Hyperparameters distribution page 1502 allows the user to quickly identify regions of hyperparameter values where the tuning process concentrated more effort.

Referring to FIG. 16, the page template associated with evaluation time link 1600 creates an evaluation time graph 1602 in accordance with an illustrative embodiment. Evaluation time graph 1602 shows a history of the evaluation time for each evaluation processed by the model tuning process. Evaluation time graph 1602 plots the evaluation time value as a function of the evaluation number. For illustration, a needle plot type is used to present evaluation time graph 1602 where each value is represented by a narrow bar (needle). Different iteration numbers may be represented using different colors and/or symbols as indicated below the x-axis of evaluation time graph 1602. Text used for each axis as well as the numerical values used to plot the data points included in evaluation time graph 1602 are read from history table 224 and inserted into the page template associated with evaluation time link 150. Evaluation time graph 1602 allows the user to identify trends with respect to the configuration evaluation time and see whether the model tuning process converged to configurations with a higher evaluation time or a lower evaluation time.

A portion of an illustrative report template is shown below:

```
{
  "@element": "Report",
  "xmlns": "http://xxx/reportmodel/bird-4.2.4",
  "label": "VA_Report_9",
  "createdApplicationName": "Visual Analytics",
  ...
  "refresh": "fixed",
  "refreshRate": 2,
  "dataDefinitions": [ ... ],
  "dataSources": [
    {
      "@element": "DataSource",
      "name": "ds7",
      "label": "_AUTOTUNE_DATASET_NAME_",
      "type": "relational",
      "casResource": {
        "@element": "CasResource",
        "server": "cas-shared-default",
        "library": "_AUTOTUNE_CASLIB_NAME_",
        "table": "_AUTOTUNE_DATASET_NAME_",
      },
      "businessItemFolder": {
        "@element": "BusinessItemFolder",
        "items": [
          {
            "name": "bi8",
            "xref": "_AUTOTUNE_OBJECTIVE_NAME_",
            "@element": "DataItem"
          },
          {
            "name": "bi9",
            "xref": "_AUTOTUNE_PARM_1_",
            "@element": "DataItem"
          },
          ...
        ],
  "visualElements": [
    {
      "applyDynamicBrushes": "yes",
      "name": "ve26",
      "labelAttribute": "List table - Evaluation 1",
      "editorProperties": [
        {
          "@element": "Editor_Property",
          "key": "isAutoLabel",
          "value": "true"
        }
      ],
      "resultDefinitionList": [ "dd29" ],
      "dataList": [ "dd27" ],
      "@element": "Table", ...,
      "applyDynamicBrushes": "no",
      "name": "ve56",
      "labelAttribute": "Parallel coordinates plot - _AUTOTUNE_OBJECTIVE_NAME_ 1",
      "editorProperties": [ ... ],
      "gtml": "<StatGraph opaque=\"false\" includeMissingDiscrete=\"true\"...
```

-continued

```
        UngatedLineAttrs color=\"15790320\"/>\r\n
        </ParallelCoordinatesPlot>\r\n /LayoutRegion>\r\n</
StatGraph>\r\n"
    },
    ...
    "sections": [
    {
        "@element": "Section",
        "name": "vi6",
        "label": "Data",
        "header": { "mediaContainerList": [ ... ] ... },
        "body": { "mediaContainerList": [ ... ] ... },
    {
        "@element": "Section",
        "name": "vi43",
        "label": "Objective History", ...
    },
    {
        "@element": "Section",
        "name": "vi54",
        "label": "Parallel Coordinates", ...
    },
    {
        "@element": "Section",
        "name": "vi684",
        "label": "Evaluation Time", ...
    },
    },
    "mediaSchemes": [ ],
    "mediaTargets": [ ],
... }
```

Referring again to FIG. 8B, in operation 842, the cancel tuning indicator is sent to the executing instance of model tuning application 222, and processing continues in an operation 846.

In operation 844, the stop tuning indicator is sent to the executing instance of model tuning application 222, and processing continues in operation 846.

In operation 846, the visualization user interface window is closed. The user can also close the visualization user interface window at any time.

Referring to FIG. 8C, in operation 850, a determination is made concerning whether the interaction is to select a data point from scatter plot 902 or objective function scatter plot 1100. When the interaction is to select the data point from scatter plot 902 or objective function scatter plot 1100, processing continues in an operation 852. When the interaction is not to select the data point from scatter plot 902 or objective function scatter plot 1100, processing continues in an operation 854. For example, as already discussed, hovering a pointer above any point on scatter plot 902 may result in detection of the interaction to select a data point from scatter plot 902.

In operation 852, the pop-up panel is presented with the values of the hyperparameters and the objective function for the configuration associated with the selected data point, and processing continues in operation 818.

In operation 854, a determination is made concerning whether the interaction is to filter parallel coordinates graph 1200. When the interaction is to filter parallel coordinates graph 1200, processing continues in an operation 856. When the interaction is not to filter parallel coordinates graph 1200, processing continues in an operation 858.

In operation 856, parallel coordinates graph 1200 is updated based on user selections, and processing continues in operation 818. For example, referring to FIG. 12B, parallel coordinates graph 1200 is updated as described above to highlight certain lines based on the boxes 1202 of the objective function.

In operation 858, a determination is made concerning whether the interaction is to select a bar from iteration histogram 1302 of hyperparameters history link 1010. When the interaction is to select the bar from iteration histogram 1302, processing continues in an operation 860. When the interaction is not to select the bar from iteration histogram 1302, processing continues in an operation 862.

In operation 860, each scatter plot of the plurality of scatter plots 1304 shown in hyperparameters history link 1010 is updated based on the user selection, and processing continues in operation 818. For example, referring to FIG. 13B, hyperparameters history page 1300 is updated as described above.

In operation 862, a determination is made concerning whether the interaction is to select a bar from second iteration histogram 1402 of objective vs hyperparameters link 1012. When the interaction is to select the bar from second iteration histogram 1402, processing continues in an operation 864. When the interaction is not to select the bar from second iteration histogram 1402, processing continues in operation 818.

In operation 864, each scatter plot of the second plurality of scatter plots 1404 shown in objective vs hyperparameters link 1012 is updated based on the user selection, and processing continues in operation 818. For example, referring to FIG. 14B, objective vs hyperparameters history page 1400 is updated as described above.

Visualization application 226 allows the user to monitor the progress of the model tuning process while it is being executed by selection manager device 104. Visualization application 226 further allows the user to stop the model tuning process while it is being executed and request that a trained model be defined for the current best identified hyperparameter configuration as indicated, for example, by best identified point 906. Visualization application 226 further allows the user to cancel the model tuning process while it is being executed when performance is not as desired. The presented information provides the user with information that allows the user to adjust the tuning process parameters such as a range of values for one or more hyperparameters that may result in better tuning. The presented information also provides the user with information that allows the user to understand how the values of certain hyperparameters may interact and/or how sensitive the hyperparameter is to certain values. Because the model tuning process typically requires a large amount of computing resources, computing time, and user time, visualization application 226 can significantly reduce wasted computing resources, computing time, and user time as well as facilitate a better understanding of the tuning process.

Figure 17:
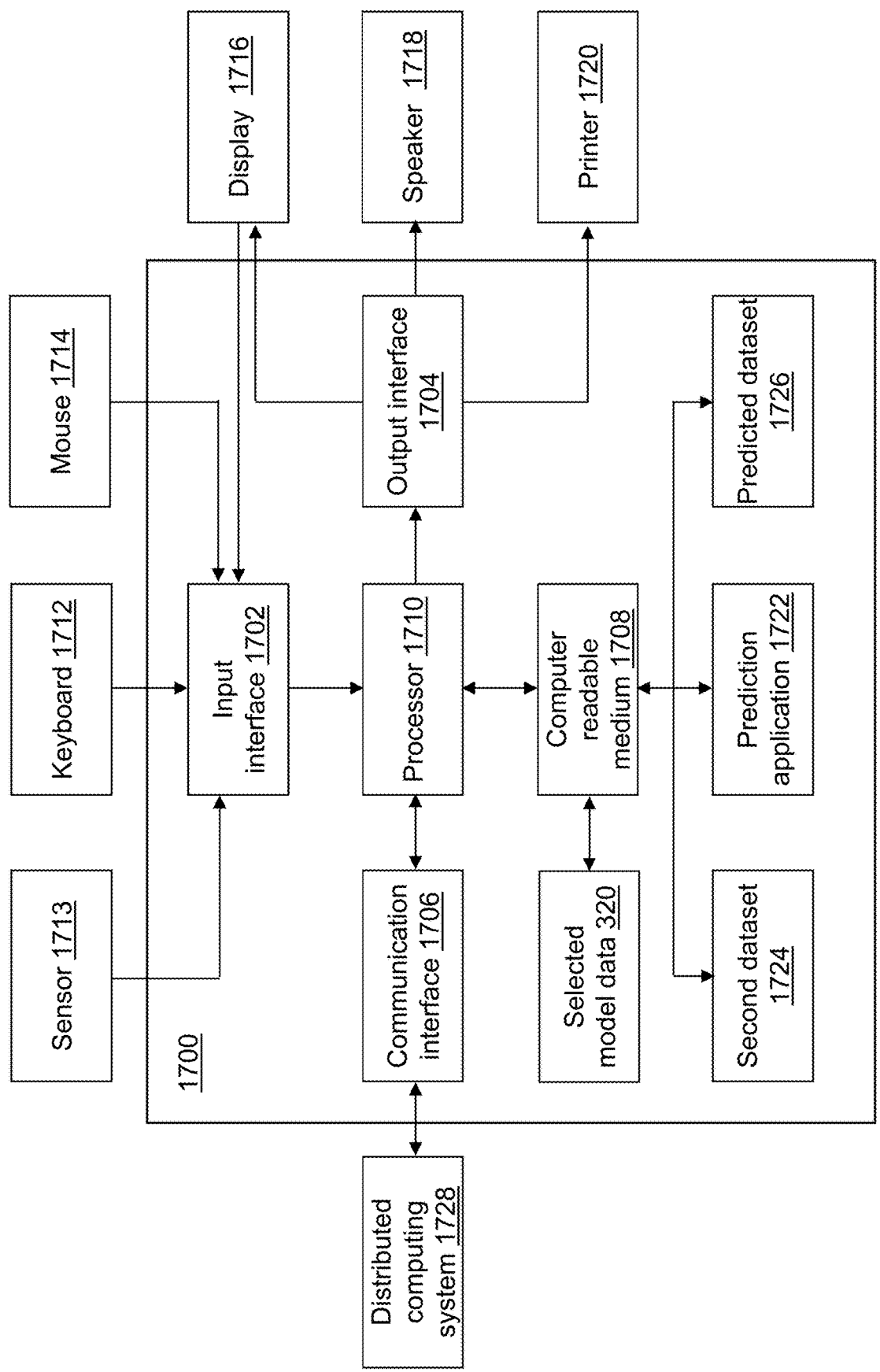
FIG. 17 depicts a block diagram of a prediction device in accordance with an illustrative embodiment.

Referring to FIG. 17, a block diagram of a prediction device 1700 is shown in accordance with an illustrative embodiment. Prediction device 1700 may include a fifth input interface 1702, a fifth output interface 1704, a fifth communication interface 1706, a fifth non-transitory computer-readable medium 1708, a fifth processor 1710, a prediction application 1722, selected model data 318, second dataset 1724, and predicted dataset 1726. Fewer, different, and/or additional components may be incorporated into prediction device 1700. Prediction device 1700 and user device 200 and/or selection manager device 104 may be the same or different devices.

Fifth input interface 1702 provides the same or similar functionality as that described with reference to input interface 202 of user device 200 though referring to prediction device 1700. Fifth output interface 1704 provides the same or similar functionality as that described with reference to output interface 204 of user device 200 though referring to prediction device 1700. Fifth communication interface 1706 provides the same or similar functionality as that described with reference to communication interface 206 of user device 200 though referring to prediction device 1700. Data and messages may be transferred between prediction device 1700 and a distributed computing system 1728 using fifth communication interface 1706. Fifth computer-readable medium 1708 provides the same or similar functionality as that described with reference to computer-readable medium 208 of user device 200 though referring to prediction device 1700. Fifth processor 1710 provides the same or similar functionality as that described with reference to processor 210 of user device 200 though referring to prediction device 1700.

Prediction application 1722 performs operations associated with classifying or predicting a characteristic of data stored in second dataset 1724 and/or identifying outliers in second dataset 1724 to support various data analysis functions as well as provide alert/messaging related to the classified data and/or identified outliers. Dependent on the type of data stored in the training data and second dataset 1724, prediction application 1722 may identify anomalies as part of process control, for example, of a manufacturing process, for machine condition monitoring, for example, an electro-cardiogram device, for image classification, for intrusion detection, for fraud detection, etc. Some or all of the operations described herein may be embodied in prediction application 1722. The operations may be implemented using hardware, firmware, software, or any combination of these methods.

Referring to the example embodiment of FIG. 17, prediction application 1722 is implemented in software (comprised of computer-readable and/or computer-executable instructions) stored in fifth computer-readable medium 1708 and accessible by fifth processor 1710 for execution of the instructions that embody the operations of prediction application 1722. Prediction application 1722 may be written using one or more programming languages, assembly languages, scripting languages, etc. Prediction application 1722 may be integrated with other analytic tools. As an example, prediction application 1722 may be part of an integrated data analytics software application and/or software architecture such as that offered by SAS Institute Inc. of Cary, N.C., USA. For example, prediction application 1722 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, prediction application 1722 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 1722 further may be performed by an ESPE. Prediction application 1722, model tuning application 222, selection manager application 312, model manager application 412, and model worker application 432 may be the same or different applications that are integrated in various manners to select hyperparameters for and execute a predictive model using the training data and/or second dataset 1724 in a single computing device or a plurality of distributed computing devices.

Prediction application 1722 may be implemented as a Web application. Prediction application 1722 may be integrated with other system processing tools to automatically process data generated as part of operation of an enterprise, to classify data in the processed data, to identify any outliers in the processed data, and/or to provide a warning or alert associated with the data classification and/or outlier identification using fifth input interface 1702, fifth output interface 1704, and/or fifth communication interface 1706 so that appropriate action can be initiated in response. For example, a warning or an alert may be presented using a second display 1716, a second speaker 1718, a second printer 1720, etc. or sent to one or more computer-readable media, display, speaker, printer, etc. of distributed computing system 1728.

The input dataset and second dataset 1724 may be generated, stored, and accessed using the same or different mechanisms. Similar to the input dataset, second dataset 1724 may include a plurality of rows and a plurality of columns with the plurality of rows referred to as observations or records, and the columns referred to as variables that are associated with an observation. Second dataset 1724 may be transposed.

Similar to the input dataset, second dataset 1724 may be stored on fifth computer-readable medium 1708 or on one or more computer-readable media of distributed computing system 1728 and accessed by prediction device 1700 using fifth communication interface 1706. Data stored in second dataset 1724 may be a sensor measurement or a data communication value, for example, from a sensor 1713, may be generated or captured in response to occurrence of an event or a transaction, generated by a device such as in response to an interaction by a user with the device, for example, from a second keyboard 1712 or a second mouse 1714, etc. The data stored in second dataset 1724 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 1724 may be captured at different time points periodically, intermittently, when an event occurs, etc. One or more columns may include a time value. Similar to the input dataset, data stored in second dataset 1724 may be generated as part of the IoT, and some or all data may be pre- or post-processed by an ESPE.

Similar to the input dataset, second dataset 1724 may be stored in various compressed formats such as a coordinate format, a compressed sparse column format, a compressed sparse row format, etc. Second dataset 1724 further may be stored using various structures as known to those skilled in the art including a file system, a relational database, a system of tables, a structured query language database, etc. on prediction device 1700 and/or on distributed computing system 1728. Prediction device 1700 and/or distributed computing system 1728 may coordinate access to second dataset 1724 that is distributed across a plurality of computing devices. For example, second dataset 1724 may be stored in a cube distributed across a grid of computers as understood by a person of skill in the art. As another example, second dataset 1724 may be stored in a multi-node Hadoop® cluster. As another example, second dataset 1724 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 1724.

Figure 18:
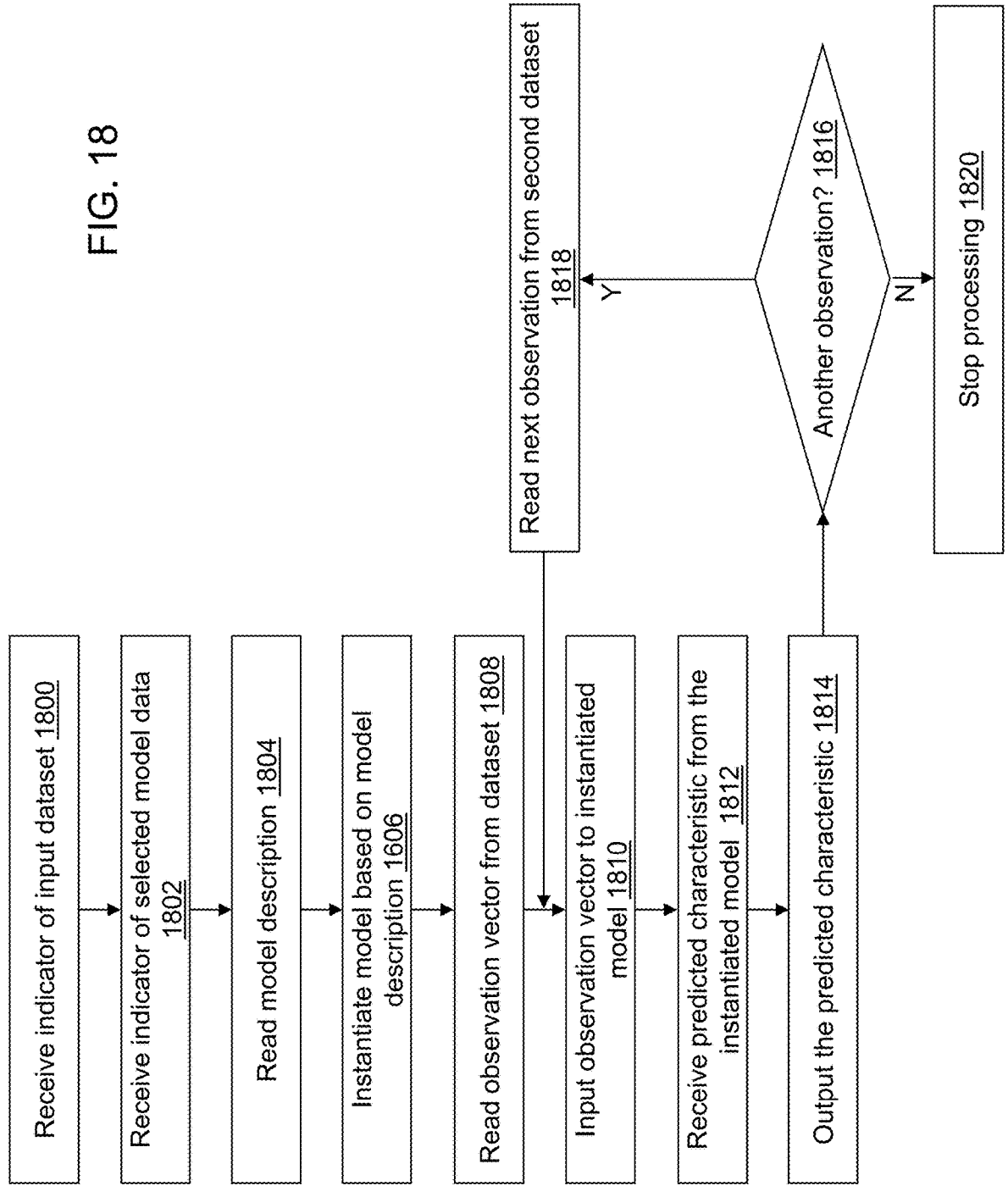
FIG. 18 depicts a flow diagram illustrating examples of operations performed by the prediction device of FIG. 17 in accordance with an illustrative embodiment.

Referring to FIG. 18, example operations of prediction application 1722 are described. Additional, fewer, or different operations may be performed depending on the embodiment of prediction application 1722. The order of presentation of the operations of FIG. 18 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1800, a fifteenth indicator may be received that indicates second dataset 1724. For example, the fifteenth indicator indicates a location and a name of second dataset 1724. As an example, the fifteenth indicator may be received by prediction application 1722 after selection from a user interface window or after entry by a user into a user interface window. In an alternative embodiment, second dataset 1724 may not be selectable. For example, a most recently created dataset may be used automatically. As another example, second dataset 1724 may be provided automatically as part of integration with model tuning application 222, visualization application 226, selection manager application 312, model manager application 412, and/or model worker application 432.

In an operation 1802, a sixteenth indicator may be received that indicates selected model data 318. For example, the sixteenth indicator indicates a location and a name of selected model data 318. As an example, the sixteenth indicator may be received by prediction application 1722 after selection from a user interface window or after entry by a user into a user interface window. In an alternative embodiment, selected model data 318 may not be selectable. For example, most recently created model data may be used automatically. As another example, selected model data 318 may be provided automatically as part of integration with model tuning application 222, selection manager application 312, model manager application 412, and/or model worker application 432.

In an operation 1804, a model description is read from selected model data 318.

In an operation 1806, a model is instantiated with information read from the model description. For example, the type of model, its hyperparameter values, and other characterizing elements are read and used to instantiate the model.

In an operation 1808, an observation vector is read from second dataset 1724.

In an operation 1810, the read observation vector is input to the instantiated model.

In an operation 1812, an output of the instantiated model is received. The output may indicate a predicted characteristic of the observation vector.

In an operation 1814, the predicted characteristic may be output, for example, by storing the predicted characteristic with the observation vector to predicted dataset 1726. In addition, or in the alternative, the predicted characteristic may be presented on second display 1716, printed on second printer 1720, a message including the predicted characteristic may be sent to another computing device using fifth communication interface 1706, an alarm or other alert signal may be sounded through second speaker 1718, etc.

In an operation 1816, a determination is made concerning whether second dataset 1724 includes another observation vector. When second dataset 1724 includes another observation vector, processing continues in an operation 1818. When second dataset 1724 does not include another observation vector, processing continues in an operation 1820.

In operation 1818, a next observation vector is read from second dataset 1724, and processing continues in operation 1810.

In operation 1820, processing stops and cleanup is performed as needed.

There are applications for model tuning application 222, visualization application 226, selection manager application 312, model manager application 412, model worker application 432, and/or prediction application 1722 in many areas such as process control and equipment health monitoring, image processing and classification, data segmentation, data analysis, etc. Model tuning application 222, visualization application 226, selection manager application 312, model manager application 412, and model worker application 432 automatically tune hyperparameters of modeling algorithms that include decision tree models, forest models, gradient boosting models, neural network models, support vector machine models, factorization machine models, etc.

The explosion of digital data is generating many opportunities for big data analytics, which in turn provides many opportunities for tuning predictive models to capitalize on the information contained in the data—to make better predictions that lead to better decisions. Hyperparameter selection system 100 supports better decision making by providing a system that can identify and evaluate many more hyperparameter configurations in parallel by allocating the computing devices of worker system 106 in an effective data and model parallel manner.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

present a visualization user interface window in a display;
read a first row from a history table, wherein the first row includes a plurality of column headers;
identify an objective function and each hyperparameter of a plurality of hyperparameters from a respective column header of the plurality of column headers;
determine a count of the plurality of hyperparameters identified;
select a report template from a plurality of predefined report templates based on the determined count of the plurality of hyperparameters, wherein each report template of the plurality of report templates describes a plurality of views presentable in the visualization user interface window, wherein at least one view of the plurality of views of each report template includes a user interface page that is presented in the visualization user interface window based on the determined count of the plurality of hyperparameters;
(A) select a page template from the selected report template, wherein at least one page template is defined for each view of the plurality of views of the selected report template, wherein the selected page template describes graphical objects presented in the visualization user interface window based on the plurality of hyperparameters identified, wherein, when the selected page template describes the user interface page, the graphical objects are presented as part of the user interface page;
(B) read a next row of tuning data from the history table, wherein a model tuning process writes the tuning data to the history table as the model tuning process is training and scoring a machine learning model type with different sets of values for the plurality of hyperparameters identified, wherein an objective function value is computed by training and scoring the machine learning model type with each set of values of the different sets of values for the plurality of hyperparameters identified, wherein the next row includes the objective function value and a value for each hyperparameter of the plurality of hyperparameters identified in a respective column based on the plurality of column headers;
(C) update the selected page template with the objective function value and the value for each hyperparameter of the plurality of hyperparameters identified;
(D) update the presented visualization user interface window using the updated, selected page template;
(E) at the end of a refresh time period, read new tuning data from the history table, wherein the new tuning data is written to the history table by the model tuning process after a previous read from the history table in (B), wherein the read new tuning data includes a new objective function value and a new value for each hyperparameter of the plurality of hyperparameters identified; and
(F) repeat (C) through (E) with the objective function value-and the value for each hyperparameter of the plurality of hyperparameters identified replaced with the new objective function value and the new value for each hyperparameter of the plurality of hyperparameters identified until an interaction by a user with the visualization user interface window is detected.

2. The non-transitory computer-readable medium of claim 1, wherein the machine learning model type is selected from the group consisting of a decision tree model type, a factorization machine model type, a forest model type, a gradient boosting tree model type, a neural network model type, and a support vector machine model type.

3. The non-transitory computer-readable medium of claim 1, wherein the graphical objects include a table that includes an iteration counter column, an evaluation counter column, an objective function column, and a hyperparameter column for each hyperparameter of the plurality of hyperparameters identified, wherein the plurality of column headers includes a header name for each of the iteration counter column, the evaluation counter column, the objective function column, and the hyperparameter column for each hyperparameter of the plurality of hyperparameters identified.

4. The non-transitory computer-readable medium of claim 1, wherein the plurality of views includes a progress view that includes a progress bar that visually shows an approximate fraction of the model tuning process completed by the model tuning process on each iteration of (D).

5. The non-transitory computer-readable medium of claim 1, wherein the plurality of views includes a compact view that includes a scatter plot of the computed objective function value as a function of an iteration counter, wherein a common value of an iteration counter is associated with one or more sets of values of the hyperparameters for which the objective function value is computed, wherein the next row includes the iteration counter.

6. The non-transitory computer-readable medium of claim 5, wherein a unique color or a unique symbol is used for each unique value of the common value of the iteration counter.

7. The non-transitory computer-readable medium of claim 5, wherein the detected interaction by the user with the visualization user interface window indicates that a pop-up panel be included in the visualization user interface window, wherein the pop-up panel includes a value of each hyperparameter of the hyperparameters and a value of the objective function associated with a point included in the scatter plot.

8. The non-transitory computer-readable medium of claim 7, wherein the interaction is detected when a pointer hovers over the point for a predefined period of time.

9. The non-transitory computer-readable medium of claim 5, wherein the compact view includes a switch to detail view button, wherein a detail view is one of the plurality of views, wherein when the interaction indicates selection of the switch to detail view button, the computer-readable instructions further cause the computing device to:
select a new page template from the selected report template, wherein the new page template describes second graphical objects presented in the detail view of the visualization user interface window; and
repeat (C) through (E) with the objective function value- and the value for each hyperparameter of the plurality of hyperparameters identified replaced with the new objective function value and the new value for each hyperparameter of the plurality of hyperparameters identified and with the selected page template replaced with the selected new page template until a second interaction by the user with the visualization user interface window is detected.

10. The non-transitory computer-readable medium of claim 1, wherein the selected page template describes a stop button presented in the visualization user interface window, wherein, when the interaction indicates selection of the stop button, the computer-readable instructions further cause the computing device to:
send a stop indicator to the model tuning process, wherein the stop indicator indicates that the model tuning process stop repeatedly training and scoring the machine learning model type and define a trained model of the machine learning model type using a set of values of the hyperparameters selected from the different sets of values of the hyperparameters based on an extremum objective function value associated with the set of values of the hyperparameters; and close the visualization user interface window.

11. The non-transitory computer-readable medium of claim 10, wherein the extremum objective function value is a minimum value when the objective function is a measure of a model error and is a maximum value when the objective function is a measure of a model accuracy.

12. The non-transitory computer-readable medium of claim 1, wherein the selected page template describes a cancel button presented in the visualization user interface window, wherein when the interaction indicates selection of the cancel button, the computer-readable instructions further cause the computing device to:

send a cancel indicator to the model tuning process, wherein the cancel indicator indicates that the model tuning process stop repeatedly training and scoring the machine learning model type; and close the visualization user interface window.

13. The non-transitory computer-readable medium of claim 1, wherein each page template of the plurality of page templates describes a tabbed page of a plurality of tabbed pages presented in the visualization user interface window, wherein, when the interaction indicates selection of a different page of the plurality of tabbed pages, the computer-readable instructions further cause the computing device to:

select a new page template from the selected report template, wherein the new page template describes second graphical objects presented in the different page of the plurality of tabbed pages; and repeat (C) through (E) with the objective function value and the value for each hyperparameter of the plurality of hyperparameters identified replaced with the new objective function value and the new value for each hyperparameter of the plurality of hyperparameters identified and with the selected page template replaced with the selected new page template until a second interaction by the user with the visualization user interface window is detected.

14. The non-transitory computer-readable medium of claim 3, wherein numerical data is included in each column for each row after the first row of the history table to define a set of values for a training and scoring evaluation by the model tuning process.

15. The non-transitory computer-readable medium of claim 1, wherein the graphical objects include a scatter plot of the computed objective function value as a function of an evaluation counter value, wherein a unique evaluation counter value is associated with each set of values of the hyperparameters for which the objective function value is computed.

16. The non-transitory computer-readable medium of claim 1, wherein the graphical objects include a plurality of scatter plots, wherein a scatter plot of the plurality of scatter plots is created for each hyperparameter of the plurality of hyperparameters identified, wherein each scatter plot is a plot of a hyperparameter value of a respective hyperparameter as a function of an evaluation counter value, wherein a unique evaluation counter value is associated with each set of values of the hyperparameters for which the objective function value is computed.

17. The non-transitory computer-readable medium of claim 16, wherein a common value of an iteration counter is associated with one or more evaluations, wherein a unique color or a unique symbol is used for each unique value of the common value of the iteration counter.

18. The non-transitory computer-readable medium of claim 17, wherein the graphical objects further include a histogram of a number of the one or more evaluations associated with each unique value of the common value of the iteration counter.

19. The non-transitory computer-readable medium of claim 18, wherein, when the interaction indicates selection of a bar of the histogram, the computer-readable instructions further cause the computing device to:

highlight each point in the plurality of scatter plots that has the common value of the iteration counter associated with the selected bar of the histogram.

20. The non-transitory computer-readable medium of claim 1, wherein the graphical objects include a plurality of scatter plots, wherein a scatter plot of the plurality of scatter plots is created for each hyperparameter of the plurality of hyperparameters identified, wherein each scatter plot is a plot of the objective function value as a function of a hyperparameter value of a respective hyperparameter.

21. The non-transitory computer-readable medium of claim 20, wherein a common value of an iteration counter is associated with one or more points included in each scatter plot of the plurality of scatter plots, wherein a unique color or a unique symbol is used for each unique value of the common value of the iteration counter.

22. The non-transitory computer-readable medium of claim 21, wherein the graphical objects further include a histogram of a number of one or more evaluations associated with each unique value of the common value of the iteration counter.

23. The non-transitory computer-readable medium of claim 22, wherein when the interaction indicates selection of a bar of the histogram, the computer-readable instructions further cause the computing device to:

highlight each point in the plurality of scatter plots that has the common value of the iteration counter associated with the selected bar of the histogram.

24. The non-transitory computer-readable medium of claim 1, wherein the graphical objects include a plurality of histograms, wherein a histogram of the plurality of histograms is created for each hyperparameter of the plurality of hyperparameters identified, wherein each histogram is a plot of a number of evaluations as a function of a hyperparameter value of a respective hyperparameter of the plurality of hyperparameters identified.

25. The non-transitory computer-readable medium of claim 1, wherein the graphical objects include a needle plot of an evaluation time value as a function of an evaluation counter value, wherein a unique evaluation counter value is associated with each set of values of the hyperparameters for which the objective function value is computed.

26. The non-transitory computer-readable medium of claim 1, wherein the graphical objects include a plurality of columns, wherein each column includes a plurality of boxes, wherein each box of the plurality of boxes included in a column of the plurality of columns represents continuous values from a minimum value to a maximum value for a parameter associated with the column, wherein one of the objective function value and the value for each hyperparameter of the plurality of hyperparameters identified is associated with each column of the plurality of columns, wherein a box minimum value and a box maximum value is defined for each box, wherein a line is defined for each set of values of the hyperparameters for which the objective function value is computed, wherein the line connects between a box in each column of the plurality of columns based on a respective objective function value or value for each hyperparameter of the plurality of hyperparameters identified falling between the box minimum value and the box maximum value.

27. The non-transitory computer-readable medium of claim 26, wherein the plurality of columns includes an objective function column and a hyperparameter column for each hyperparameter of the plurality of hyperparameters identified.

28. The non-transitory computer-readable medium of claim 27, wherein when the interaction indicates selection of one or more boxes included in the objective function column, the computer-readable instructions further cause the computing device to:

highlight each line having the objective function value between the box minimum value and the box maximum value of each box included in the selected one or more boxes.

29. A computing device comprising:
a processor; and
a computer-readable medium operably coupled to the processor, the computer-readable medium having computer-readable instructions stored thereon that, when executed by the processor, cause the computing device to
present a visualization user interface window in a display;
read a first row from a history table, wherein the first row includes a plurality of column headers;
identify an objective function and each hyperparameter of a plurality of hyperparameters from a respective column header of the plurality of column headers;
determine a count of the plurality of hyperparameters identified;
select a report template from a plurality of predefined report templates based on the determined count of the plurality of hyperparameters, wherein each report template of the plurality of report templates describes a plurality of views presentable in the visualization user interface window, wherein at least one view of the plurality of views of each report template includes a user interface page that is presented in the visualization user interface window based on the determined count of the plurality of hyperparameters;
(A) select a page template from the selected report template, wherein at least one page template is defined for each view of the plurality of views of the selected report template, wherein the selected page template describes graphical objects presented in the visualization user interface window based on the plurality of hyperparameters identified, wherein, when the selected page template describes the user interface page, the graphical objects are presented as part of the user interface page;
(B) read a next row of tuning data from the history table, wherein a model tuning process writes the tuning data to the history table as the model tuning process is training and scoring a machine learning model type with different sets of values for the plurality of hyperparameters identified, wherein an objective function value is computed by training and scoring the machine learning model type with each set of values of the different sets of values for the plurality of hyperparameters identified, wherein the next row includes the objective function value and a value for each hyperparameter of the plurality of hyperparameters identified in a respective column based on the plurality of column headers;
(C) update the selected page template with the objective function value-and the value for each hyperparameter of the plurality of hyperparameters identified;
(D) update the presented visualization user interface window using the updated, selected page template;
(E) at the end of a refresh time period, read new tuning data from the history table, wherein the new tuning data is written to the history table by the model tuning process after a previous read from the history table in (B), wherein the read new tuning data includes a new objective function value and a new value for each hyperparameter of the plurality of hyperparameters identified; and
(F) repeat (C) through (E) with the objective function value-and the value for each hyperparameter of the plurality of hyperparameters identified replaced with the new objective function value and the new value for each hyperparameter of the plurality of hyperparameters identified until an interaction by a user with the visualization user interface window is detected.

30. A method of presenting a visualization of hyperparameter values while tuning a machine learning model, the method comprising:

presenting, by a computing device, a visualization user interface window in a display;
reading, by the computing device, a first row from a history table, wherein the first row includes a plurality of column headers;
identifying, by the computing device, an objective function and each hyperparameter of a plurality of hyperparameters from a respective column header of the plurality of column headers;
determining, by the computing device, a count of the plurality of hyperparameters identified;
selecting, by the computing device, a report template from a plurality of predefined report templates based on the determined count of the plurality of hyperparameters, wherein each report template of the plurality of report templates describes a plurality of views presentable in the visualization user interface window, wherein at least one view of the plurality of views of each report template includes a user interface page that is presented in the visualization user interface window based on the determined count of the plurality of hyperparameters;
(A) selecting, by the computing device, a page template from the selected report template, wherein at least one page template is defined for each view of the plurality of views of the selected report template, wherein the selected page template describes graphical objects presented in the visualization user interface window based on the plurality of hyperparameters identified, wherein, when the selected page template describes the user interface page, the graphical objects are presented as part of the user interface page;
(B) reading, by the computing device, a next row of tuning data from the history table, wherein a model tuning process writes the tuning data to the history table as the model tuning process is training and scoring a machine learning model type with different sets of values for the plurality of hyperparameters identified, wherein an objective function value is computed by training and scoring the machine learning model type with each set of values of the different sets of values for the plurality of hyperparameters identified, wherein the next row includes the objective function value and a value for each hyperparameter of the plurality of hyperparameters identified in a respective column based on the plurality of column headers;

(C) updating, by the computing device, the selected page template with the objective function value-and the value for each hyperparameter of the plurality of hyperparameters identified;

(D) updating, by the computing device, the presented visualization user interface window using the updated, selected page template;

(E) at the end of a refresh time period, reading, by the computing device, new tuning data from the history table, wherein the new tuning data is written to the history table by the model tuning process after a previous read from the history table in (B), wherein the read new tuning data includes a new objective function value and a new value for each hyperparameter of the plurality of hyperparameters identified; and (F) repeating, by the computing device, (C) through (E) with the objective function value and the value for each hyperparameter of the plurality of hyperparameters identified replaced with the new objective function value and the new value for each hyperparameter of the plurality of hyperparameters identified until an interaction by a user with the visualization user interface window is detected.

* * * * *

UNITED STATES PATENT AND TRADEMARK OFFICE
CERTIFICATE OF CORRECTION

PATENT NO. : 11,151,480 B1
APPLICATION NO. : 17/099846
DATED : October 19, 2021
INVENTOR(S) : Oleg Borisovich Golovidov et al.

Page 1 of 1

It is certified that error appears in the above-identified patent and that said Letters Patent is hereby corrected as shown below:

In the Specification

Column 4, Line 67:
Delete the phrase "worker session 106$k$." and replace with --worker session 106$N_s$.--.

Column 5, Lines 28-29:
Delete the phrase "worker session 106$k$." and replace with --worker session 106$N_s$.--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*